US006896382B2

(12) United States Patent
Yoshikawa et al.

(10) Patent No.: US 6,896,382 B2
(45) Date of Patent: May 24, 2005

(54) REFLECTIVE OPTICAL DEVICE, AND REFLECTIVE SOLID-STATE OPTICAL DEVICE, AND IMAGING DEVICE, MULTI-WAVELENGTH IMAGING DEVICE, VIDEO CAMERA DEVICE, AND VEHICLE-MOUNTED MONITOR UTILIZING THE SAME

(75) Inventors: Motonobu Yoshikawa, Osaka (JP); Yoshiharu Yamamoto, Toyonaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/461,559

(22) Filed: Jun. 13, 2003

(65) Prior Publication Data

US 2003/0214736 A1 Nov. 20, 2003

Related U.S. Application Data

(62) Division of application No. 09/913,018, filed as application No. PCT/JP00/00728 on Feb. 9, 2000.

(30) Foreign Application Priority Data

| Feb. 10, 1999 | (JP) | ............................................. 11-32881 |
| May 10, 1999 | (JP) | ........................................ 11-128493 |
| Oct. 19, 1999 | (JP) | ........................................ 11-297123 |

(51) Int. Cl.$^7$ ................................................. G02B 5/10
(52) U.S. Cl. ........................ 359/858; 359/850; 359/857
(58) Field of Search ................................ 359/850, 851, 359/852, 853, 854, 855, 856, 857, 858, 859, 861, 862, 863, 864

(56) References Cited

U.S. PATENT DOCUMENTS 3,811,749 A  5/1974  Abel ........................... 359/365
4,733,955 A  3/1988  Cook .......................... 359/859
4,834,517 A  5/1989  Cook .......................... 359/366
5,253,005 A  10/1993 Koyama et al. ............. 354/152
5,331,470 A  7/1994  Cook .......................... 359/859
5,661,610 A * 8/1997  Pasternak .................... 359/859
5,841,574 A  11/1998 Willey ......................... 359/351
5,847,879 A  12/1998 Cook
5,867,329 A * 2/1999  Justus et al. ................. 359/861
5,993,010 A * 11/1999 Ohzawa et al. ............... 353/99
6,324,012 B1  11/2001 Aratani et al. .............. 359/627

FOREIGN PATENT DOCUMENTS

EP          0 025 188        8/1980
EP          0 601 871        12/1993

(Continued)

OTHER PUBLICATIONS

Maejima et al., "Germanium for Infrared Optics", Tokyo Denshi Yakin Co., (1990); 17: 41–47.

*Primary Examiner*—Drew A. Dunn
*Assistant Examiner*—Joshua L Pritchett
(74) *Attorney, Agent, or Firm*—Merchant & Gould P.C.

(57) ABSTRACT

Two reflection surfaces that are a first reflection surface (2) and a second reflection surface (3), each in a non-axisymmetric form, are disposed in the stated order in a direction in which light fluxes travel, and bring light fluxes from an object into focus on an image surface (4). The first reflection surface (2) and the second reflection surface (3) are provided eccentrically, and each of the first reflection surface (2) and the second refection surface (3) is concave in a cross-sectional shape taken along a plane containing a center of the image surface (4) and vertices of the reflection surfaces (2, 3). This ensures that light fluxes are guided to the image surface without being blocked, whereby an excellent image can be formed. Thus, a reflective optical device with a wider angle and improved performance can be provided.

10 Claims, 40 Drawing Sheets

FOREIGN PATENT DOCUMENTS

| | | | |
|---|---|---|---|
| EP | 0 656 552 | 11/1994 | |
| EP | 0 689 075 | 5/1995 | |
| EP | 0 730 169 | 2/1996 | |
| EP | 0 730 183 | 2/1996 | |
| EP | 0 732 168 | 3/1996 | |
| EP | 0 880 032 | 5/1998 | |
| EP | 0 921 427 | 11/1998 | |
| EP | 1 160 610 | 12/2001 | |
| JP | 54-42674 | 12/1979 | |
| JP | 57-37371 | 3/1982 | |
| JP | 62-164010 | 7/1987 | |
| JP | 63-503097 | 11/1988 | |
| JP | 64-88414 | 4/1989 | |
| JP | 1-502461 | 8/1989 | |
| JP | WO 90/09864 | * 9/1990 | ........... B23K/26/08 |
| JP | 3-125573 | 5/1991 | |
| JP | 3-274971 | 12/1991 | |
| JP | 4-318697 | 11/1992 | |
| JP | 5-288899 | 11/1993 | |
| JP | 6-29928 | 2/1994 | |
| JP | 6-273671 | 9/1994 | |
| JP | 8-292371 | 11/1996 | |
| JP | 2-598501 | 1/1997 | |
| JP | 2-716933 | 11/1997 | |
| JP | 2-763055 | 3/1998 | |
| JP | 10-206986 | 8/1998 | |
| JP | 10-221603 | 8/1998 | |
| JP | 10-333040 | 12/1998 | |
| JP | 10-339842 | 12/1998 | |
| JP | 11-14906 | 1/1999 | |
| JP | 11-132860 | 5/1999 | |
| JP | 11-168680 | 6/1999 | |
| JP | 2000-98476 | 4/2000 | |
| WO | WO 87/06359 | 10/1987 | |
| WO | WO 88/05552 | 7/1988 | |
| WO | WO 00/48033 | 8/2000 | |

* cited by examiner

REFLECTIVE OPTICAL DEVICE, AND REFLECTIVE SOLID-STATE OPTICAL DEVICE, AND IMAGING DEVICE, MULTI-WAVELENGTH IMAGING DEVICE, VIDEO CAMERA DEVICE, AND VEHICLE-MOUNTED MONITOR UTILIZING THE SAME

This application is a divisional of application Ser. No. 09/913,018, filed Aug. 8, 2001, which is a 371 of PCT/JP00/00728 tiled Feb. 9, 2000, which application(s) are incorporated herein by reference.

TECHNICAL FIELD

The present invention relates to an optical system and an imaging device in each of which a reflection surface is used, and particularly relates to an imaging device making use of infrared rays.

BACKGROUND ART

Recently, research has been conducted on reflective optical devices mainly with a view to detection and imaging of infrared rays. In particular, for instance, JP-2763055B, JP-2598501B, and JP-2716933B propose various optical devices in each of which reflection surfaces are eccentrically disposed so that light fluxes are not blocked by the reflection surfaces on their ways but are effectively directed and imaged. Furthermore, a reflective optical device in which a reflection surface is formed to be a free-form surface, though not for use with infrared rays, is proposed by JP8(1996)-292371A, for instance.

As an imaging optical system for imaging image information in a visible range, a refractive optical system utilizing an optical glass as a lens has been used. An optical device having a plurality of reflection surfaces outside an optical medium that is a transparent body is proposed by JP11(1999)-14906.

On the other hand, in an optical device imaging a thermal image by utilizing infrared rays, since it deals with optical rays with wavelengths in the infrared range, a material used in a lens is selected from the group consisting of germanium, silicon, ZnSe, etc. An optical device having a lens formed with germanium and ZnSe is proposed by JP10(1998)-339842A. An optical device having a lens formed with germanium and silicon is proposed by JP1(1989)-88414A.

On the contrary, a reflective optical system is characterized in the capability of image formation in a range from the visible range to the infrared range by appropriately selecting a material of a reflection surface. JP10(1998)-206986A proposes an optical device having a relay lens in addition to a coaxial reflective optical system with two reflection surfaces of a main mirror and a sub mirror.

A conventional optical system in which reflection surfaces are eccentrically arranged as described above, however, has a drawback in that optical specifications of brightness, resolution, distortion, an angle of view, etc. do not suffice for practical use.

Furthermore, in a conventional optical device for imaging image information in the visible range as described above, a refractive optical system requires a multiplicity of lenses for imaging image information in the visible range; thereby having a high cost. Furthermore, in an optical device in which reflection surfaces are provided outside a transparent optical medium, the number of component members required is decreased, but sufficient cost reduction cannot be achieved.

On the other hand, in the case where a refractive optical system is used in an optical device for forming a thermal image by utilizing infrared rays, the cost is high, and in some cases toxic materials such as germanium or ZnSe are used. In the case of a reflective optical system, the system can be made to have a relatively great numerical aperture without using specific materials, but reflection surfaces thereof per se tend to block light fluxes, thereby causing the optical system to have a small angle of view.

DISCLOSURE OF THE INVENTION

The present invention is to solve the above-described problems of the prior art, and an object of the present invention is to provide a reflective optical device and a reflective solid-state optical device, each of which achieves an increased angle of vision and improved optical performance, and is miniaturized and has reduced cost at the same time compatibly, as well as an imaging device, video camera device, and a vehicle-mounted monitor each of which utilizes the foregoing reflective optical device or reflective solid-state optical device.

To achieve the foregoing object, a first reflective optical device of the present invention is characterized by including two non-axisymmetric reflection surfaces for bringing light fluxes from an object into focus on an image surface. The two non-axisymmetric reflection surfaces are a first reflection surface and a second reflection surface, and the first and second reflection surfaces are disposed in this order in a direction in which the light fluxes travel, and are arranged eccentrically. Each of the first and second reflection surfaces is concave in a cross-sectional shape taken along a plane containing a center of the image surface and vertices of the reflection surfaces. The foregoing reflective optical device includes two non-axisymmetric reflection surfaces that eccentrically are arranged, thereby allowing light fluxes to reach the image surface without being blocked, and hence allowing excellent image formation. Thus, a wide-angle and high-performance reflective optical device can be obtained.

The first reflective optical device preferably further includes a diaphragm for limiting light fluxes, the diaphragm being disposed between the first reflection surface and the object.

Furthermore, the first reflective optical device preferably satisfies the relationship expressed as below:

$$0.3 < d1/efy < 1.5$$

where d1 represents a distance between a center of the diaphragm and the vertex of the first reflection surface, and efy represents a focal length in a plane containing the center of the image surface and the vertices of the first and second reflection surfaces. When the foregoing formula is satisfied, it is possible to suppress occurrence of aberration, thereby preventing degradation of optical performance.

Furthermore, the first reflective optical device preferably satisfies the relationship expressed as below:

$$1.0 < d2/efy < 4.0$$

where d2 represents a distance between the vertex of the first reflection surface and the vertex of the second reflection surface, and efy represents a focal length in a plane containing the center of the image surface and the vertices of the first and second reflection surfaces. When the foregoing formula is satisfied, it is possible to suppress the occurrence of aberration, thereby preventing degradation of optical performance.

Furthermore, the first reflection surface preferably is concave in a cross-sectional shape taken in a direction perpendicular to a plane containing the center of the image surface and the vertices of the first and second reflection surfaces.

Furthermore, the second reflection surface preferably is concave in a cross-sectional shape taken in a direction perpendicular to a plane containing the center of the image surface and the vertices of the first and second reflection surfaces.

Furthermore, each of the first and second reflection surfaces preferably is a free-form surface that does not have a rotational axis. The foregoing configuration of the reflective optical device allows freedom of design to be increased, while achieving an increased angle of vision and improved optical performance.

Furthermore, the free-form surface preferably is either a curved-axis Y toric surface or a curved-axis X toric surface, each of which is defined by a function f(X,Y) in a rectangular coordinate system (X, Y) in which the X direction is a direction perpendicular to a plane containing the center of the image surface and the vertices of the reflection surfaces and the Y direction is a direction of a tangent line at a vertex, the tangent line being contained in the foregoing plane. The curved-axis Y toric surface is such that a line obtained by connecting centers of radii of curvature of X-direction cross sections at respective Y coordinates is a curved line. The curved-axis X toric surface is such that a line obtained by connecting centers of radii of curvature of Y-direction cross sections at respective X coordinates is a curved line.

Furthermore, the first reflection surface preferably is a curved-axis Y toric surface or a curved-axis X toric surface, the curved-axis Y toric surface being such that a Y-direction cross section of the first reflection surface containing the vertex thereof is asymmetric with respect to a normal line at the vertex thereof, and a curved line connecting the centers of radii of curvature of the X-direction cross sections. With the foregoing configuration of the reflective optical device, the performance can be improved further.

Furthermore, the second reflection surface preferably is a curved-axis Y toric surface or a curved-axis X toric surface, the curved-axis Y toric surface being such that a Y-direction cross section of the first reflection surface containing the vertex thereof is asymmetric with respect to a normal line at the vertex thereof and a curved line connecting the centers of radii of curvature of the X-direction cross sections. According to the foregoing configuration of the reflective optical device, the performance can be improved further.

Next, a second reflective optical device of the present invention is characterized by including at least three reflection surfaces for bringing light fluxes from an object into focus on an image surface. In the second reflective optical device, the reflection surfaces are arranged eccentrically, an F value in a plane containing vertices of the respective reflection surfaces is less than 3.5, and among the reflection surfaces, the two reflection surfaces on the object side are given as a first reflection surface and a second reflection surface, respectively, in an order from the object side in a direction in which the light fluxes travel, and each of the first and second reflection surfaces is concave in a cross-sectional shape taken along the plane. The reflective optical device configured as described above achieves improved optical performance compared with the two-mirror configuration, and hence, the device is applicable to a system with requirements of high resolution and high sensitivity.

Next, a third reflective optical device of the present invention is characterized by including at least three reflection surfaces for bringing light fluxes from an object into focus on an image surface. In the third reflective optical device, the reflection surfaces are arranged eccentrically, and an F value in a plane containing vertices of the respective reflection surfaces is less than 1.9. The reflective optical device configured as described above is applicable to a system with requirements of high resolution and high sensitivity.

In the third reflective optical device, the F value preferably is less than 1.6.

Furthermore, among the reflection surfaces, the two reflection surfaces on the object side are given as a first reflection surface and a second reflection surface, respectively, in an order from the object side in a direction in which the light fluxes travel, and each of the first and second reflection surfaces preferably is concave in a cross-sectional shape taken along the plane.

Next, a fourth reflective optical device comprises at least three reflection surfaces for bringing light fluxes from an object into focus on an image surface, and the reflection surfaces are arranged eccentrically. Among the reflection surfaces, the reflection surface placed second from the object side in a direction in which the light fluxes travel is given as a second reflection surface, and the second reflection surface is concave in a cross-sectional shape taken in the vicinity of its vertex along a plane containing vertices of the reflection surfaces, and is convex in a cross-sectional shape taken in a direction perpendicular to the plane. The reflective optical device configured as described above is applicable to a system with requirements of higher resolution and higher sensitivity.

In the second, third, or fourth reflective optical device, the at least three reflection surfaces preferably are non-axisymmetric surfaces.

Furthermore, in the second, third, or fourth reflective optical device, the reflection surfaces preferably are four surfaces that are a first surface, a second surface, a third surface, and a fourth surface in an order from the object side in a direction in which the light fluxes travel.

The foregoing reflective optical device having four reflection surfaces preferably satisfies the relationship expressed as below:

$$26 < \alpha 3 < 56$$

where $\alpha 3$ represents an angle (deg) formed between a normal line of the third reflection surface at its vertex and an optical axis extended from the vertex of the third reflection surface to a vertex of the fourth reflection surface. In the case where $\alpha 3$ is lower than the lower limit of the range expressed by the above formula, a part of the light fluxes reflected by the fourth mirror returns to the reflection surface of the third mirror, which means the part is blocked and does not reach the image surface. In the case where $\alpha 3$ exceeds the upper limit of the foregoing range, a significant aberration occurs, thereby deteriorating the optical performance.

Furthermore, the foregoing reflective optical device preferably further includes a diaphragm for limiting the light fluxes, the diaphragm being disposed between the first reflection surface and the object.

Furthermore, the foregoing reflective optical device preferably satisfies the relationship expressed as below:

$$0.3 < d1/efy < 1.5$$

where d1 represents a distance between a center of the diaphragm and a vertex of the first reflection surface, and efy represents a focal length in the plane containing the vertices of the reflection surfaces.

Furthermore, the foregoing reflective optical device preferably satisfies the relationship expressed as below:

$$0.6 < d1/efy < 1.0$$

where d1 represents a distance between a center of the diaphragm and a vertex of the first reflection surface, and efy represents a focal length in the plane containing the vertices of the reflection surfaces.

Furthermore, the foregoing reflective optical device preferably satisfies the relationship expressed as below:

$$0.3 < d2/d4 < 1.0$$

where d2 represents a distance between a vertex of the first reflection surface and a vertex of the second reflection surface, and d4 represents a distance between a vertex of the third reflection surface and a vertex of the fourth reflection surface.

Furthermore, the foregoing reflective optical device preferably satisfies the relationship expressed as below:

$$2.6 < d4/efy < 7.5$$

where d4 represents a distance between a vertex of the third reflection surface and a vertex of the fourth reflection surface, and efy represents a focal length in the plane containing the vertices of the reflection surfaces.

Furthermore, the foregoing reflective optical device preferably satisfies the relationship expressed as below:

$$3.5 < d4/efy < 6.5$$

where d4 represents a distance between a vertex of the third reflection surface and a vertex of the fourth reflection surface, and efy represents a focal length in the plane containing the vertices of the reflection surfaces.

Furthermore, the foregoing reflective optical device preferably satisfies the relationship expressed as below:

$$0.5 < d5/efy < 2.0$$

where d5 represents a distance from a vertex of the fourth reflection surface to a center of an image surface, and efy represents a focal length in the plane containing the vertices of the reflection surfaces. When the foregoing relationships are satisfied, it is possible to avoid the blocking of a part of light fluxes by a reflection surface and the occurrence of aberration, thereby preventing optical performance from deteriorating.

Furthermore, each of the four reflection surfaces preferably is concave in a cross-sectional shape taken along the plane containing the vertices of the reflection surfaces.

Furthermore, among the reflection surfaces, the first reflection surface preferably is concave in a cross-sectional shape taken in a direction perpendicular to the plane containing the vertices of the reflection surfaces.

Furthermore, among the reflection surfaces, the third reflection surface preferably is concave in a cross sectional shape taken in a direction perpendicular to the plane containing the vertices of the reflection surfaces.

Furthermore, among the reflection surfaces, the fourth reflection surface preferably is concave in a cross-sectional shape taken in a direction perpendicular to the plane containing the vertices of the reflection surfaces.

Furthermore, the fourth reflection surface preferably is a free-form surface that is in a non-axisymmetric form and that does not have a rotational axis.

Furthermore, the fourth reflection surface preferably is a free-form surface, and the free form surface preferably is either a curved-axis Y toric surface or a curved-axis X toric surface, each of which is defined by a function $f(X,Y)$ in a rectangular coordinate system $(X, Y)$ in which the X direction is a direction perpendicular to a plane containing the center of the image surface and the vertices of the reflection surfaces and the Y direction is a direction of a tangent line at a vertex, the tangent line being contained in the foregoing plane. The curved-axis Y toric surface is such that a line obtained by connecting centers of radii of curvature of the X-direction cross sections at respective Y coordinates is a curved line, and the curved-axis X toric surface is such that a line obtained by connecting centers of radii of curvature of the Y-direction cross sections at respective X coordinates is a curved line.

Next, a first imaging device of the present invention is characterized by including any one of the above-described reflective optical devices, and a detecting means that converts a light intensity into an electric signal. With the foregoing imaging device, it is possible to obtain wide-angle and high-resolution image signals.

In the first imaging device, the detecting means preferably is a two-dimensional imaging element.

Furthermore, the detecting means has sensitivity to light rays in an infrared range.

Next, a first multi-wavelength imaging device of the present invention is characterized by including a reflective optical device that converges light fluxes with only reflection surfaces, and a detecting means that has sensitivity to light rays in a plurality of different wavelength ranges. According to the foregoing configuration of the multi-wavelength imaging device, since light fluxes are converged by using only reflection surfaces, the device can be used with respect to light fluxes in any wavelength range, from the infrared range (wavelength: 3 μm to 5 μm, or 8 μm to 12 μm), the visible range (wavelength: 400 nm to 750 nm), to the ultraviolet range (wavelength: 200 nm to 400 nm). By combining the same with a detecting means with sensitivity to a plurality of wavelength ranges, it is possible to form images in a plurality of wavelength ranges at the same time by use of one optical system. In the case where, for instance, the detecting means is sensitive to both the rays in the infrared range and in the visible range, it is possible to carry out image formation in the visible range that is suitable for image formation in the daytime and the image formation in the infrared range that is suitable for image formation at night.

In the first multi-wavelength imaging device, the plurality of different wavelength ranges preferably are not less than two wavelength ranges selected from an infrared range, a visible range, and an ultraviolet range.

Furthermore, the reflective optical device preferably is any one of the first, second, third, and fourth reflective optical devices.

Furthermore, the detecting means preferably includes a light flux separating means according to wavelengths, and a plurality of detecting surfaces that are responsive to the plurality of wavelength ranges, respectively.

Furthermore, the detecting means preferably includes, in the same detecting surface, a plurality of regions that have sensitivity to light rays in different wavelength ranges, respectively. With the multi-wavelength imaging device as described above, it is possible to form images in a plurality of wavelength ranges by using one optical system and one detecting element.

Furthermore, in a multi-wavelength imaging device that includes, in the same detecting surface, a plurality of regions that have sensitivity to light rays in different wavelength ranges, respectively, the reflective optical device preferably is any one of the first, second, third, and fourth reflective optical devices.

Next, a first vehicle-mounted monitor of the present invention is characterized by including the foregoing imaging device, and a display means that conveys an obtained image to a driver. With the vehicle-mounted monitor configured as described above, it is possible to obtain position information about a vehicle driving ahead, a pedestrian, etc. with high accuracy.

Next, a second vehicle-mounted monitor of the present invention is characterized by including the foregoing multi-wavelength imaging device, and a display means that conveys an obtained image to a driver.

Next, a fifth reflective optical device of the present invention is characterized by including a plurality of optical members, each in a shell-like shape, that are opposed to each other and bonded integrally so that a hollow space is formed therein and that have at least one reflection surface on surfaces on hollow space sides. With the foregoing reflective optical device in which a plurality of shell-shaped optical members are opposed and bonded integrally, it is possible to achieve cost reduction and miniaturization both compatibly at the same time.

In the fifth reflective optical device, at least one of the reflection surface preferably is a free-form surface that does not have a rotational axis. Since the reflective optical device configured as described above includes a reflection surface that is a free-form surface, aberration-correcting capability of an eccentric optical system can be obtained, and hence, a configuration of an optical system with an optical path that conventionally has not been available is obtained. Furthermore, the blocking by the reflection surface itself is avoided, and an optical system with an increased angle of vision can be obtained.

Furthermore, the plurality of optical members preferably are two optical members that are a front optical member and a rear optical member, and the hollow space preferably is formed by providing the front optical member and the rear optical member integrally so that an opened side of the shell-like shape of the front optical member and an opened side of the shell-like shape of the rear optical member face and are bonded to each other.

Furthermore, the optical members preferably are resin moldings, and a metallic thin film preferably is formed on the reflection surface. This configuration allows the substantially whole structure to be formed with resin moldings, and metallic films to be formed only on the reflection surfaces. Therefore, it is possible to obtain a low-cost reflective optical device.

Furthermore, a material of the metallic thin film preferably is at least one selected from the group consisting of aluminum, gold, silver, copper and zinc.

Furthermore, a $SiO_2$ thin film preferably also is formed over the reflection surface. By thus configuring the reflective optical device, it is possible to prevent the reflectance from decreasing.

Furthermore, the optical members preferably are made of a metallic material.

Furthermore, the optical members preferably are made of at least one metallic material selected from the group consisting of aluminum, gold, silver, copper, and zinc.

Furthermore, a metallic thin film preferably is formed on the reflection surface of the optical members made of the metallic material. By thus configuring the reflective optical device, the device has an increased reflectance.

Furthermore, a material of the metallic thin film is at least one selected from the group consisting of aluminum, gold, silver, copper, and zinc.

Furthermore, in the reflective optical device in which a metallic thin film is formed on the reflection surface of the optical members made of the metallic material, a $SiO_2$ film preferably also is formed over the reflection surface. This configuration of the reflective optical device prevents the reflectance from decreasing.

Furthermore, in the fifth reflective optical device described above, at least one of the plurality of optical members preferably includes an aperture for image formation. In the reflective optical device configured as described above, it is possible to provide a window member at the aperture so that the window member transmits necessary light fluxes.

Furthermore, a window member that transmits light fluxes in a wavelength range necessary for image formation preferably is provided at the aperture for image formation. The reflective optical device allows necessary light fluxes to enter therein, and at the same time prevents dust and water droplets from entering from the external into the internal space of the hollow structure formed by integrally providing the plurality of optical members.

Furthermore, a window member that transmits light fluxes in a wavelength range necessary for image formation and that blocks light fluxes in the other wavelength ranges preferably is provided at the aperture for image formation. The reflective optical device configured as described above by no means allows light fluxes in an unnecessary wavelength range to enter the reflective optical device, thereby obtaining an image with an excellent contrast.

Furthermore, a window member made of a material selected from the group consisting of germanium, silicon, polyethylene, $CaF_2$, $BaF_2$, and ZnSe preferably is provided at the aperture for image formation. In the case where germanium or silicon is used for forming the window member, it is possible to block light fluxes in the visible range while transmitting light fluxes in the infrared range. This enables the image formation by using light fluxes in the infrared range, which does not affect light fluxes in the visible range. In the case where polyethylene or ZnSe is used for forming the window member, it is possible to transmit light fluxes in the visible range and in the infrared range both, thereby making the image formation by using light fluxes in the visible range and in the infrared range both.

Furthermore, the window member preferably is in a flat plate form. This provides easy processing and cost reduction, and the adding of the same to the optical member is easy as well.

Furthermore, the window member preferably has a lens function. This makes it possible also to cause the window member to provide a part of the optical power contributing to the image formation, thereby enhancing the aberration correcting capability of the overall system, and further, improving the optical performance.

Furthermore, a window member that has an optical property of preventing at least infrared rays in a specific wavelength range among incident infrared rays from passing therethrough preferably is provided at the aperture for image formation. With the reflective optical device thus configured, it is possible to achieve cost reduction and miniaturization of the same at the same time compatibly, while it is possible to prevent light fluxes in unnecessary wavelength ranges from entering the reflective optical devices. Therefore, it is possible to obtain an image with an excellent contrast.

In the reflective optical device in which a window member that has an optical property of preventing at least infrared rays in a specific wavelength range among incident infrared rays from passing therethrough is provided at the aperture for image formation, the window member preferably has an optical property of reflecting infrared rays, and preferably is composed of a transparent base on which a dielectric multilayer film is provided.

Furthermore, the transparent base preferably is made of a glass material.

Furthermore, the transparent base preferably is made of a resin material.

Furthermore, the transparent base preferably is made of at least one selected from the group consisting of $CaF_2$, $BaF_2$, and ZnSe.

Furthermore, the window member preferably is made of a glass material having an optical property of absorbing infrared rays.

Furthermore, the window member preferably is made of a resin material having an optical property of absorbing infrared rays.

Furthermore, the window member preferably prevents infrared rays in a near infrared range from passing therethrough. With the reflective solid-state optical device thus configured, in the case where the member with photosensitivity has sensitivity to light fluxes in the visible and far infrared ranges both, it is possible to suppress the incidence of unnecessary components of light on the member having sensitivity to the respective wavelength ranges.

Furthermore, the near infrared range preferably is a range of 700 nm to 1100 nm.

Furthermore, the window member preferably is in a flat plate form. This provides easy processing and cost reduction, and the adding of the same to the optical member is easy as well.

Furthermore, the window member preferably has a lens function. This makes it possible to also cause the window member to provide a part of the optical power contributing to the image formation, thereby enhancing the aberration correcting capability of the overall system, and further, improving the optical performance.

Furthermore, a film having an optical property of not reflecting at least infrared rays in a specific wavelength range among incident infrared rays preferably is formed on each reflection surface. The reflective optical device thus configured allows only spectrum components necessary for image formation, among the light fluxes having entered through the aperture, to contribute to the image formation, thereby avoiding the light fluxes in an unnecessary wavelength range. As a result, an image with an excellent contrast can be obtained. Furthermore, it is possible to reduce the costs, since the device is composed of a decreased number of component parts.

In the reflective optical device in which a film having an optical property of not reflecting at least infrared rays in a specific wavelength range among incident infrared rays preferably is formed on each reflection surface, the film preferably has an optical property of not reflecting infrared rays in a range of wavelengths longer than those in a visible range. This configuration of the reflective optical device allows the light fluxes used in image formation to be composed of only spectrum components in the visible range. Therefore, images with desirable color tones can be formed.

Furthermore, the range of wavelengths longer than those in the visible range preferably is a range of wavelengths longer than 700 nm.

Furthermore, the film preferably has an optical property of not reflecting infrared rays in a near infrared range. According to the reflective optical device thus configured, in the case where the member with photosensitivity has sensitivity to light fluxes in the visible and far infrared ranges both, it is possible to suppress the incidence of unnecessary components of light to the member having sensitivity to the respective wavelength ranges.

Furthermore, the near infrared range preferably is a range of 700 nm to 1100 nm.

Furthermore, at least one of the plurality of optical members preferably includes an aperture for allowing an image to be formed on a member with photosensitivity.

Next, a first reflective solid-state optical device of the present invention is characterized by including a solid device body formed with an optical medium having an optical property of preventing at least infrared rays in a specific wavelength range among incident infrared rays from passing therethrough. On the device body, at least one reflection surface is formed, which is composed of a surface of the device body and a film formed on the surface of the device body. With the reflective optical device thus configured, it is possible to achieve cost reduction and miniaturization both at the same time compatibly.

In the first reflective solid-state optical device, the surface of the device body constituting the at least one reflection surface preferably is formed to be a free-form surface that does not have a rotational axis. Since the reflective optical device thus configured has a free-form surface as the reflection surface, aberration-correcting capability of an eccentric optical system can be obtained, and hence, a configuration of an optical system with an optical path that conventionally has not been available is obtained. Furthermore, the blocking by the reflection surface itself is avoided, and an optical system with an increased angle of vision can be obtained.

Furthermore, the optical medium preferably is made of a material having an optical property of preventing infrared rays in a range of wavelengths longer than those in a visible range. This configuration of the reflective optical device allows the light fluxes used in image formation to be composed of only spectrum components in the visible range. Therefore, images with desirable color tones can be formed.

Furthermore, the range of wavelengths longer than those in the visible range preferably is a range of wavelengths longer than 700 nm.

Furthermore, the optical medium preferably is made of a material having an optical property of preventing infrared rays in a near infrared range from passing therethrough. According to the configuration of the reflective solid-state optical device, it is possible to suppress the incidence of unnecessary components of light to members having sensitivity to the respective wavelength ranges.

Furthermore, the near infrared range preferably is a range of 700 nm to 1100 nm.

Next, a second imaging device of the present invention is characterized by including the fifth reflective optical device, wherein an imaging element is provided at a portion of the reflective optical device where an image is formed. In the case of the imaging device thus configured, it is possible to achieve miniaturization, cost reduction and improvement of contrast.

In the second imaging device, the imaging element preferably has sensitivity to a visible range.

Next, a third imaging device of the present invention is characterized by including the fifth reflective optical device, wherein an imaging element having sensitivity to a visible range is provided at a portion of the reflective optical device where an image is formed. In the case of the imaging device thus configured, it is possible to achieve miniaturization, cost reduction, and improvement of contrast.

Next, a fourth imaging device of the present invention is characterized by including the fifth reflective optical device, wherein an imaging element having sensitivity to a visible range and an infrared range is provided at a portion of the reflective optical device where an image is formed.

Next, a fifth imaging device of the present invention is characterized by including the aforementioned reflective optical device having the window member that prevents infrared rays in a near infrared range from passing therethrough, or including the aforementioned reflective optical device having an optical property of not reflecting infrared rays in a near infrared range, wherein an imaging element having sensitivity to a visible range and an infrared range is provided at a portion of the reflective optical device where an image is formed.

Next, a sixth imaging device of the present invention is characterized by including the first reflective solid-state optical device, wherein an imaging element is provided at a portion of the reflective solid-state optical device where an image is formed. In the case of the imaging device thus configured, it is possible to achieve miniaturization, cost reduction, and improvement of contrast.

In the sixth imaging device, the imaging element preferably has sensitivity to a visible range.

Next, a seventh imaging device of the present invention is characterized by including a reflective solid-state optical device in which an optical medium is made of a material having an optical property of preventing infrared rays in a near infrared range from passing therethrough, wherein an imaging element having sensitivity to a visible range and an infrared range is provided at a portion of the reflective solid-state optical device where an image is formed.

Next, a first video camera device of the present invention is characterized by including the second imaging device.

Next, a second video camera device of the present invention is characterized by including the sixth imaging device. In the video camera thus configured, the imaging device is miniaturized and cost-reduced and is capable of achieving a high contrast. Therefore, the video camera device also can be miniaturized and cost-reduced, and exhibits high performance.

Next, a third vehicle-mounted monitor of the present invention is characterized by including the second imaging device.

Next, a fourth vehicle-mounted imaging device of the present invention is characterized by including the sixth imaging device. With the vehicle-mounted monitor thus configured, it is possible to detect the deviation of the vehicle from a traffic lane, a vehicle driving ahead, an obstacle ahead, etc. Besides, by displaying the image on a display device provided at a driving seat, it is possible to support human vision.

BEST MODE FOR CARRYING OUT THE INVENTION

Figure 1:
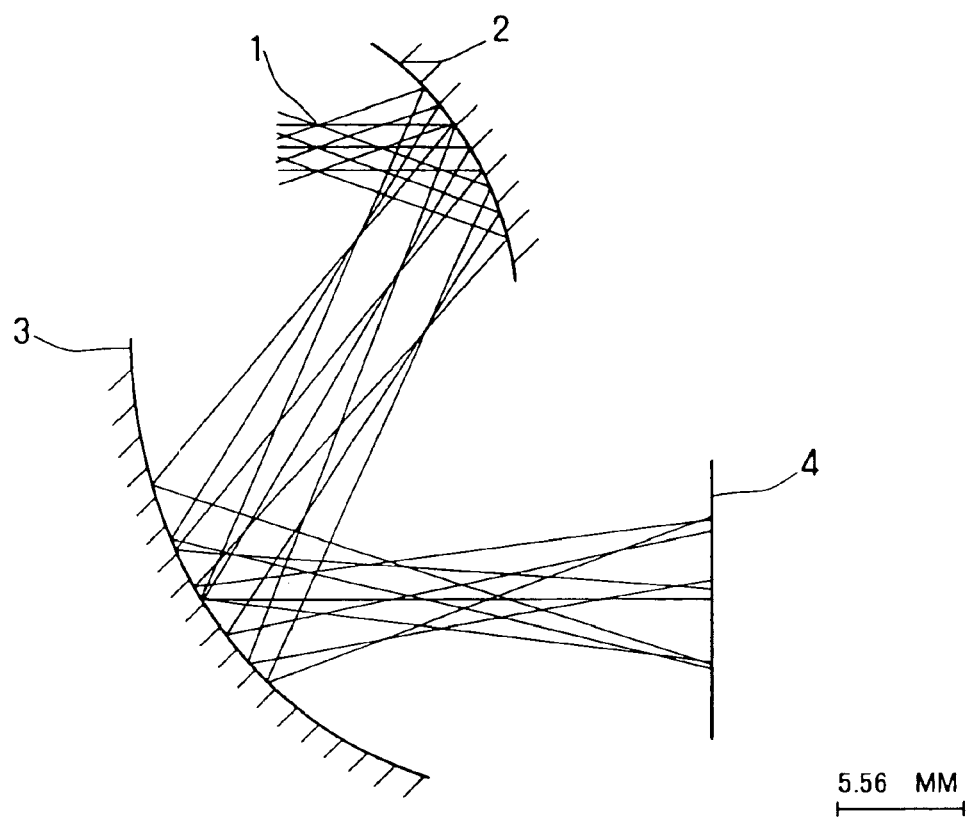
FIG. 1 is a view illustrating a configuration of a reflective optical device according to a first embodiment of the present invention.

The following description will depict embodiments of the present invention, while referring to the drawings.
First Embodiment FIG. 1 is a view illustrating a configuration of a reflective optical device according to a first embodiment of the present invention. The reflective optical device shown in the figure includes a diaphragm 1, a first mirror 2, a second mirror 3, and an image surface 4. The first mirror 2 and the second mirror 3 are arranged obliquely to the optical axes so that light fluxes are reflected obliquely.

The foregoing figure illustrates a cross section of the reflective optical device taken along a plane containing the center of the image surface 4 and the vertices of the mirrors 2 and 3, which shows that the reflection surfaces of the mirrors 2 and 3 both are concave. Light fluxes from an object are limited by the diaphragm 1, reflected by the first and second mirrors 2 and 3, and then, projected to the image surface 4, where an image is formed.

Each of the respective surfaces of the first and second mirrors 2 and 3 is a non-axisymmetric surface: it is a surface whose normal line at a vertex is not an axis of rotational symmetry, unlike a normal spherical surface and an axisymmetric non-spherical surface. In the case where a reflection surface is in the non-axisymmetric form is a free-form surface, the freedom of design is increased, the angle of view is widened, and the optical performance is enhanced. Here, the free-form surface means a surface that does not have a rotational axis like the rotational axis that a toric surface or the like possesses (this applies to the embodiments described below).

Figure 2:
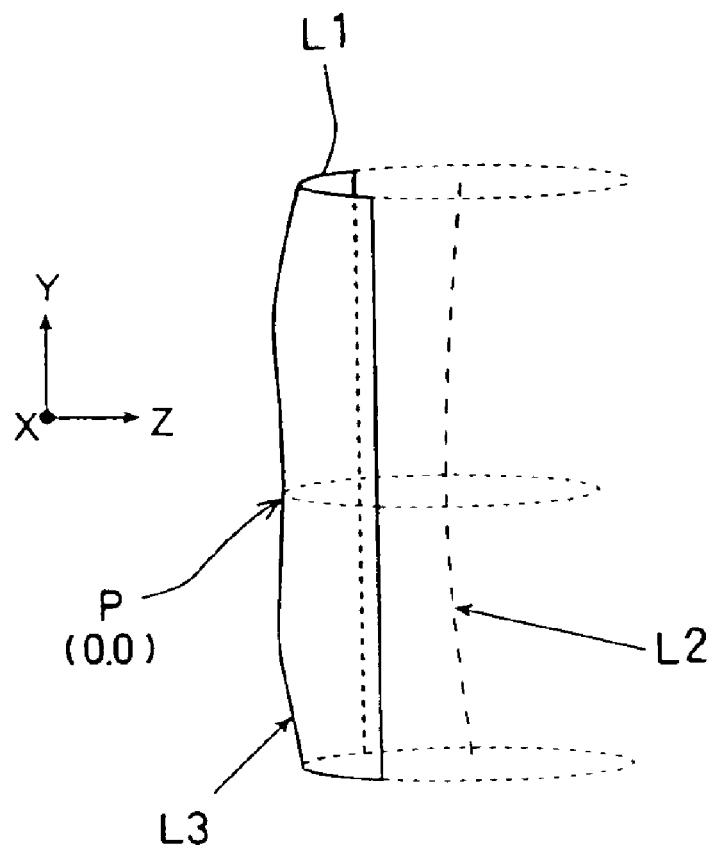
FIG. 2 is a perspective view for explaining a shape of a reflection surface.

An example of the free-form surface is a curved-axis Y toric surface as shown in FIG. 2. The curved-axis Y toric surface is a surface as follows: in a rectangular coordinate system (X, Y) in which the X direction is a direction perpendicular to a plane containing a center of an image surface and each vertex and the Y direction is a direction of a tangent line at a vertex that is contained in the foregoing plane, a line obtained by connecting the centers of radii of curvature of the X-direction cross sections at respective Y coordinates is a curved line.

In FIG. 2, L1 denotes an X-direction cross section (arc), L2 denotes a line obtained by connecting X-direction curvatures (non-arc curved line), L3 denotes a Y-direction bus-bar shape (non-arc), and P denotes a vertex. Another example of a free-form surface is a curved-axis X toric surface in which X and Y are interchanged with each other.

With the premise that the vertex of the plane is the origin and the direction in which an incident light flux travels forward is positive, the curved-axis Y toric surface is expressed as a sag Z (mm) from the vertex at a point with the coordinates x (mm) and y (mm), which is expressed by the formulae (1) through (5) shown below:

$$Z = M(y) + S(x, y) \quad \text{Formula (1)}$$

$$M(y) = \frac{\left(\frac{y^2}{Rdy}\right)}{1 + \sqrt{1 - \left(\frac{y}{Rdy}\right)^2}} + YADy^4 + YAEy^6 + YAFy^8 + YAGy^{10} + YAODy^3 + YAOEy^5 + YAOFy^7 + YAOGy^9 \quad \text{Formula (2)}$$

$$S(x, y) = \frac{\frac{x^2}{Rds} - 2x \cdot \sin\theta}{\cos\theta + \sqrt{\cos^2\theta - \left(\frac{x}{Rds}\right)^2 + \frac{2x \cdot \sin\theta}{Rds}}} + XADx^4 + XAEx^6 + XAFx^8 + XAGx^{10} \quad \text{Formula (3)}$$

$$Rds = Rdx(1 + BCy^2 + BDy^4 + BEy^6 + BFy^8 + BGy^{10} + BOCy + BODy^3 + BOEy^5 + BOFy^7 + BOGy^9) \quad \text{Formula (4)}$$

$$\theta = QCy^2 + QDy^4 + QEy^6 \quad \text{Formula (5)}$$

where:

M(y) represents an expression that expresses a non-arc as a Y-direction cross section containing the vertex, Rdy(mm) represents a radius of curvature in the Y direction, YAD, YAE, YAF, and YAG represent even-order constants contributing in the Y direction, respectively, and YAOD, YAOE, YAOF, and YAOG represent odd-order constants, respectively; and S(x, y) represents an expression that expresses an X-direction cross section, Rds represents a function that expresses a radius of curvature in the X direction at each y coordinate, Rdx(mm) represents a radius of curvature in the X direction at the center, BC, BD, BE, BF, and BG represent even-order constants, respectively, BOC, BOD, BOE, BOF, and BOG represent odd-order constants, respectively, XAD, XAE, XAF, and XAG represent even-order constants contributing in the X direction, respectively, θ(rad) represents a function that determines a twist angle of the surface, and QC, QD, and QE represent twist coefficients, respectively.

Likewise; with the premise that the vertex of the plane is the origin and the direction in which an incident light flux travels forward is positive, the curved-axis X toric surface is expressed as a sag Z (mm) from the vertex at a point with the coordinates x(mm) and y (mm), which is expressed by the formulae (6) through (10) shown below:

$$Z = M(x) + S(x, y) \quad \text{Formula (6)}$$

$$M(x) = \frac{\left(\frac{x^2}{Rdx}\right)}{1 + \sqrt{1 - \left(\frac{x}{Rdx}\right)^2}} + XADx^4 + XAEx^6 + XAFx^8 + XAGx^{10} \quad \text{Formula (7)}$$

$$S(x, y) = \frac{\frac{y^2}{Rds} - 2y \cdot \sin\theta}{\cos\theta + \sqrt{\cos^2\theta - \left(\frac{y}{Rds}\right)^2 + \frac{2y \cdot \sin\theta}{Rds}}} + YADy^4 + YAEy^6 + YAFy^8 + YAGy^{10} + YAODy^3 + YAOEy^5 + YAOFy^7 + YAOGy^9 \quad \text{Formula (8)}$$

$$Rds = Rdy(1 + BCx^2 + BDx^4 + BEx^6 + BFx^8 + BGx^{10} + BOCx + BODx^3 + BOEx^5 + BOFx^7 + BOGx^9) \quad \text{Formula (9)}$$

$$\theta = QCx^2 + QDx^4 + QEx^6 \quad \text{Formula (10)}$$

where:

M(x) represents an expression that expresses a non-arc as a X-direction cross section containing the vertex, S(x, y) represents an expression that expresses a Y-direction cross section;

Rdx(mm) represents a radius of curvature in the X direction, XAD, XAE, XAF, and XAG represent even-order constants contributing in the X direction, respectively; and Rds represents a function that expresses a radius of curvature in the Y direction at each x coordinate, Rdy(mm) represents a radius of curvature in the Y direction at the center, BC, BD, BE, BF, and BG represent even-order constants, respectively, BOC, BOD, BOE, BOF, and BOG represent odd-order constants, respectively, YAD, YAE, YAF, and YAG represent even-order constants contributing in the Y direction, respectively, YAOD, YAOE, YAOF, and YAOG represent odd-order constants, respectively, BOC, BOD, BOE, BOF, and BOG represent odd-order constants, respectively, θ(rad) represents a function that determines a twist angle of the surface, and QC, QD, and QE represent twist coefficients, respectively.

Furthermore, the relationship expressed by the formula (11) below preferably is satisfied:

$$0.3 < d1/efy < 1.5 \quad \text{Formula (11)}$$

where d1 represents a distance between a center of the diaphragm and the vertex of the first mirror 2, and efy represents a focal length in a plane containing the center of the image surface 4 and the vertices of the first and second mirrors 2 and 3.

Furthermore, the relationship expressed by the formula (12) below preferably is satisfied:

$$1.0 < d2/efy < 4.0 \quad \text{Formula (12)}$$

where d2 represents a distance between the vertex of the first mirror 2 and the vertex of the second mirror 3.

When the formulae (11) and (12) are satisfied, it is possible to suppress aberration, thereby preventing deterioration of the optical performance.

Tables 1 and 2 show examples of concrete numerical values in the present embodiment. In the tables, M1 and M2 indicate the first mirror 2 and the second mirror 3, respectively. In Table 1, M1 and M2 both have curved-axis Y toric surfaces, respectively, while in Table 2, M1 and M2 both have curved-axis X toric surfaces, respectively.

Further, efy represents a focal length of the entire system in the y direction, efx represents a focal length of the entire system in the x direction, d1 represents a distance (mm) from the center of the diaphragm 1 to the vertex of the first mirror 2, d2 represents a distance (mm) from the vertex of the first mirror 2 to the vertex of the second mirror 3, d3 represents a distance (mm) from the vertex of the second mirror 3 to the image surface 4, α1 represents an angle (deg) formed by a normal line of the first mirror 2 and the optical axis, and α2 represents an angle (deg) formed by a normal line of the second mirror 3 and the optical axis. In the examples shown in Table 2, the image surface is arranged with a tilt with respect to the optical axis, and the angle is set to α3.

In the examples shown in Tables 1 and 2, Rdy of M1 sand that of M2 are both negative. This means that the surfaces of M1 and M2 both are concave in the Y direction (this applies to the examples shown in Tables 3 through 13). Besides, Rdx of M1 and that of M2 are both negative. This means that the surfaces of M1 and M2 both are concave in the X direction.

TABLE 1

| | efy = 8.59 efx = 29.58 | |
|---|---|---|
| Diaphragm | ⌀2.0 | |
| | | d1:6.61 |
| M1 | α1:30 | |
| | rdy:−15.07698 | rdx: −161.387 |
| | YAD:1.4254 × 10⁻⁵ | |
| | YAOD:−7.5192 × 10⁻⁴ | YAOE:1.6213 × 10⁻⁵ |
| | BC:9.2330 × 10⁻³ | |
| | BOD:3.4719 × 10⁻³ | |
| | | d2:23.41 |
| M2 | α2:30 | |
| | rdy:−22.108 | rdx:−56.202 |
| | YAD:−2.2097 × 10⁻⁵ | |
| | YAOD:3.3323 × 10⁻⁴ | YAOE:2.7018 × 10⁻⁷ |

TABLE 1-continued efy = 8.59 efx = 29.58

|  |  |  |  |
|---|---|---|---|
|  | BC:−1.7039 × $10^{-3}$ |  |  |
|  | BOD:7.7878 × $10^{-5}$ |  |  |
|  |  |  | d3:22.16 |
| Image Surface |  | α3:0 |  |

TABLE 2 efy = 9.75 efx = 24.94

| | | | | |
|---|---|---|---|---|
| Diaphragm | | ⌀3.0 | | |
| | | | | d1:8.15 |
| M1 | | α1:30 | | |
| | rdy:−15.40531 | rdx:−78.23718 | | |
| | YAD:−1.11104 × $10^{-6}$ | YAE:−7.94940 × $10^{-6}$ | YAF:3.20283 × $10^{-7}$ | YAG:5.58089 × $10^{-10}$ |
| | YAOD:1.28434 × $10^{-3}$ | YAOE:1.02160 × $10^{-5}$ | YAOF:−3.52620 × $10^{-7}$ | YAOG:1.28002 × $10^{-8}$ |
| | XAD:2.97163 × $10^{-5}$ | XAE:2.42403 × $10^{-6}$ | | |
| | BC:−4.08445 × $10^{-4}$ | BD:−1.37960 × $10^{-4}$ | | |
| | QC:1.45193 × $10^{-4}$ | QD:−2.89601 × $10^{-6}$ | | |
| | | | | d2:17.89 |
| M2 | | α2:30 | | |
| | rdy:−14.82636 | rdx:−58.27511 | | |
| | YAD:−1.41004 × $10^{-5}$ | YAE:8.10057 × $10^{-7}$ | YAF:1.08431 × $10^{-8}$ | YAG:−3.22948 × $10^{-9}$ |
| | YAOD:−2.08556 × $10^{-4}$ | YAOE:3.49859 × $10^{-6}$ | YAOF:−9.93788 × $10^{-8}$ | YAOG:−3.43238 × $10^{-9}$ |
| | XAD:9.91702 × $10^{-7}$ | XAE:−1.65342 × $10^{-6}$ | | |
| | BC:−8.01946 × $10^{-4}$ | BD:3.67792 × $10^{-5}$ | | |
| | QC:−3.07422 × $10^{-4}$ | QD:−1.64131 × $10^{-6}$ | | |
| | | | | d3:15.02 |
| Image Surface | | α3:23.74 | | |

Figure 3:
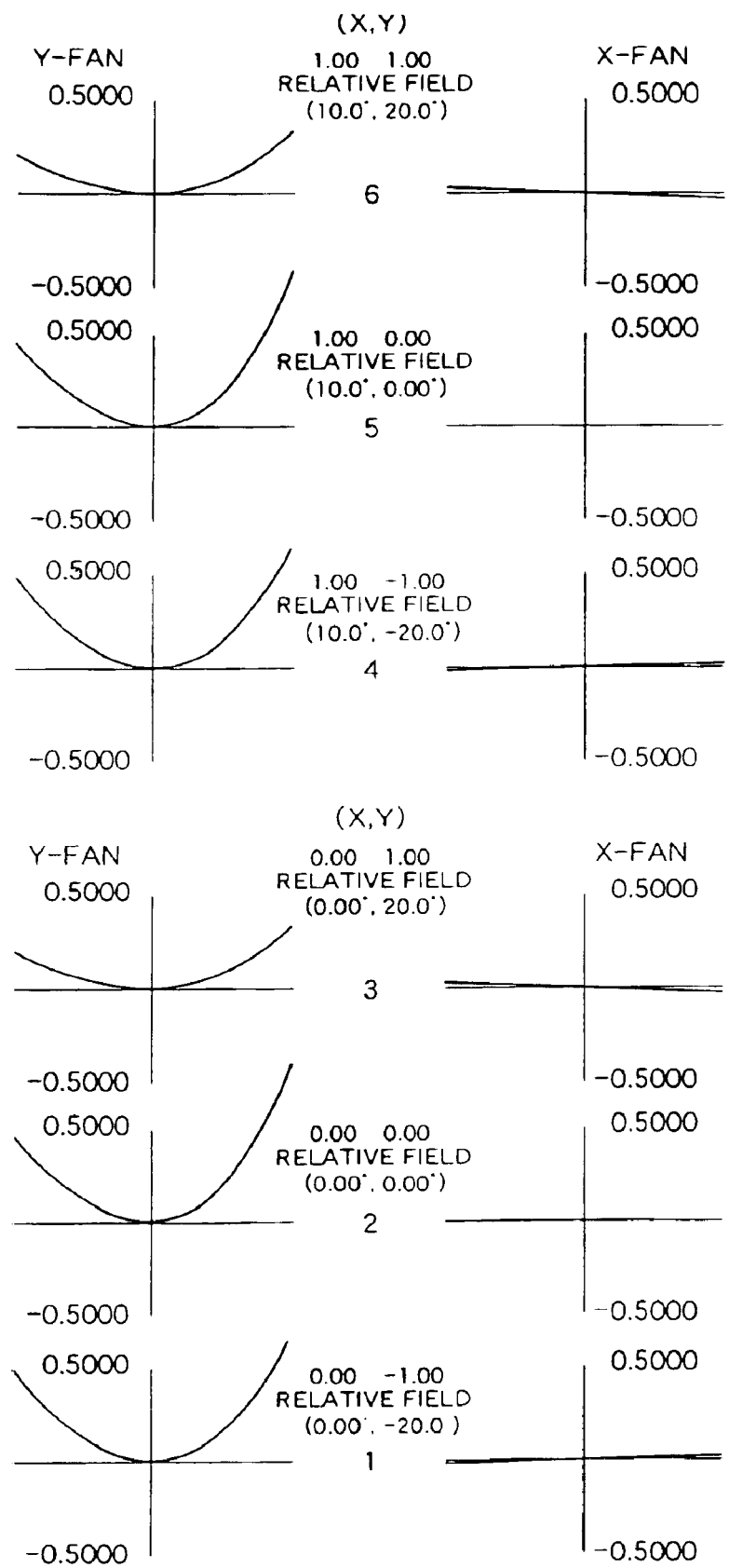
FIG. 3 is an aberration diagram for illustrating the optical performance of the reflective optical device according to the first embodiment of the present invention.
Figure 4:
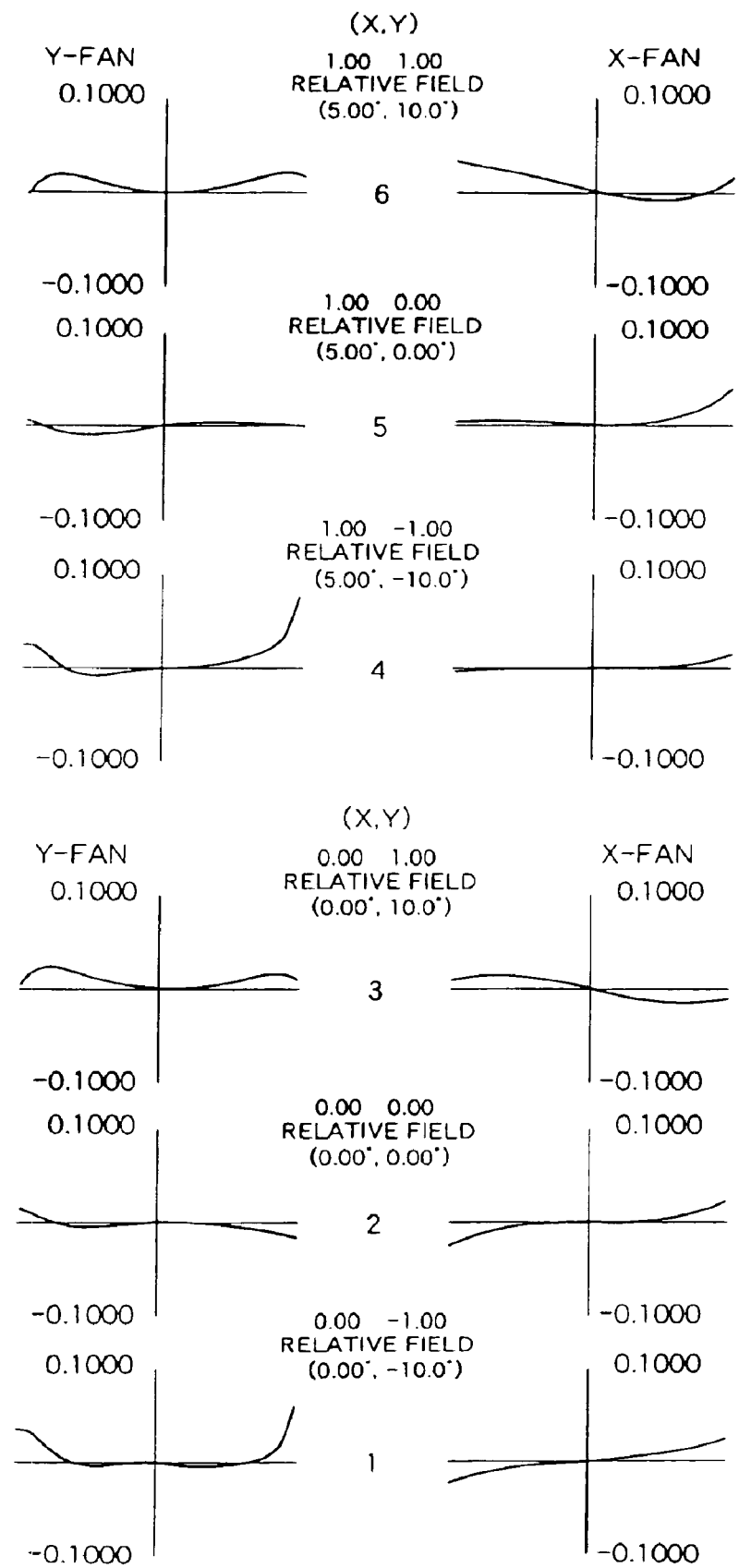
FIG. 4 is an aberration diagram for illustrating the optical performance of the reflective optical device according to the first embodiment of the present invention.

According to the present embodiment, two mirrors with curved-axis toric surfaces, each of which has a high-level capability of aberration correction, are eccentrically arranged. Therefore, it is possible to guide light fluxes to an image surface without blocking the same, thereby allowing excellent image formation. Thus, it is possible to provide a high-performance reflective optical device with a wider angle of view. FIGS. 3 and 4 illustrate the examples shown in Tables 1 and 2.

Incidentally, in the present embodiment, the shape of the mirror surface is that defined by the formulae (1) through (5), or that defined by the formulae (6) through (10), but it may be a surface in a form defined by different formulae as long as it is a similar surface.

Second Embodiment

Figure 5:
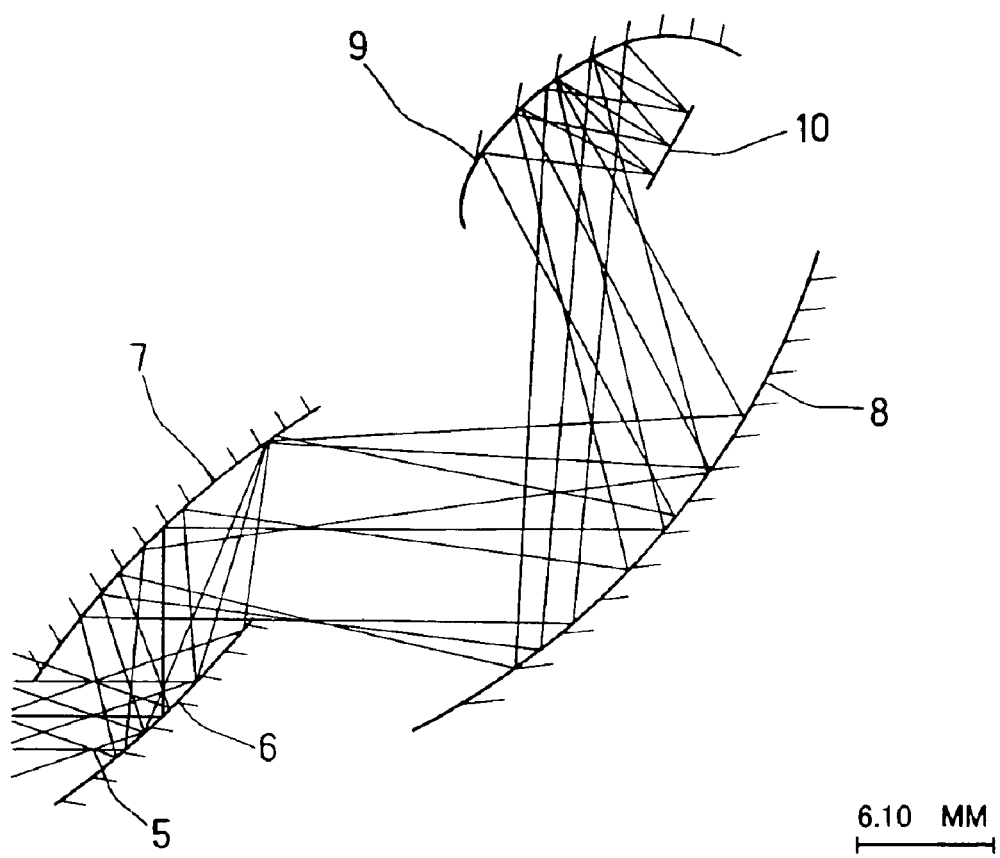
FIG. 5 is a view illustrating a configuration of a reflective optical device according to a second embodiment of the present invention.
Figure 6:
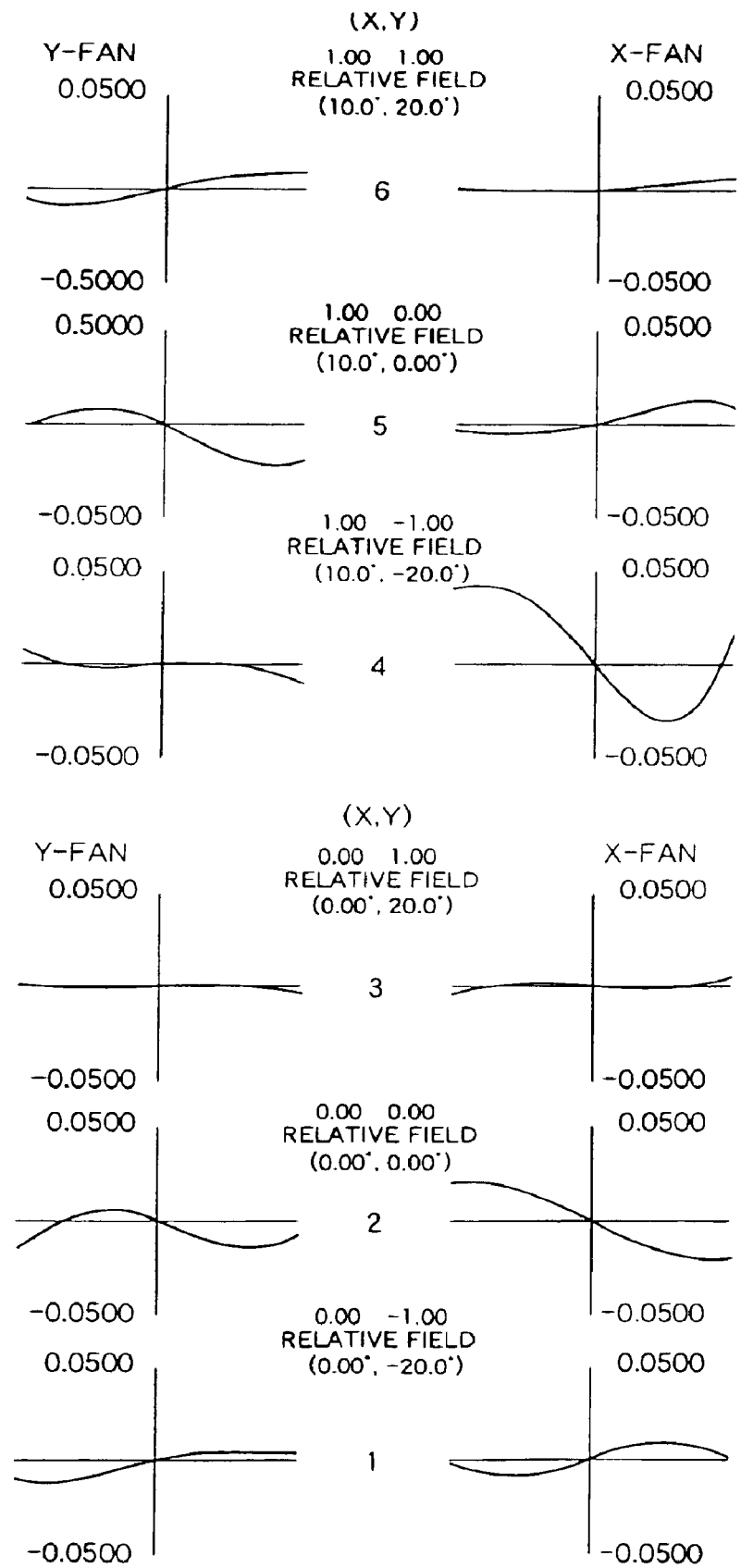
FIG. 6 is an aberration diagram for illustrating the optical performance of the reflective optical device according to the second embodiment of the present invention.
Figure 7:
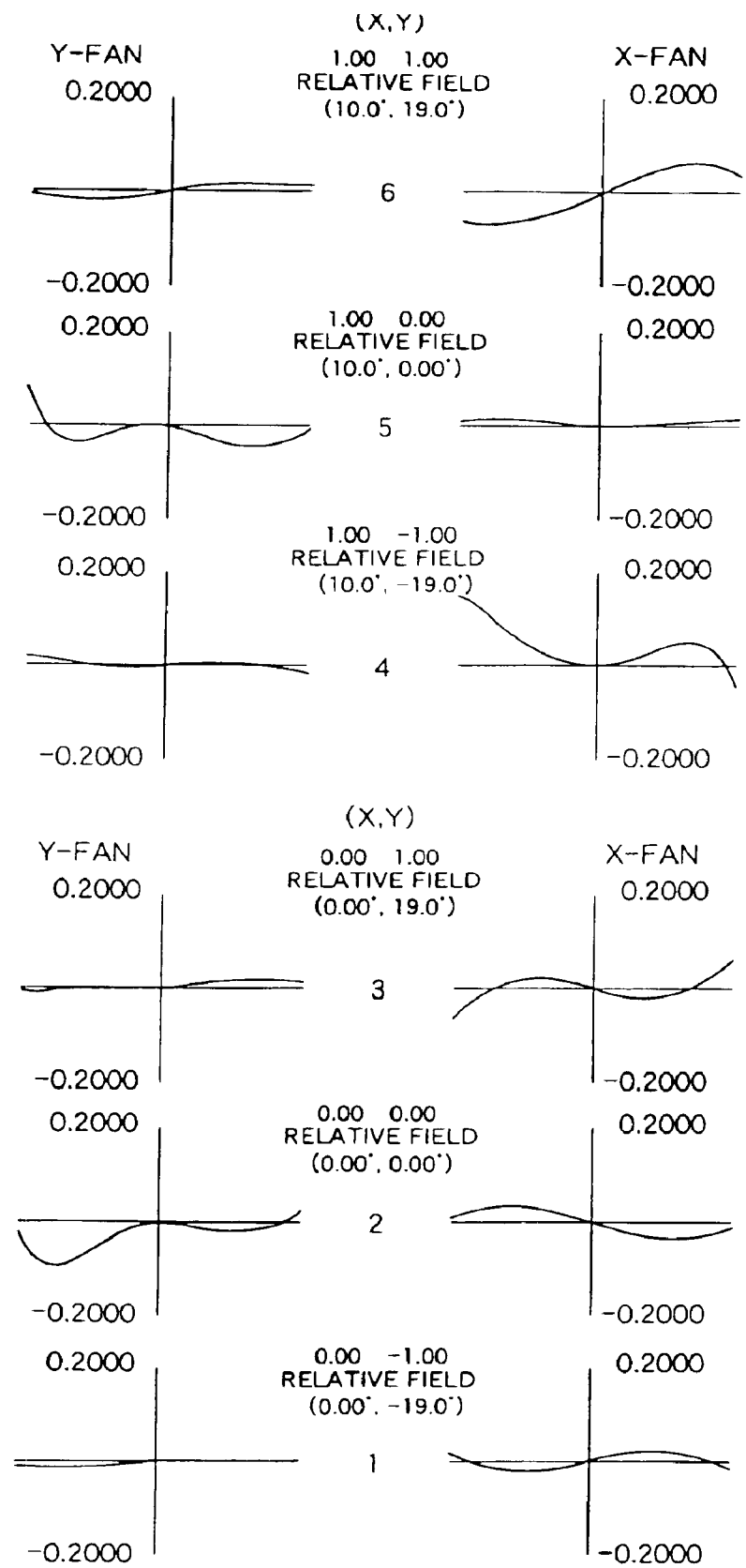
FIG. 7 is an aberration diagram for illustrating the optical performance of the reflective optical device according to the second embodiment of the present invention.
Figure 8:
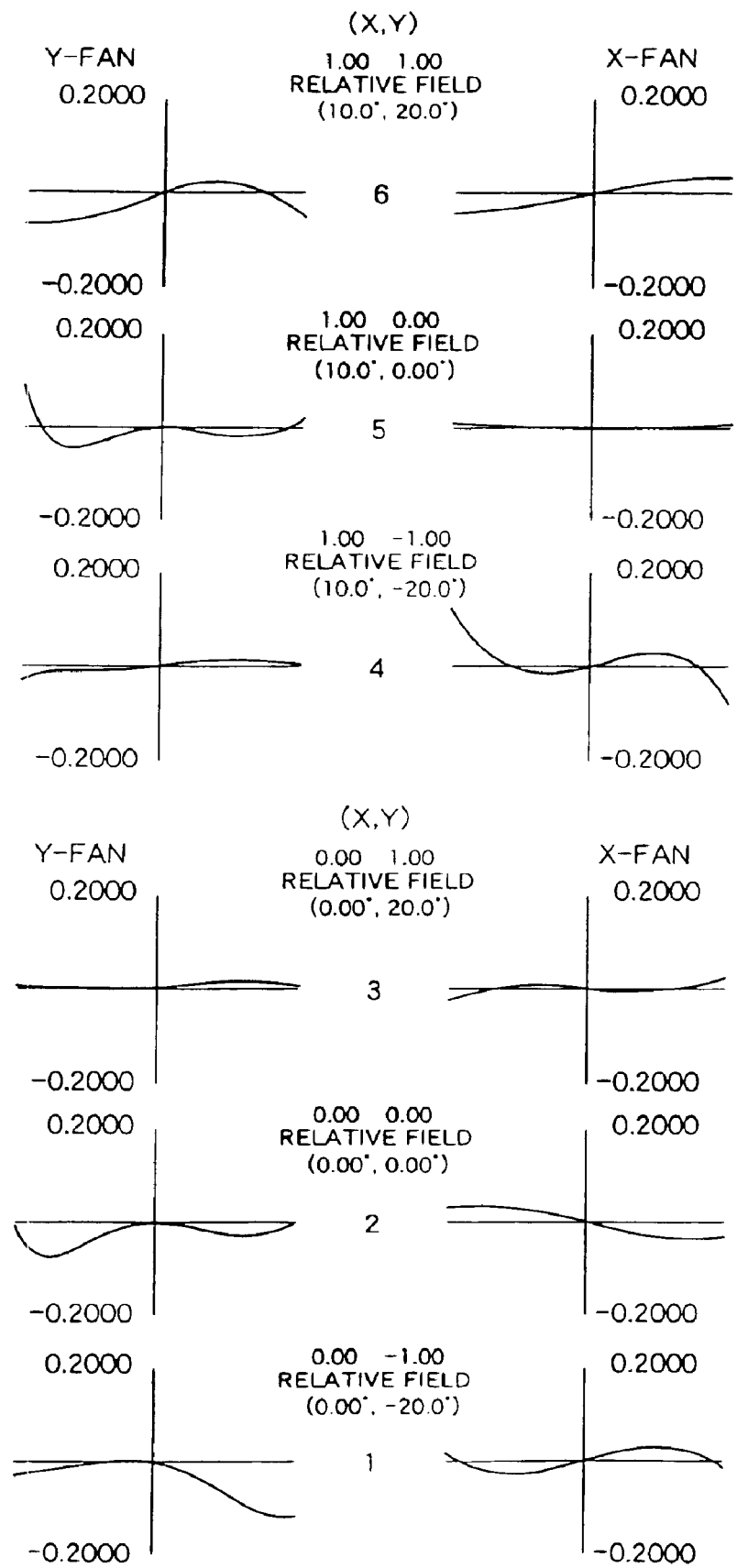
FIG. 8 is an aberration diagram for illustrating the optical performance of the reflective optical device according to the second embodiment of the present invention.
Figure 9:
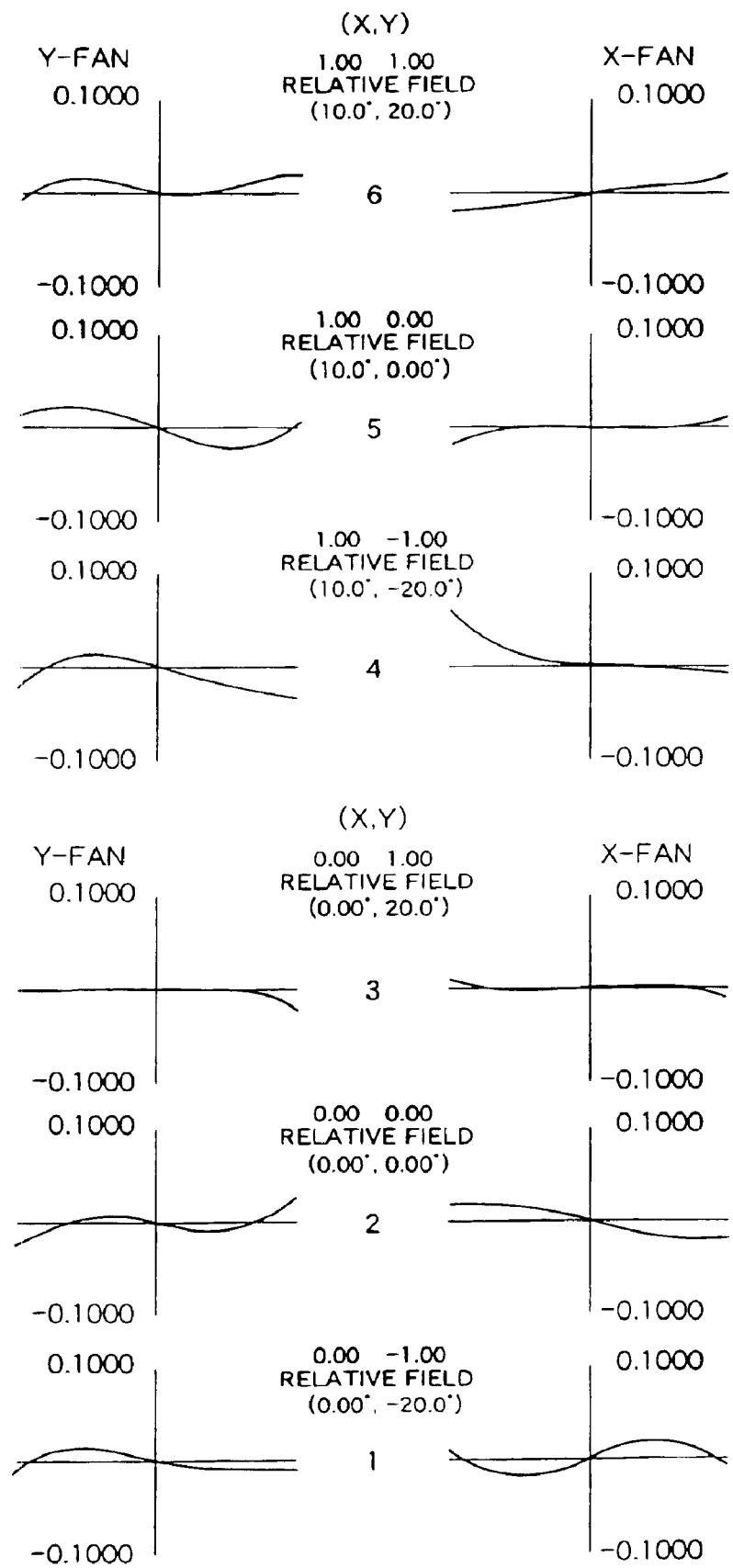
FIG. 9 is an aberration diagram for illustrating the optical performance of the reflective optical device according to the second embodiment of the present invention.
Figure 10:
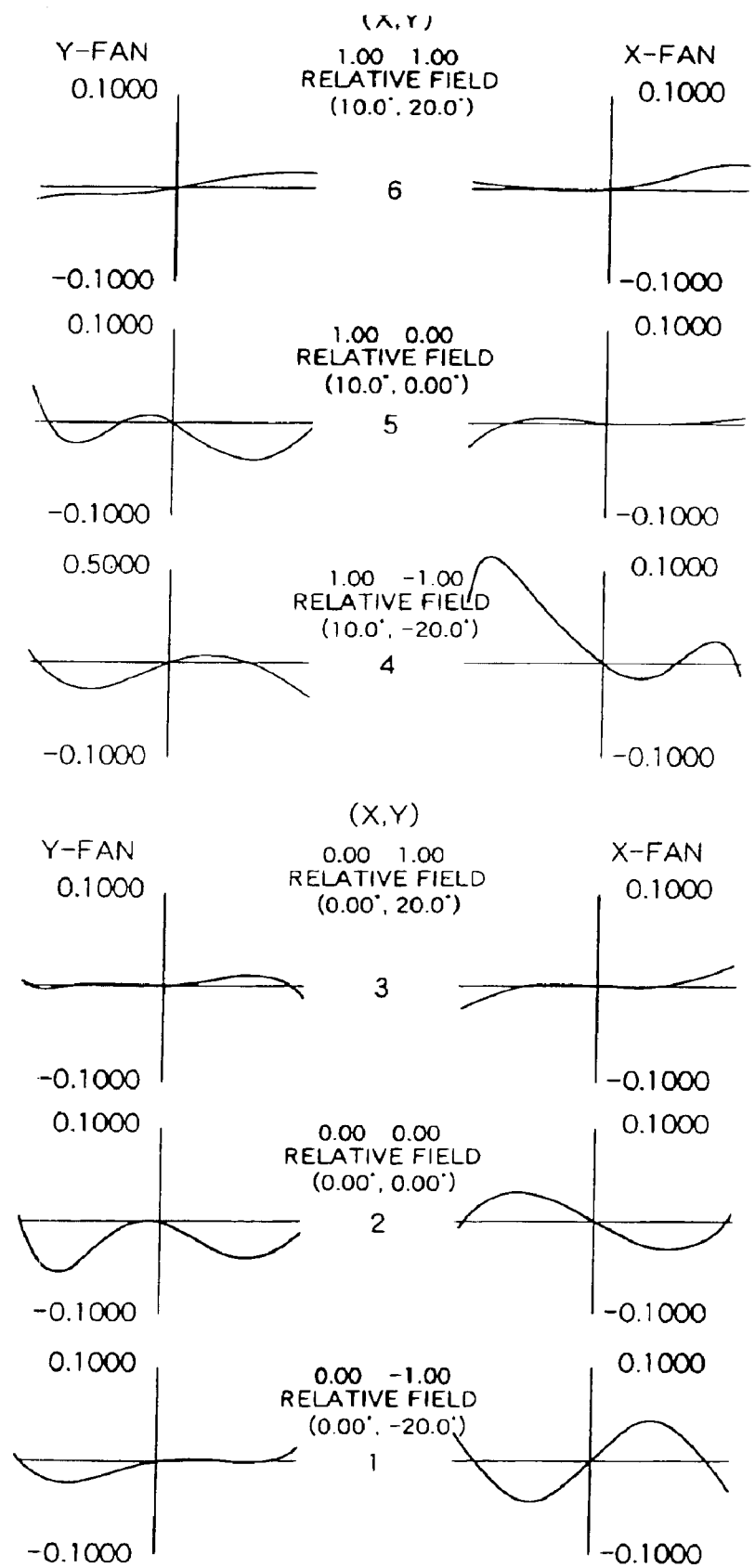
FIG. 10 is an aberration diagram for illustrating the optical performance of the reflective optical device according to the second embodiment of the present invention.
Figure 11:
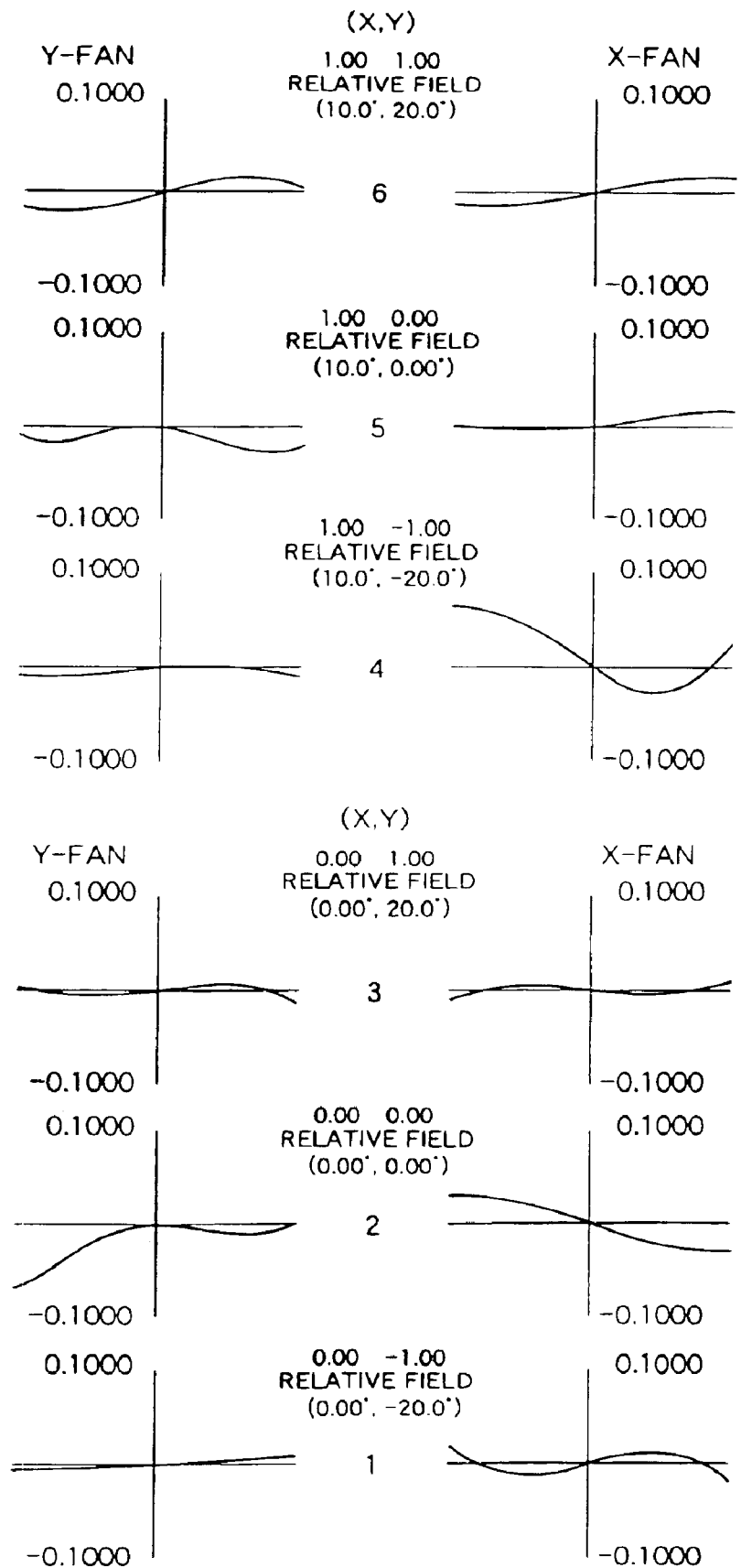
FIG. 11 is an aberration diagram for illustrating the optical performance of the reflective optical device according to the second embodiment of the present invention.
Figure 12:
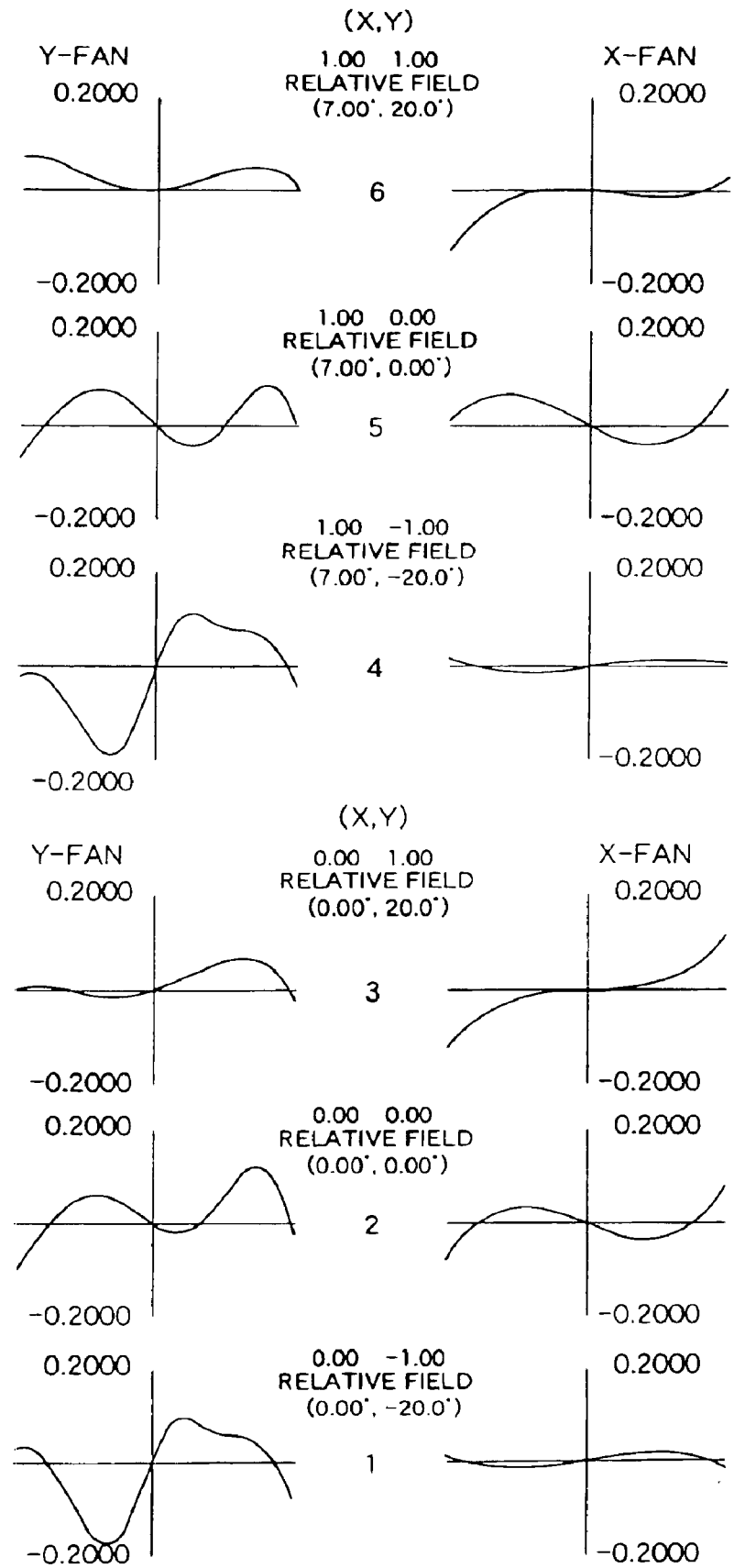
FIG. 12 is an aberration diagram for illustrating the optical performance of the reflective optical device according to the second embodiment of the present invention.
Figure 13:
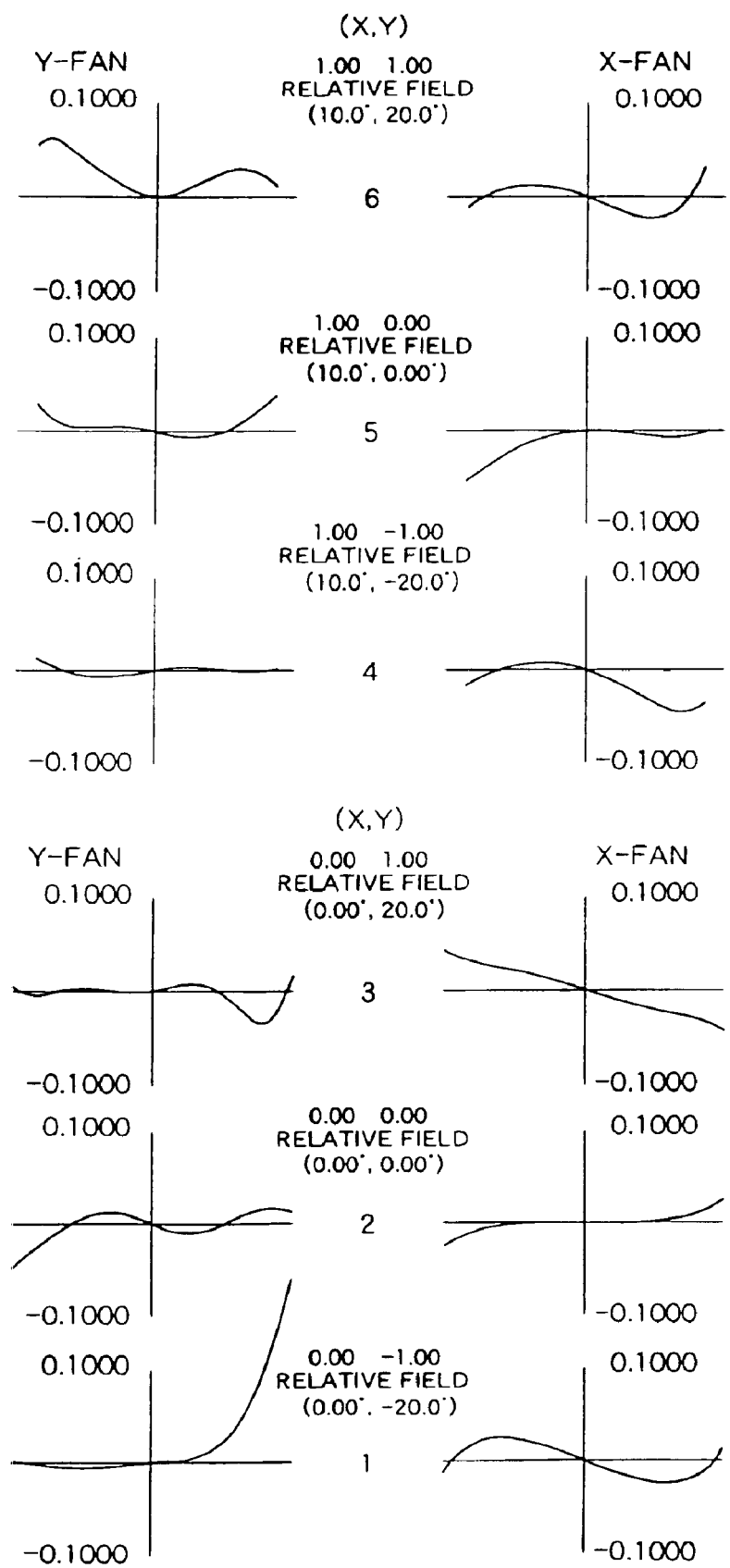
FIG. 13 is an aberration diagram for illustrating the optical performance of the reflective optical device according to the second embodiment of the present invention.
Figure 14:
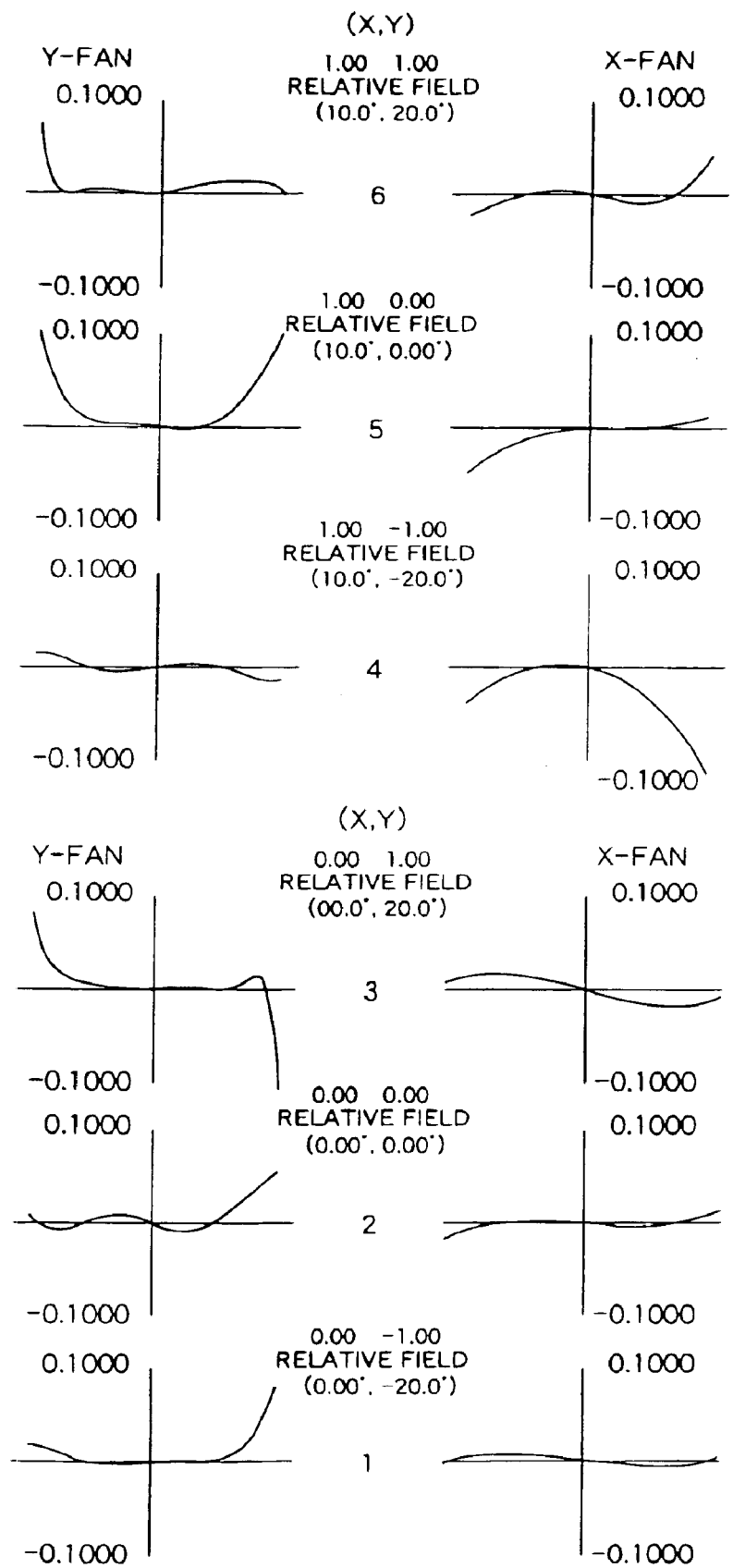
FIG. 14 is an aberration diagram for illustrating the optical performance of the reflective optical device according to the second embodiment of the present invention.
Figure 15:
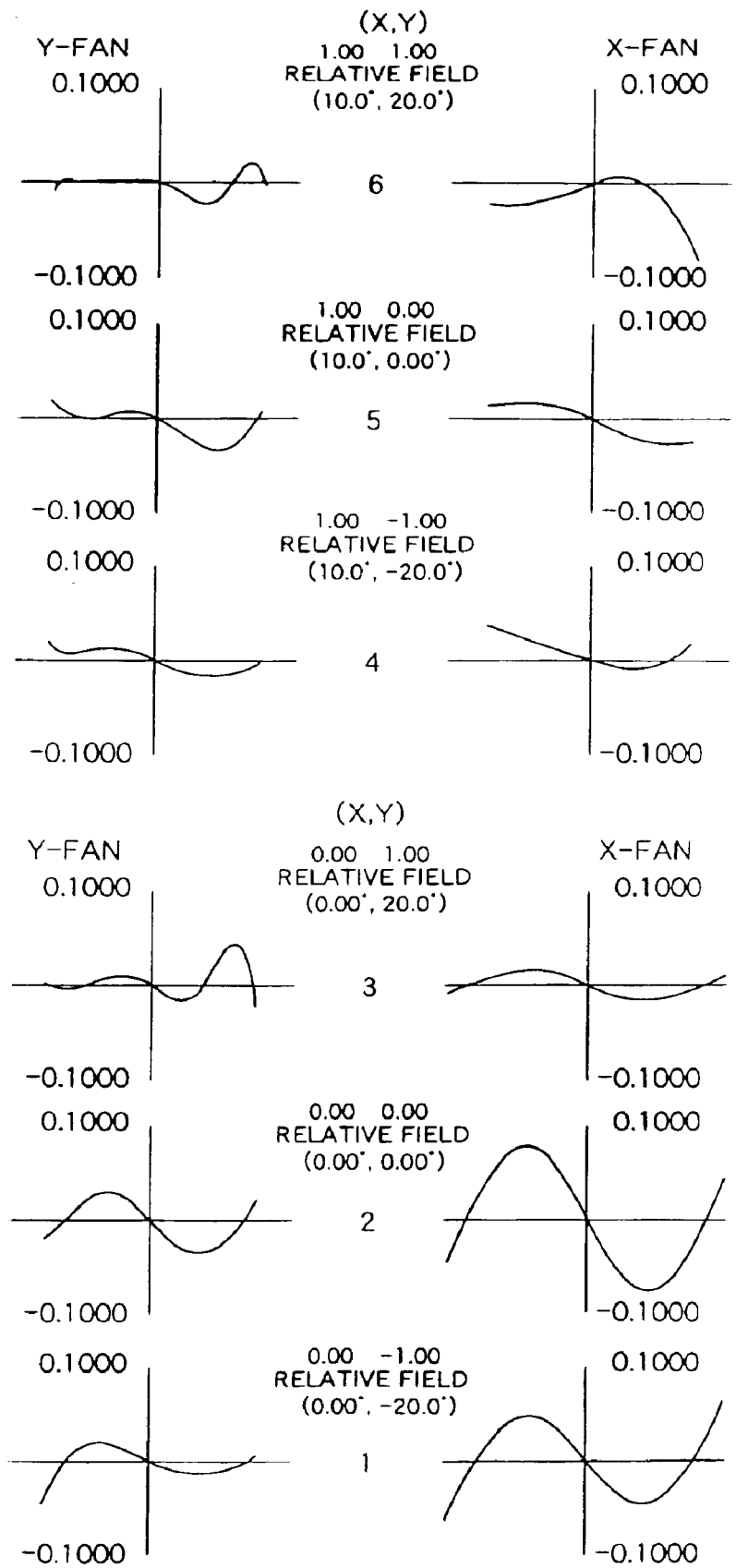
FIG. 15 is an aberration diagram for illustrating the optical performance of the reflective optical device according to the second embodiment of the present invention.
Figure 16:
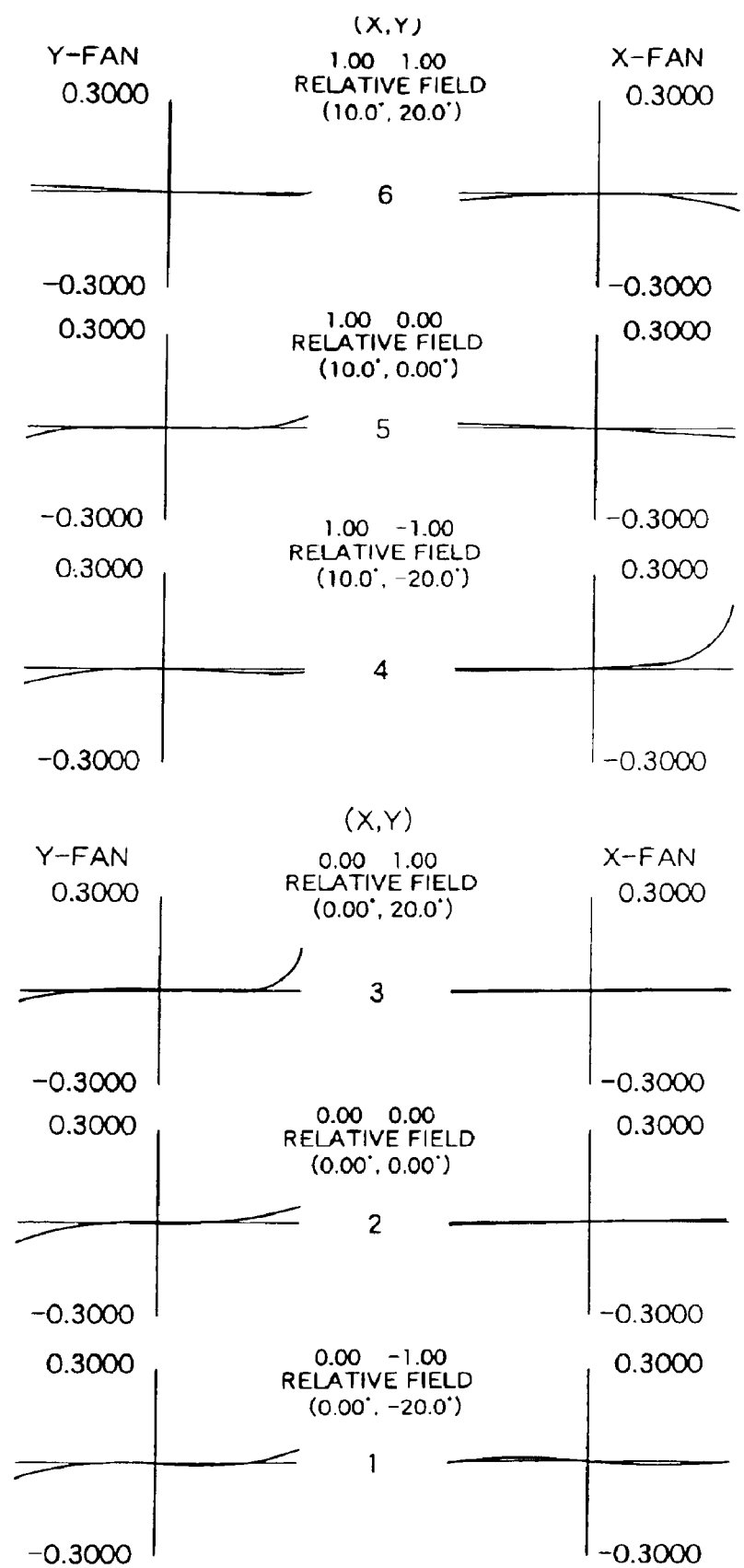
FIG. 16 is an aberration diagram for illustrating the optical performance of the reflective optical device according to the second embodiment of the present invention.

FIG. 5 is a view illustrating a configuration of a reflective optical device according to a second embodiment of the present invention. The reflective optical device shown in the figure includes a diaphragm 5, a first mirror 6, a second mirror 7, a third mirror 8, a fourth mirror 9, and an image surface 10. The mirrors 6 to 9 are arranged obliquely to the optical axes so that light fluxes are reflected obliquely. Light fluxes from an object are limited by the diaphragm 5, reflected by the mirrors 6 to 9, and then projected to the image surface 10, where an image is formed.

The foregoing figure illustrates a cross section of the reflective optical device taken along a plane containing the vertices of the mirrors 6 to 9, and the reflection surfaces of the mirrors 6 to 9 all are concave.

Each of the respective surfaces of the mirrors 6 to 9 is either the curved-axis Y toric surface (the formulae (1) to (5)), or the curved-axis X toric surface (the formulae (6) to (10)).

In the present embodiment, the relationship expressed by the formula (13) below preferably is satisfied:

$$26 < α3 < 56 \qquad \text{Formula (13)}$$

where α3 represents an angle (deg) formed by a normal line of the third mirror 8 at the vertex and an optical axis directed from the vertex of the third mirror 8 to the vertex of the fourth mirror 9.

In the case where α3 is lower than the lower limit of the range expressed by the formula (13), a part of the light fluxes reflected by the fourth mirror 9 returns to the reflection surface of the third mirror 8, which means the part is blocked and does not reach the image surface. In the case where α3 exceeds the upper limit of the foregoing range, a significant aberration occurs, thereby deteriorating the optical performance.

Further, the relationship expressed by the formula (14) below preferably is satisfied:

$$0.3 < d1/efy < 1.5 \qquad \text{Formula (14)}$$

where d1 represents a distance between the center of the diaphragm and the vertex of the first mirror 6, and efy represents a focal length in a plane containing the vertices of the reflection surfaces.

The range defined by the formula (14) preferably is further limited as expressed by the formula (15) below:

$$0.6 < d1/efy < 1.0 \qquad \text{Formula (15)}$$

Furthermore, the relationship expressed by the formula (16) below preferably is satisfied:

$$0.3 < d2/d4 < 1.0 \qquad \text{Formula (16)}$$

where d2 represents a distance between the vertex of the first mirror 6 and the vertex of the reflection surface of the second mirror 7, and d4 represents a distance between the vertex of the reflection surface of the third mirror 8 and the vertex of the reflection surface of the fourth mirror 9.

Furthermore, the relationship expressed by the formula (17) below preferably is satisfied:

$$2.6 < d4/efy < 7.5 \quad \text{Formula (17)}$$

where d4 represents a distance between the vertex of the reflection surface of the third mirror 8 and the vertex of the reflection surface of the fourth mirror 9.

Furthermore, the range defined by the formula (17) preferably is further limited as expressed by the formula (18) below:

$$3.5 < d4/efy < 6.5 \quad \text{Formula (18)}$$

The relationship expressed by the formula (19) below preferably is satisfied:

$$0.5 < d5/efy < 2.0 \quad \text{Formula (19)}$$

When the formulae (13) through (19) are satisfied, it is possible to suppress the blocking of a part of light fluxes at the reflection surfaces, and aberration. Therefore, deterioration of the optical performance can be prevented.

Tables 3 through 13 show examples of concrete numerical values in the present embodiment. In the tables, M1, M2, M3, and M4 indicate the first mirror 6, the second mirror 7, the third mirror 8, and the fourth mirror 9, respectively. In the examples shown in Tables 4 through 9, each of M1 through M4 has a curved-axis X toric surface. In the examples shown in Tables 10 through 12, M1 and M4 have curved-axis X toric surfaces, respectively, while in the example shown in Table 13, M1 has a curved-axis X toric surface, while M2 through M4 have curved-axis Y toric surfaces, respectively.

Further, efy represents a focal length of the entire system in the y direction, efx represents a focal length of the entire system in the x direction, d1 represents a distance (mm) from the center of the diaphragm 5 to the vertex of the first mirror 6, d2 represents a distance (mm) from the vertex of the first mirror 6 to the vertex of the second mirror 7, d3 represents a distance (mm) from the vertex of the second mirror 7 to the vertex of the third mirror 8, d4 represents a distance (mm) from the vertex of the third mirror 8 to the vertex of the fourth mirror 9, and d5 represents a distance (mm) from the vertex of the fourth mirror 9 to the center of the image surface 10.

$\alpha 1$ through $\alpha 4$ represent angles (deg) formed by normal lines of the first through fourth mirrors 6 through 9 and the optical axis, respectively. In each of the examples shown in Tables 10 to 13, the image surface is arranged with a tilt with respect to the optical axis, and the angle is set to $\alpha 5$.

TABLE 3

| | | |
|---|---|---|
| efy = 6.0 efx = 6.0 | | |
| Diaphragm | ø2.0 | |
| | | d1:7.50 |
| M1 | α1:28 | |
| | rdy:−20.77944 | rdx:−15.70431 |
| | YAD:2.85520 × 10⁻⁵ | YAE:−8.45180 × 10⁻⁷ |
| | YAOD:2.43998 × 10⁻⁴ | YAOE:4.71315 × 10⁻⁶ |
| | BC:−1.65813 × 10⁻² | BD:5.07453 × 10⁻⁴ |
| | QC:−1.25276 × 10⁻³ | QD:1.17284 × 10⁻⁸ |
| | | d2:9.85 |
| M2 | α2:35 | |
| | rdy:−18.03572 | rdx:−10.59307 |
| | YAD:3.91994 × 10⁻⁴ | YAE:8.72308 × 10⁻⁶ |
| | YAOD:−1.75571 × 10⁻³ | YAOE:2.81540 × 10⁻⁵ |
| | BC:−6.55252 × 10⁻² | BD:2.20923 × 10⁻² |
| | QC:3.29483 × 10⁻³ | QD:−3.09511 × 10⁻⁸ |
| | | d3:23.74 |
| M3 | α3:26 | |
| | rdy:−40.34396 | rdx:−34.87208 |
| | YAD:−1.68810 × 10⁻⁶ | YAE:4.38391 × 10⁻⁷ |
| | YAOD:−2.29194 × 10⁻⁴ | YAOE:8.63287 × 10⁻⁷ |
| | BC:−1.84078 × 10⁻³ | BD:7.01830 × 10⁻⁵ |
| | QC:−9.50937 × 10⁻⁶ | QD:−3.93368 × 10⁻⁶ |
| | | d4:12.81 |
| M4 | α4:21.35 | |
| | rdy:−31.02412 | rdx:−25.47785 |
| | YAD:1.02141 × 10⁻⁵ | YAE:−1.12296 × 10⁻⁷ |
| | YAOD:3.51527 × 10⁻⁴ | YAOE:−8.51782 × 10⁻⁷ |
| | BC:1.53260 × 10⁻³ | BD:7.67259 × 10⁻⁶ |
| | | d5:11.37 |
| Image Surface | α5:0.0 | |

TABLE 3

| | | |
|---|---|---|
| $efy = 6.0\ efx = 6.0$ | | |
| Diaphragm | ø2.0 | |
| | | d1:7.50 |
| M1 | $\alpha 1{:}28$ | |
| | rdy:−20.77944 | rdx:−15.70431 |
| | YAD:$2.85520 \times 10^{-5}$ | YAE:$-8.45180 \times 10^{-7}$ |
| | YAOD:$2.43998 \times 10^{-4}$ | YAOE:$4.71315 \times 10^{-6}$ |
| | BC:$-1.65813 \times 10^{-2}$ | BD:$5.07453 \times 10^{-4}$ |
| | QC:$-1.25276 \times 10^{-3}$ | QD:$1.17284 \times 10^{-8}$ |
| | | d2:9.85 |
| M2 | $\alpha 2{:}35$ | |
| | rdy:−18.03572 | rdx:−10.59307 |
| | YAD:$3.91994 \times 10^{-4}$ | YAE:$8.72308 \times 10^{-6}$ |
| | YAOD:$-1.75571 \times 10^{-3}$ | YAOE:$2.81540 \times 10^{-5}$ |
| | BC:$-6.55252 \times 10^{-2}$ | BD:$2.20923 \times 10^{-2}$ |
| | QC:$3.29483 \times 10^{-3}$ | QD:$-3.09511 \times 10^{-8}$ |
| | | d3:23.74 |
| M3 | $\alpha 3{:}26$ | |
| | rdy:−40.34396 | rdx:−34.87208 |
| | YAD:$-1.68810 \times 10^{-6}$ | YAE:$4.38391 \times 10^{-7}$ |
| | YAOD:$-2.29194 \times 10^{-4}$ | YAOE:$8.63287 \times 10^{-7}$ |
| | BC:$-1.84078 \times 10^{-3}$ | BD:$7.01830 \times 10^{-5}$ |
| | QC:$-9.50937 \times 10^{-6}$ | QD:$-3.93368 \times 10^{-6}$ |
| | | d4:12.81 |
| M4 | $\alpha 4{:}21.35$ | |
| | rdy:−31.02412 | rdx:−25.47785 |
| | YAD:$1.02141 \times 10^{-5}$ | YAE:$-1.12296 \times 10^{-7}$ |
| | YAOD:$3.51527 \times 10^{-4}$ | YAOE:$-8.51782 \times 10^{-7}$ |
| | BC:$1.53260 \times 10^{-3}$ | BD:$7.67259 \times 10^{-6}$ |
| | | d5:11.37 |
| Image Surface | $\alpha 5{:}0.0$ | |

TABLE 4

| | | |
|---|---|---|
| $efy = 6.0\ efx = 6.0$ | | |
| Diaphragm | ø3.0 | |
| | | d1:7.50 |
| M1 | $\alpha 1{:}28$ | |
| | rdy:−21.82217 | rdx:−14.82874 7 |

TABLE 4-continued efy = 6.0 efx = 6.0

|     |                                |                                |         |
|-----|--------------------------------|--------------------------------|---------|
|     | YAD:$-1.19714 \times 10^{-5}$  | YAE:$5.60805 \times 10^{-7}$   |         |
|     | YAOD:$4.98348 \times 10^{-4}$  | YAOE:$-5.31684 \times 10^{-6}$ |         |
|     | BC:$-1.33865 \times 10^{-2}$   | BD:$2.52256 \times 10^{-4}$    |         |
|     | QC:$-3.39625 \times 10^{-3}$   | QD:$1.17285 \times 10^{-8}$    |         |
|     |                                |                                | d2:9.85 |
| M2  |                                | α2:35                          |         |
|     | rdy:$-17.91289$                | rdx:$-11.48710$                |         |
|     | YAD:$4.22895 \times 10^{-4}$   | YAE:$9.22965 \times 10^{-6}$   |         |
|     | YAOD:$-2.44954 \times 10^{-3}$ | YAOE:$4.42684 \times 10^{-5}$  |         |
|     | BC:$-5.93678 \times 10^{-2}$   | BD:$1.23542 \times 10^{-2}$    |         |
|     | QC:$3.79637 \times 10^{-3}$    | QD:$-3.09512 \times 10^{-8}$   |         |
|     |                                |                                | d3:23.74 |
| M3  |                                | α3:40                          |         |
|     | rdy:$-44.95284$                | rdx:$-31.58477$                |         |
|     | YAD:$-2.83072 \times 10^{-6}$  | YAE:$4.09973 \times 10^{-7}$   |         |
|     | YAOD:$-2.19463 \times 10^{-4}$ | YAOE:$2.58538 \times 10^{-6}$  |         |
|     | BC:$4.25959 \times 10^{-4}$    | BD:$4.46018 \times 10^{-5}$    |         |
|     | QC:$-2.88240 \times 10^{-4}$   | QD:$-3.63034 \times 10^{-6}$   |         |
|     |                                |                                | d4:12.91 |
| M4  |                                | α4:24.31                       |         |
|     | rdy:$-33.08792$                | rdx:$-24.70912$                |         |
|     | YAD:$3.40138 \times 10^{-6}$   | YAE:$-1.29774 \times 10^{-7}$  |         |
|     | YAOD:$3.86085 \times 10^{-4}$  | YAOE:$-2.03534 \times 10^{-6}$ |         |
|     | BC:$2.27858 \times 10^{-3}$    | BD:$-7.72750 \times 10^{-5}$   |         |
|     |                                |                                | d5:11.52 |
| Image Surface |                      | α5:0.0                         |         |

TABLE 5 efy = 6.0 efx = 6.0

|           |                                |                                |         |
|-----------|--------------------------------|--------------------------------|---------|
| Diaphragm |                                | ⌀2.0                           |         |
|           |                                |                                | d1:7.50 |
| M1        |                                | α1:28                          |         |
|           | rdy:$-22.39173$                | rdx:$-13.80661$                |         |
|           | YAD:$-3.09321 \times 10^{-5}$  | YAE:$8.16600 \times 10^{-7}$   |         |
|           | YAOD:$3.33310 \times 10^{-4}$  | YAOE:$-7.15611 \times 10^{-7}$ |         |
|           | BC:$-2.03056 \times 10^{-2}$   | BD:$2.27089 \times 10^{-4}$    |         |
|           | QC:$-5.43622 \times 10^{-3}$   | QD:$1.17284 \times 10^{-8}$    |         |
|           |                                |                                | d2:9.85 |
| M2        |                                | α2:35                          |         |
|           | rdy:$-18.11807$                | rdx:$-10.42351$                |         |
|           | YAD:$3.92243 \times 10^{-4}$   | YAE:$5.97963 \times 10^{-6}$   |         |
|           | YAOD:$-2.13483 \times 10^{-3}$ | YAOE:$5.53745 \times 10^{-5}$  |         |
|           | BC:$-5.41481 \times 10^{-2}$   | BD:$9.17823 \times 10^{-3}$    |         |
|           | QC:$2.94190 \times 10^{-3}$    | QD:$-3.09513 \times 10^{-8}$   |         |
|           |                                |                                | d3:23.74 |
| M3        |                                | α3:56                          |         |
|           | rdy:$-61.81877$                | rdx:$-27.32216$                |         |
|           | YAD:$-5.16440 \times 10^{-6}$  | YAE:$3.06650 \times 10^{-7}$   |         |
|           | YAOD:$-1.98648 \times 10^{-4}$ | YAOE:$3.07233 \times 10^{-6}$  |         |
|           | BC:$-1.76257 \times 10^{-3}$   | BD:$5.10835 \times 10^{-5}$    |         |
|           | QC:$-5.39013 \times 10^{-4}$   | QD:$-8.07966 \times 10^{-6}$   |         |
|           |                                |                                | d4:11.95 |
| M4        |                                | α4:24.72                       |         |
|           | rdy:$-33.34237$                | rdx:$-22.94313$                |         |
|           | YAD:$2.12146 \times 10^{-6}$   | YAE:$-1.87215 \times 10^{-8}$  |         |
|           | YAOD:$6.17948 \times 10^{-4}$  | YAOE:$-2.40465 \times 10^{-6}$ |         |
|           | BC:$2.25609 \times 10^{-3}$    | BD:$-6.38015 \times 10^{-5}$   |         |
|           |                                |                                | d5:11.71 |
| Image Surface |                            | α5:0.0                         |         |

TABLE 6 efy = 6.0 efx = 6.0

|           |                 |                 |       |
|-----------|-----------------|-----------------|-------|
| Diaphragm |                 | ⌀1.75           |       |
|           |                 |                 | d1:2.0 |
| M1        |                 | α1:39           |       |
|           | rdy:$-28.99836$ | rdx:$-12.39711$ |       |

TABLE 6-continued

| | efy = 6.0 efx = 6.0 | |
|---|---|---|
| | YAD:−3.01369 × 10⁻⁴ | YAE:2.77086 × 10⁻⁵ |
| | YAOD:1.66612 × 10⁻³ | YAOE:−8.14946 × 10⁻⁵ |
| | BC:−1.61540 × 10⁻¹ | BD:4.96420 × 10⁻² |
| | QC:−3.95368 × 10⁻³ | QD:1.17285 × 10⁻⁸ |
| | | d2:9.85 |
| M2 | | α2:35 |
| | rdy:−15.77873 | rdx:−8.89741 |
| | YAD:5.86027 × 10⁻⁴ | YAE:−3.01663 × 10⁻⁶ |
| | YAOD:−8.20487 × 10⁻⁴ | YAOE:−1.48207 × 10⁻⁵ |
| | BC:−3.01679 × 10⁻² | BD:2.32177 × 10⁻³ |
| | QC:1.76844 × 10⁻³ | QD:−3.09511 × 10⁻⁸ |
| | | d3:23.74 |
| M3 | | α3:40 |
| | rdy:−42.80333 | rdx:−34.42642 |
| | YAD:−1.30380 × 10⁻⁵ | YAE:3.96163 × 10⁻⁷ |
| | YAOD:−1.02025 × 10⁻⁵ | YAOE:1.67535 × 10⁻⁶ |
| | BC:4.16640 × 10⁻⁴ | BD:−5.77840 × 10⁻⁵ |
| | QC:−3.33973 × 10⁻⁴ | QD:7.95418 × 10⁻⁷ |
| | | d4:12.60 |
| M4 | | α4:23.08 |
| | rdy:−32.65172 | rdx:−23.03887 |
| | YAD:6.74044 × 10⁻⁶ | YAE:−2.36405 × 10⁻⁷ |
| | YAOD:3.81289 × 10⁻⁴ | YAOE:−1.93378 × 10⁻⁶ |
| | BC:−3.78634 × 10⁻⁴ | BD:1.58382 × 10⁻⁴ |
| | | d5:11.20 |
| Image Surface | | α5:0.0 |

TABLE 7

| | efy = 6.0 efx = 6.0 | |
|---|---|---|
| Diaphragm | | ø3.0 |
| | | d1:5.50 |
| M1 | | α1:28 |
| | rdy:−24.17387 | rdx:−14.31709 |
| | YAD:−1.02173 × 10⁻⁴ | YAE:4.26096 × 10⁻⁶ |
| | YAOD:1.07186 × 10⁻³ | YAOE:−2.49497 × 10⁻⁵ |
| | BC:−2.50958 × 10⁻² | BD:5.28022 × 10⁻⁴ |
| | QC:−4.20192 × 10⁻³ | QD:1.17285 × 10⁻⁸ |
| | | d2:9.85 |
| M2 | | α2:35 |
| | rdy:−15.94181 | rdx:−9.66194 |
| | YAD:3.92719 × 10⁻⁴ | YAE:5.56002 × 10⁻⁶ |
| | YAOD:−1.63499 × 10⁻³ | YAOE:2.45322 × 10⁻⁶ |
| | BC:−5.96184 × 10⁻² | BD:1.30828 × 10⁻² |
| | QC:5.41429 × 10⁻³ | QD:−3.09512 × 10⁻⁸ |
| | | d3:23.74 |
| M3 | | α3:40 |
| | rdy:−44.89417 | rdx:−34.86430 |
| | YAD:−2.12356 × 10⁻⁶ | YAE:3.94434 × 10⁻⁷ |
| | YAOD:−1.95436 × 10⁻⁴ | YAOE:2.26073 × 10⁻⁶ |
| | BC:7.21681 × 10⁻⁵ | BD:5.60464 × 10⁻⁵ |
| | QC:−3.21340 × 10⁻⁴ | QD:−4.50268 × 10⁻⁶ |
| | | d4:12.41 |
| M4 | | α4:23.36 |
| | rdy:−31.80780 | rdx:−23.2031 5 |
| | YAD:7.07410 × 10⁻⁶ | YAE:−1.51771 × 10⁻⁷ |
| | YAOD:4.05762 × 10⁻⁴ | YAOE:−2.04428 × 10⁻⁶ |
| | BC:5.22411 × 10⁻⁴ | BD:1.05700 × 10⁻⁵ |
| | | d5:11.40 |
| Image Surface | | α5:0.0 |

TABLE 8

| | efy = 6.0 efx = 6.0 | |
|---|---|---|
| Diaphragm | | ø2.0 |
| | | d1:9.0 |
| M1 | | α1:32 |
| | rdy:−23.40328 | rdx:−1 4.37048 |

TABLE 8-continued

| | efy = 6.0 efx = 6.0 | |
|---|---|---|
| | YAD:$-4.53336 \times 10^{-5}$ | YAE:$9.51679 \times 10^{-7}$ |
| | YAOD:$4.17810 \times 10^{-4}$ | YAOE:$-5.34064 \times 10^{-6}$ |
| | BC:$-1.33642 \times 10^{-2}$ | BD:$4.16406 \times 10^{-4}$ |
| | QC:$-1.82225 \times 10^{-3}$ | QD:$1.17286 \times 10^{-8}$ |
| | | d2:9.85 |
| M2 | | $\alpha 2$:37 |
| | rdy:$-17.87708$ | rdx:$-10.95019$ |
| | YAD:$4.25988 \times 10^{-4}$ | YAE:$1.03962 \times 10^{-5}$ |
| | YAOD:$-2.02336 \times 10^{-3}$ | YAOE:$4.20681 \times 10^{-5}$ |
| | BC:$-4.47247 \times 10^{-2}$ | BD:$1.66161 \times 10^{-2}$ |
| | QC:$3.78534 \times 10^{-3}$ | QD:$-3.09512 \times 10^{-8}$ |
| | | d3:23.74 |
| M3 | | $\alpha 3$:40 |
| | rdy:$-45.06124$ | rdx:$-31.98407$ |
| | YAD:$-2.50736 \times 10^{-6}$ | YAE:$3.94618 \times 10^{-7}$ |
| | YAOD:$-1.93104 \times 10^{-4}$ | YAOE:$2.45156 \times 10^{-6}$ |
| | BC:$2.04538 \times 10^{-6}$ | BD:$4.21346 \times 10^{-5}$ |
| | QC:$-2.06813 \times 10^{-4}$ | QD:$-3.07224 \times 10^{-6}$ |
| | | d4:12.83 |
| M4 | | $\alpha 4$:22.89 |
| | rdy:$-32.45308$ | rdx:$-24.64244$ |
| | YAD:$3.70972 \times 10^{-6}$ | YAE:$-1.48635 \times 10^{-7}$ |
| | YAOD:$4.09804 \times 10^{-4}$ | YAOE:$-2.28830 \times 10^{-6}$ |
| | BC:$1.65169 \times 10^{-3}$ | BD:$-2.43063 \times 10^{-5}$ |
| | | d5:11.56 |
| Image Surface | | $\alpha 5$:0.0 |

TABLE 9

| | efy = 6.0 efx = 6.0 | |
|---|---|---|
| Diaphragm | $\varnothing 4.0$ | |
| | | d1:5.50 |
| M1 | | $\alpha 1$:40 |
| | rdy:$-66.14546$ | rdx:$-12.38682$ |
| | YAD:$-1.10756 \times 10^{-4}$ | YAE:$3.65584 \times 10^{-7}$ |
| | YAOD:$5.82227 \times 10^{-4}$ | YAOE:$2.42221 \times 10^{-6}$ |
| | BC:$-1.74578 \times 10^{-2}$ | BD:$1.64602 \times 10^{-3}$ |
| | QC:$-1.50452 \times 10^{-3}$ | QD:$4.79608 \times 10^{-5}$ |
| | | d2:14.2 |
| M2 | | $\alpha 2$:40 |
| | rdy:$-13.89106$ | rdx:$-14.47631$ |
| | YAD:$5.92504 \times 10^{-4}$ | YAE:$-3.84669 \times 10^{-6}$ |
| | YAOD:$-8.85563 \times 10^{-4}$ | YAOE:$9.39882 \times 10^{-6}$ |
| | BC:$-3.18752 \times 10^{-3}$ | BD:$-1.00143 \times 10^{-5}$ |
| | QC:$-1.47114 \times 10^{-3}$ | QD:$-1.23368 \times 10^{-5}$ |
| | | d3:29.61 |
| M3 | | $\alpha 3$:40 |
| | rdy:$-53.05799$ | rdx:$-72.28070$ |
| | YAD:$3.52465 \times 10^{-6}$ | YAE:$5.03647 \times 10^{-8}$ |
| | YAOD:$-1.69773 \times 10^{-4}$ | YAOE:$-5.00443 \times 10^{-7}$ |
| | BC:$3.64224 \times 10^{-3}$ | BD:$1.24747 \times 10^{-5}$ |
| | QC:$-1.13319 \times 10^{-4}$ | QD:$-1.94595 \times 10^{-7}$ |
| | | d4:16.0 |
| M4 | | $\alpha 4$:24 |
| | rdy:$-29.68662$ | rdx:$-20.89002$ |
| | YAD:$1.94548 \times 10^{-5}$ | YAE:$-2.69948 \times 10^{-7}$ |
| | YAOD:$5.36908 \times 10^{-4}$ | YAOE:$-4.24714 \times 10^{-6}$ |
| | BC:$-1.04264 \times 10^{-3}$ | BD:$2.25904 \times 10^{-5}$ |
| | | d5:11.107 |
| Image Surface | | $\alpha 5$:0.0 |

TABLE 10

| | efy = 4.95 efx = 8.2 | |
|---|---|---|
| Diaphragm | $\varnothing 3.0$ | |
| | | d1:3.70 |
| M1 | | $\alpha 1$:45 |
| | rdy:$-28.99984$ | rdx:$-152.90201$ |

TABLE 10-continued $efy = 4.95\ efx = 8.2$

|   |   |   |   |   |
|---|---|---|---|---|
|   | YAD:$1.02760 \times 10^{-4}$ | YAE:$2.99852 \times 10^{-6}$ | | |
|   | YAOD:$4.79855 \times 10^{-4}$ | YAOE:$-4.17507 \times 10^{-5}$ | | |
|   | XAD:$-1.36455 \times 10^{-4}$ | XAE:$-5.95804 \times 10^{-6}$ | | |
|   | BC:$8.13423 \times 10^{-3}$ | BD:$-9.77759 \times 10^{-4}$ | BE:$-1.00790 \times 10^{-4}$ | |
|   | QC:$1.80359 \times 10^{-4}$ | QD:$-3.29024 \times 10^{-6}$ | QE:$-1.77485 \times 10^{-5}$ | |
|   | | | | d2:9.6 |
| M2 | | $\alpha 2$:45 | | |
|   | rdy:$-37.56346$ | rdx:$37.86628$ | | |
|   | YAD:$1.53014 \times 10^{-6}$ | YAE:$5.28690 \times 10^{-8}$ | | |
|   | YAOD:$5.67901 \times 10^{-5}$ | YAOE:$7.36468 \times 10^{-7}$ | | |
|   | BC:$6.07494 \times 10^{-3}$ | BD:$2.66522 \times 10^{-4}$ | BE:$5.04359 \times 10^{-7}$ | |
|   | BOC:$-9.43947 \times 10^{-2}$ | BOD:$-1.73317 \times 10^{-3}$ | BOE:$-1.64912 \times 10^{-5}$ | |
|   | | | | d3:21.93 |
| M3 | | $\alpha 3$:37.5 | | |
|   | rdy:$-42.02344$ | rdx:$-1\,5.28639$ | | |
|   | YAD:$5.61442 \times 10^{-7}$ | YAE:$7.00253 \times 10^{-8}$ | | |
|   | YAOD:$3.89467 \times 10^{-5}$ | YAOE:$6.00934 \times 10^{-7}$ | | |
|   | BC:$-1.21973 \times 10^{-3}$ | BD:$-1.09018 \times 10^{-6}$ | BE:$-6.01116 \times 10^{-9}$ | |
|   | B0C:$-9.84872 \times 10^{-3}$ | BOD:$3.85896 \times 10^{-5}$ | BOE:$1.54447 \times 10^{-7}$ | |
|   | | | | d4:19.0 |
| M4 | | $\alpha 4$:30 | | |
|   | rdy:$-21.0291\,1$ | rdx:$-6.57700$ | | |
|   | YAD:$-1.34023 \times 10^{-4}$ | YAE:$3.82257 \times 10^{-6}$ | YAF:$-1.65579 \times 10^{-7}$ | YAG:$6.41753 \times 10^{-10}$ |
|   | YAOD:$-2.59123 \times 10^{-4}$ | YAOE:$-2.53186 \times 10^{-5}$ | YAOF:$2.98831 \times 10^{-7}$ | YAOG:$-1.17970 \times 10^{-8}$ |
|   | XAD:$7.69818 \times 10^{-5}$ | XAE:$5.27296 \times 10^{-6}$ | | |
|   | BC:$-1.82143 \times 10^{-2}$ | BD:$-1.26425 \times 10^{-4}$ | BE:$6.71129 \times 10^{-6}$ | |
|   | QC:$4.75773 \times 10^{-4}$ | QD:$2.40033 \times 10^{-5}$ | QE:$-3.64543 \times 10^{-7}$ | |
|   | | | | d5:7.7 |
| Image Surface | | $\alpha 5$:16 | | |

TABLE 11

$efy = 4.95\ efx = 8.2$

|   |   |   |   |   |
|---|---|---|---|---|
| Diaphragm | | $\phi 3.5$ | | |
|   | | | | d1:3.70 |
| M1 | | $\alpha 1$:45 | | |
|   | rdy:$-28.36101$ | rdx:$-106.68403$ | | |
|   | YAD:$1.10697 \times 10^{-4}$ | YAE:$2.99391 \times 10^{-6}$ | | |
|   | YAOD:$5.79682 \times 10^{-4}$ | YAOE:$-4.14654 \times 10^{-5}$ | | |
|   | XAD:$-1.29369 \times 10^{-4}$ | XAE:$3.35450 \times 10^{-7}$ | | |
|   | BC:$1.11679 \times 10^{-2}$ | BD:$6.83405 \times 10^{-4}$ | BE:$-7.47472 \times 10^{-5}$ | |
|   | QC:$-3.87840 \times 10^{-4}$ | QD:$3.81498 \times 10^{-5}$ | QE:$-2.08261 \times 10^{-6}$ | |
|   | | | | d2:9.6 |
| M2 | | $\alpha 2$:45 | | |
|   | rdy:$-39.31311$ | rdx:$27.92454$ | | |
|   | YAD:$2.16018 \times 10^{-7}$ | YAE:$2.99374 \times 10^{-8}$ | | |
|   | YAOD:$5.60292 \times 10^{-5}$ | YAOE:$7.09183 \times 10^{-7}$ | | |
|   | BC:$7.55866 \times 10^{-3}$ | BD:$2.71136 \times 10^{-4}$ | BE:$2.69578 \times 10^{-7}$ | |
|   | BOC:$-7.07328 \times 10^{-2}$ | BOD:$-1.68621 \times 10^{-3}$ | BOE:$-1.72513 \times 10^{-5}$ | |
|   | | | | d3:22.15 |
| M3 | | $\alpha 3$:37.5 | | |
|   | rdy:$-43.63003$ | rdx:$-17.35842$ | | |
|   | YAD:$7.18754 \times 10^{-7}$ | YAE:$5.41462 \times 10^{-8}$ | | |
|   | YAOD:$4.82396 \times 10^{-5}$ | YAOE:$6.70946 \times 10^{-7}$ | | |
|   | BC:$-9.91360 \times 10^{-4}$ | BD:$-7.75342 \times 10^{-7}$ | BE:$-7.57007 \times 10^{-9}$ | |
|   | BOC:$-5.65695 \times 10^{-3}$ | BOD:$4.13483 \times 10^{-5}$ | BOE:$1.39542 \times 10^{-8}$ | |
|   | | | | d4:22.5 |
| M4 | | $\alpha 4$:30 | | |
|   | rdy:$-20.71904$ | rdx:$-7.03109$ | | |
|   | YAD:$-1.30093 \times 10^{-4}$ | YAE:$4.17720 \times 10^{-6}$ | YAF:$-1.52547 \times 10^{-7}$ | YAG:$1.00136 \times 10^{-9}$ |
|   | YAOD:$-2.74354 \times 10^{-4}$ | YAOE:$-2.05378 \times 10^{-5}$ | YAOF:$3.86108 \times 10^{-7}$ | YAOG:$-1.04814 \times 10^{-8}$ |
|   | XAD:$7.90990 \times 10^{-5}$ | XAE:$1.59051 \times 10^{-6}$ | | |
|   | BC:$-1.94677 \times 10^{-2}$ | BD:$-8.78028 \times 10^{-5}$ | BE:$7.74365 \times 10^{-6}$ | |
|   | QC:$6.58999 \times 10^{-4}$ | QD:$7.68549 \times 10^{-6}$ | QE:$-2.82293 \times 10^{-7}$ | |
|   | | | | d5:7.7 |
| Image Surface | | $\alpha 5$:16 | | |

TABLE 12

| efy = 4.95 efx = 8.2 | | | |
|---|---|---|---|
| Diaphragm | ø3.0 | | |
| | | | d1:4.61 |
| M1 | α1:45 | | |
| | rdy:−26.05860 | rdx:−231.38724 | |
| | YAD:1.13086 × 10$^{-4}$ | YAE:3.51177 × 10$^{-6}$ | |
| | YAOD:6.95109 × 10$^{-4}$ | YAOE:−3.68896 × 10$^{-5}$ | |
| | XAD:−8.99603 × 10$^{-4}$ | XAE:−5.89230 × 10$^{-5}$ | |
| | BC:−2.80934 × 10$^{-2}$ | BD:5.15443 × 10$^{-3}$ | BE:−3.44450 × 10$^{-4}$ |
| | QC:−7.07468 × 10$^{-4}$ | QD:1.31488 × 10$^{-4}$ | QE:−1.05427 × 10$^{-6}$ |
| | | | d2:10.77 |
| M2 | α2:45 | | |
| | rdy:−47.14360 | rdx:14.091 92 | |
| | YAD:1.05855 × 10$^{-5}$ | YAE:−5.15419 × 10$^{-8}$ | |
| | YAOD:1.61859 × 10$^{-4}$ | YAOE:3.57701 × 10$^{-7}$ | |
| | BC:8.86211 × 10$^{-3}$ | BD:2.79229 × 10$^{-4}$ | BE:−1.51749 × 10$^{-7}$ |
| | BOC:−8.51733 × 10$^{-2}$ | BOD:−1.33082 × 10$^{-3}$ | BOE:−1.67158 × 10$^{-5}$ |
| | | | d3:19.85 |
| M3 | α3:37.5 | | |
| | rdy:−48.71404 | rdx:−20.18595 | |
| | YAD:−3.39048 × 10$^{-6}$ | YAE:−3.93960 × 10$^{-10}$ | |
| | YAOD:3.51027 × 10$^{-5}$ | YAOE:6.87239 × 10$^{-7}$ | |
| | BC:−7.23384 × 10$^{-4}$ | BD:1.68686 × 10$^{-6}$ | BE:−2.02686 × 10$^{-8}$ |
| | B0C:−1.28481 × 10$^{-3}$ | BOD:1.87548 × 10$^{-5}$ | BOE:7.68548 × 10$^{-9}$ |
| | | | d4:32 |
| M4 | α4:30 | | |
| | rdy:−19.60674 | rdx:−8.10187 | |
| | YAD:−1.24501 × 10$^{-4}$ | YAE:4.20698 × 10$^{-6}$ | YAF:−1.53240 × 10$^{-7}$ | YAG:1.57661 × 10$^{-9}$ |
| | YAOD:−2.99700 × 10$^{-4}$ | YAOE:−1.98046 × 10$^{-5}$ | YAOF:4.44908 × 10$^{-7}$ | YAOG:−6.01927 × 10$^{-9}$ |
| | XAD:−4.36066 × 10$^{-4}$ | XAE:1.34309 × 10$^{-5}$ | | |
| | BC:−1.84671 × 10$^{-2}$ | BD:5.84417 × 10$^{-4}$ | BE:−3.57662 × 10$^{-5}$ | |
| | QC:1.67513 × 10$^{-4}$ | QD:4.57392 × 10$^{-5}$ | QE:−1.83992 × 10$^{-6}$ | |
| | | | d5:7.67 |
| Image Surface | α5:16 | | |

TABLE 13

| efy = 4.95 efx = 4.95 | | | |
|---|---|---|---|
| Diaphragm | ø3.2 | | |
| | | | d1:3.00 |
| M1 | α1:45 | | |
| | rds:−56.05448 | rdx:−216.244 | |
| | BC:−2.8969 × 10$^{-4}$ | | |
| | | | d2:8.69 |
| M2 | α2:45 | | |
| | rdy:−43.65798 | rdx:38.709 | |
| | YAD:−7.8390 × 10$^{-6}$ | | |
| | YAOD:−1.4886 × 10$^{-4}$ | | |
| | BO:1.9375 × 10$^{-2}$ | BD:−7.2563 × 10$^{-6}$ | |
| | BOC:−1.4554 × 10$^{-6}$ | BOD:−2.3041 × 10$^{-3}$ | BOE:1.4646 × 10$^{-5}$ |
| | | | d3:22.42 |
| M3 | α3:38.25 | | |
| | rdy:−37.19418 | rdx:−15.512 | |
| | YAD:3.4667 × 10$^{-6}$ | YAE:−9.7392 × 10$^{-9}$ | |
| | YAOD:6.0230 × 10$^{-5}$ | YAOE:1.1883 × 10$^{-7}$ | |
| | BC:−1.1697 × 10$^{-3}$ | BD:−5.5848 × 10$^{-6}$ | BE:3.1089 × 10$^{-8}$ |
| | BOC:−1.3653 × 10$^{-2}$ | BOD:5.6768 × 10$^{-6}$ | BOE:7.0581 × 10$^{-7}$ |
| | | | d4:21.20 |
| M4 | α4:23 | | |
| | rdy:−13.61471 | rdx:−6.689 | |
| | YAD:−8.9706 × 10$^{-5}$ | YAE:−3.8937 × 10$^{-6}$ | YAF:1.7972 × 10$^{-7}$ | YAG:−4.6226 × 10$^{-9}$ |
| | YAOD:−6.2867 × 10$^{-4}$ | YAOE:−1.8252 × 10$^{-5}$ | YAOF:−3.0516 × 10$^{-7}$ | YAOG:8.6097 × 10$^{-9}$ |
| | BC:−7.6081 × 10$^{-3}$ | BD:−2.0279 × 10$^{-5}$ | BE:2.0871 × 10$^{-6}$ | BF:−5.3320 × 10$^{-8}$ |
| | BOC:−1.0168 × 10$^{-2}$ | BOD:−3.3021 × 10$^{-4}$ | B0E:9.9320 × 10$^{-6}$ | BOF:−1.9129 × 10$^{-7}$ |
| | | | d5:6.00 |
| Image Surface | α5:2.7 | | |

According to the present embodiment, the mirrors with curved-axis X toric surfaces and curved-axis Y toric surfaces, each of which has a high-level capability of aberration correction, are eccentrically arranged. Therefore, it is possible to guide light fluxes to an image surface without blocking the same, thereby allowing excellent image formation.

This allows the optical performance to be enhanced, as compared with the two-mirror configuration. Furthermore, because a condition that the F value is not higher than 3.5 is satisfied, the foregoing configuration can be applied to a system with requirements of high resolution and high sensitivity. Aberration diagrams of the examples shown in Tables 3 to 13 are shown in FIGS. 6 to 16.

Incidentally, in the present embodiment, the shape of the mirror surface is that defined by the formulae (1) through (5), or that defined by the formulae (6) through (10), but it may be a surface of a form defined by different formulae as long as it is a similar surface.

Furthermore, the present embodiment is explained by taking as an example the reflective optical device having four reflection surfaces, but the device may have three reflection surfaces. In the case where the reflection surfaces are not less than three, the optical performance can be improved as compared with the case of the two-surface configuration. Therefore, it can be applied to a system with requirements of high resolution and high sensitivity, and the resolution necessary for image formation in the infrared range (wavelength: 3 $\mu$m to 5 $\mu$m, or 8 $\mu$m to 12 $\mu$m) can be obtained.

To obtain such necessary resolution, it is necessary to decrease the F value to an extent such that the influence of diffraction decreases. This is possible in the case where the reflection surfaces are not less than three, as in the present embodiment. For instance, in the case where the wavelength is 10 $\mu$m, the F value of 1.9 allows MTF of not less than 20% and 35 (l.P/mm) to be obtained, and the F value of 1.6 allows MTF of not less than 20% and 40 (l.P/mm) to be obtained. Thus, the configuration is applicable to an infrared imaging system with high-resolution and high-sensitivity requirements.

Third Embodiment

Figure 17:
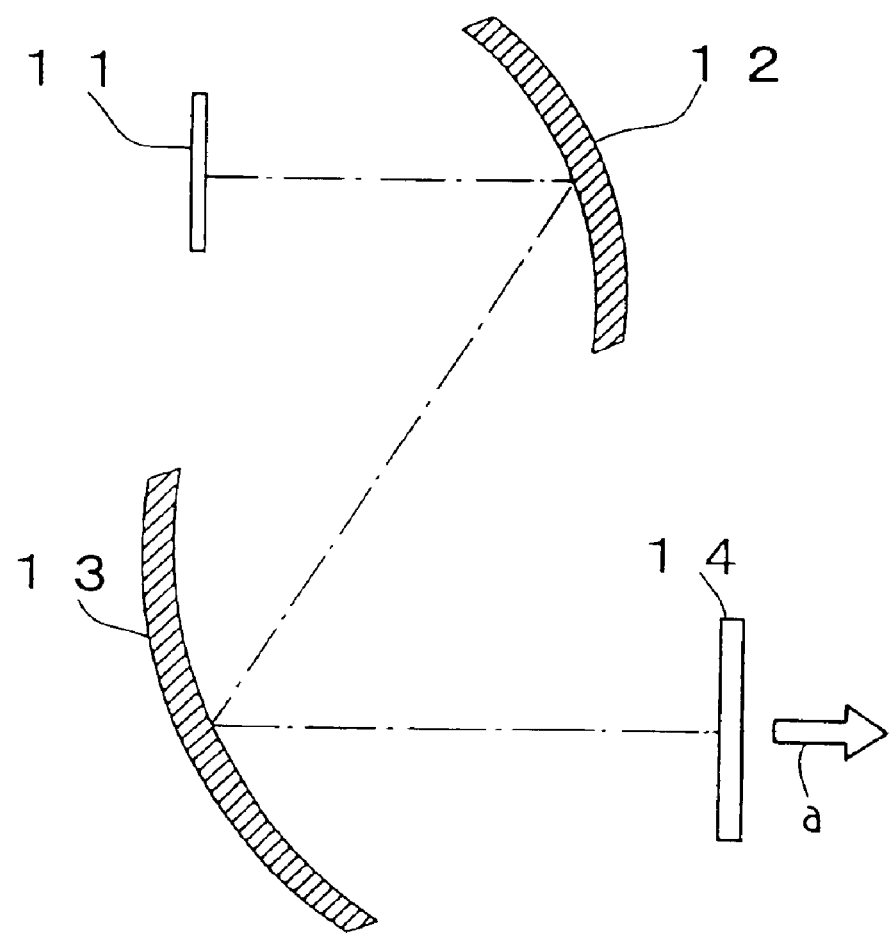
FIG. 17 is a view illustrating a configuration of an imaging device according to a third embodiment of the present invention.

FIG. 17 is a view illustrating a configuration of an imaging device according to a third embodiment of the present invention. The imaging device shown in the figure includes an aperture 11, a first mirror 12, a second mirror 13, and a two-dimensional imaging element 14. The arrangement of the first and second mirrors 12 and 13 and their surface forms are identical to those in the first embodiment. The aperture 11 functions as an aperture diaphragm that transmits light in the wavelength range necessary for image formation, thereby limiting a light beam diameter, and further has a function of preventing dust from entering the optical system.

Light fluxes from an object are limited by the aperture 11 disposed at the diaphragm position, reflected by the mirrors 12 and 13, and then, projected to the two-dimensional imaging element 14, where an image is formed. Then, an image converted into electric signals by the two-dimensional imaging element 14 is outputted (arrow a).

According to the present embodiment, the imaging device includes the reflective optical device according to the first embodiment and a detecting means that converts light intensity into an electric signal, and further, uses a two-dimensional imaging element as the detecting means. Therefore, it is possible to obtain wide-angle, high-resolution image signals. Furthermore, in the case where a two-dimensional imaging element with sensitivity to infrared rays (wavelength: 3 $\mu$m to 5 $\mu$m, or 8 $\mu$m to 12 $\mu$m) is used, it is possible to image infrared images.

Fourth Embodiment

Figure 18:
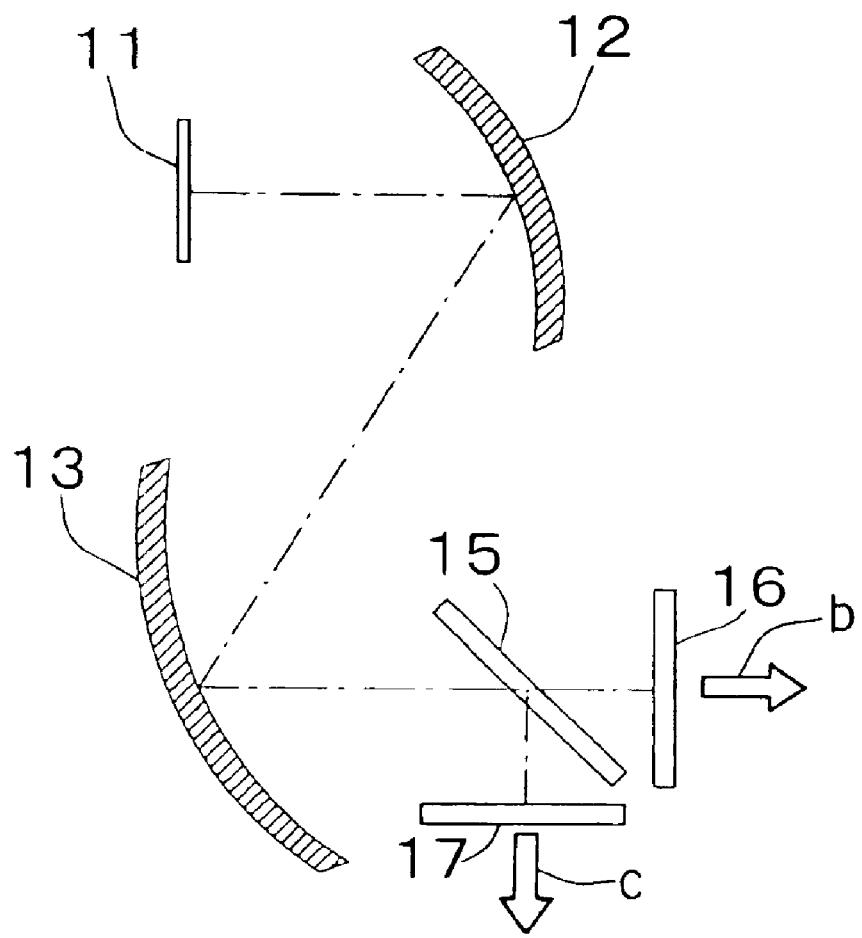
FIG. 18 is view illustrating a configuration of a multi-wavelength imaging device according to a fourth embodiment of the present invention.

FIG. 18 is a view illustrating a configuration of a multi-wavelength imaging device according to a fourth embodiment of the present invention. Reference numerals 11 to 13 denote the same members as those in the third embodiment. In the fourth embodiment, the device further includes a wavelength selecting filter 15, an infrared imaging element 16, and a visible imaging element 17. The wavelength selecting filter 15 transmits only infrared rays (wavelength: 3 $\mu$m to 5 $\mu$m, or 8 $\mu$m to 12 $\mu$m) and reflects visible rays (wavelength: 400 nm to 750 nm). The infrared imaging element 16 has sensitivity with respect to infrared rays, while the visible imaging element 17 has sensitivity with respect to visible rays.

Light fluxes in two wavelengtgh ranges (visible and infrared) from an object are limited by the aperture 11 disposeed at a diaphragm position, and converged by the two mirrors 12 and 13. Light fluxes in the infrared range pass through the wavelength selecting filter 15, and are projected to the two-dimensional imaging element 16, from which an image converted into electric signals is outputted (arrow b).

Light fluxes in the visible range reflected by the wavelength selecting filter 15 are projected to the two-dimensional imaging element 17, from which an image converted into electric signals is outputted (arrow c). Since the light fluxes in the two wavelength ranges are imaged by an optical system composed of mirrors that never cause color aberration exclusively, identical optical performance can be obtained.

Furthermore, since the infrared imaging element and the visible imaging element are used as imaging elements, both the image formation in the visible range that is suitable for image formation in the daytime and the image formation in the infrared range that is suitable for image formation at night can be carried out. In other words, according to the present embodiment, since in the reflective optical device the optical system for converging light fluxes is composed of reflection surfaces, the device can be used with respect to light fluxes in any wavelength range, from the infrared range (wavelength: 3 $\mu$m to 5 $\mu$m, or 8 $\mu$m to 12 $\mu$m), the visible range (wavelength: 400 $\mu$m to 750 $\mu$m), to the ultraviolet range (wavelength: 200 nm to 400 nm). By combining the same with a detecting means with sensitivity to a plurality of wavelength ranges, it is possible to form images in a plurality of wavelength ranges at the same time by use of one optical system.

Fifth Embodiment

Figure 19:
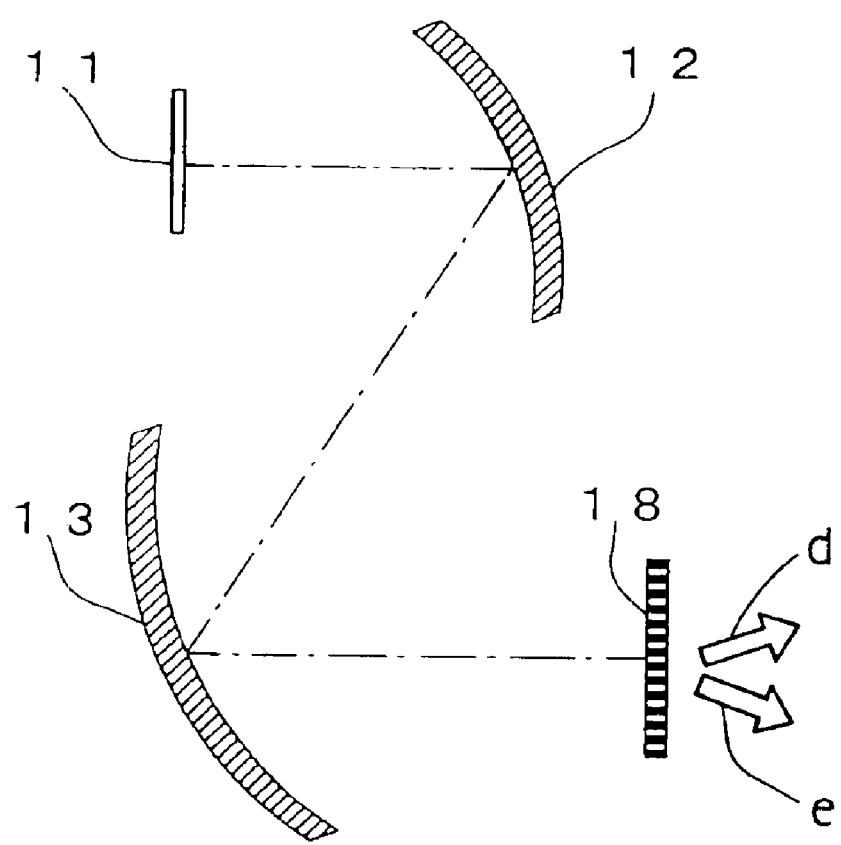
FIG. 19 is a view illustrating a configuration of a multi-wavelength imaging device according to a fifth embodiment of the present invention.

FIG. 19 is a view illustrating a configuration of a multi-wavelength imaging device according to a fifth embodiment of the present invention. In the foregoing figure, the reference numerals 11 to 13 denote the same members as those in the third embodiment. In the present embodiment, the device further includes a multi-wavelength imaging element 18 that has sensitivity with respect to infrared rays and visible rays both.

Light fluxes in two wavelength ranges (visible and infrared) from an object are limited by the aperture 11 disposed at a diaphragm position. Then, the light fluxes are brought into focus by the two mirrors 12 and 13 on the multi-wavelength imaging element 18.

The light fluxes in two wavelength ranges are projected to an optical system composed only of mirrors that cause no chromatic aberration at all to form images. Therefore, identical optical performance can be obtained. Besides, the multi-wavelength imaging element 18 is configured so that regions with sensitivity to rays in the visible range and regions with sensitivity to rays in the infrared range are dispersedly arranged in the same imaging plane. Therefore, images in the two wavelength ranges can be converted into two types of electric signals, that is, infrared-range image signals (arrow d) and visible-range image signals (arrow e).

In other words, according to the present embodiment, images in a plurality of wavelength ranges can be simultaneously formed with one optical system and one imaging element.

Sixth Embodiment

Figure 20:
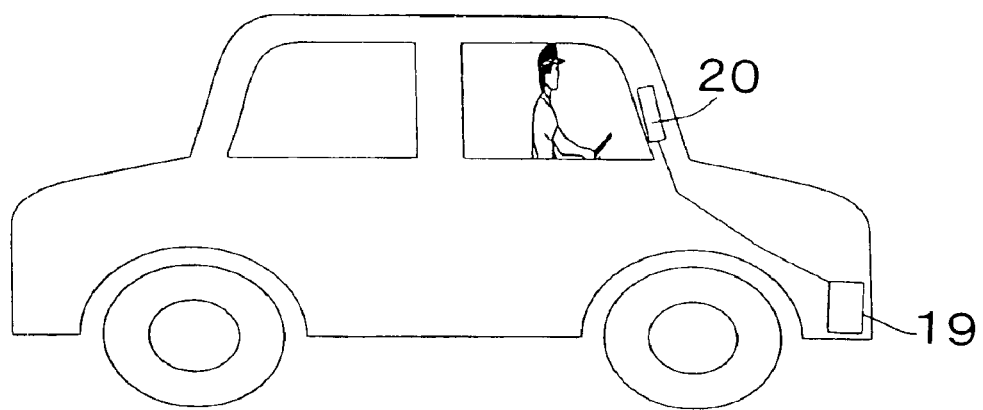
FIG. 20 is a view illustrating a configuration of a vehicle-mounted monitor according to a sixth embodiment of the present invention.

FIG. 20 is a view illustrating a configuration of a vehicle-mounted monitor according to a sixth embodiment of the present invention. The vehicle-mounted monitor shown in the drawing includes a multi-wavelength imaging device 19 according to the fourth embodiment and a display device 20. Images in two wavelength ranges (visible range and infrared range) outputted from the multi-wavelength imaging device 19 are displayed by the display device 20, and the driver is allowed to get information as needed. For instance, when it is light outside in the daytime, information is obtained mainly from images with visible light, and at night, important information as to positions of a pedestrian or a car, etc. is obtained from images with infrared rays. In other words, the present embodiment allows position information concerning cars driving ahead, pedestrians, etc. to be obtained precisely at all times, irrespective of the daytime or night.

Seventh Embodiment

Figure 21:
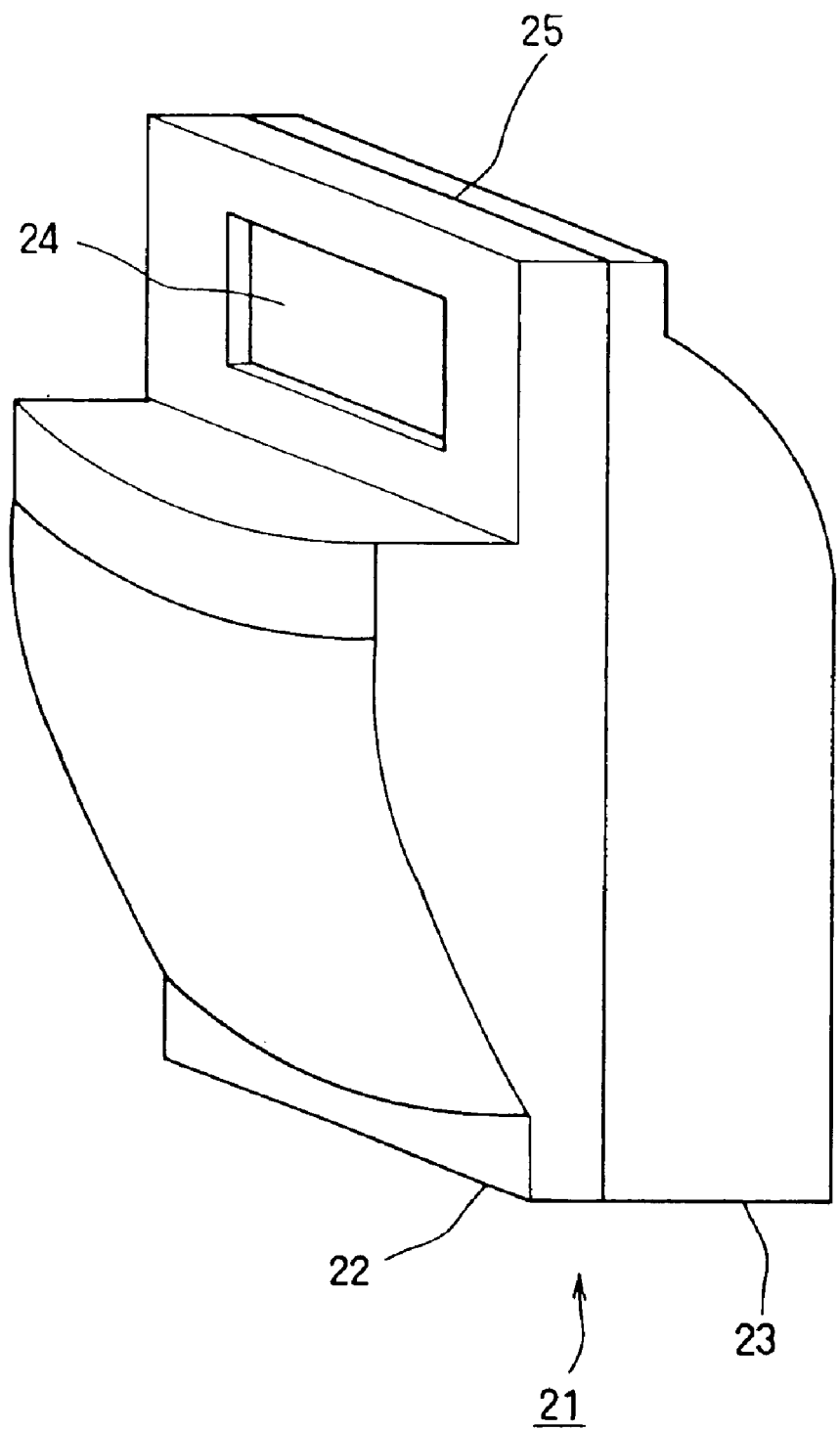
FIG. 21 is a perspective view of a reflective optical device according to a seventh embodiment of the present invention.

FIG. 21 is a perspective view illustrating a configuration of a reflective optical device according to a seventh embodiment of the present invention. The reflective optical device 21 shown in the drawing is configured as follows: a front optical member 22 and a rear optical member 23, each in a shell-like shape, are opposed to each other at a border plane 25 and bonded integrally so that a hollow space is formed therein. An aperture 24 is provided in the front optical member 23, through which light fluxes for image formation enter therein.

Figure 22:
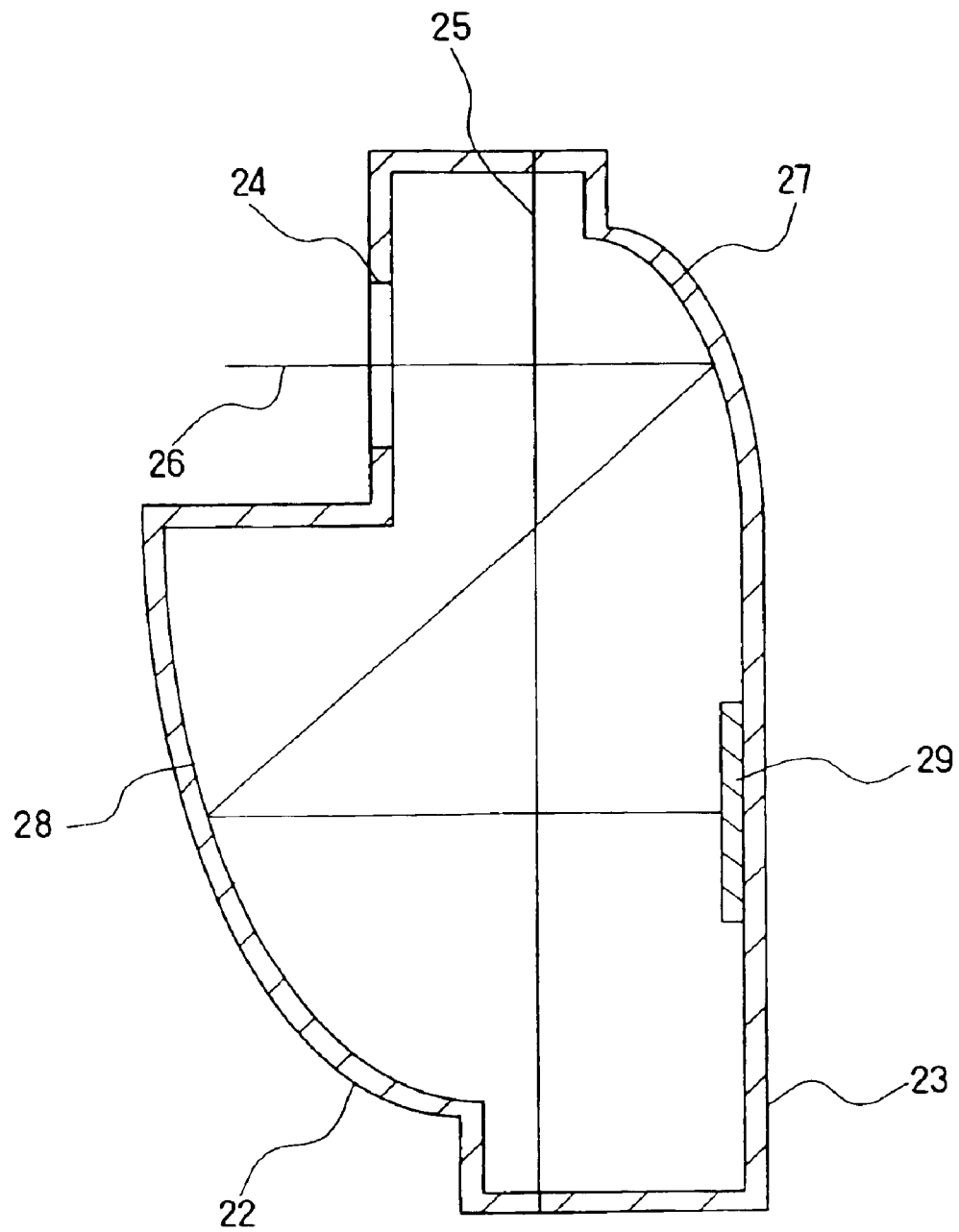
FIG. 22 is a cross-sectional view of a reflective optical device according to the seventh embodiment of the present invention.

FIG. 22 is a cross-sectional view of the reflective optical device 21 show in FIG. 21 taken in a direction perpendicular to the border plane 25. The light fluxes having passed through the aperture 24 for image formation, travel along an optical axis 26. Thereafter the light fluxes are reflected by a reflection surface 27 formed on an internal surface of the shell-shaped rear optical member 23, and a reflection surface 28 formed on an internal surface of the shell-shaped front optical member 22. Finally, the light fluxes are projected to a photosensitive member 29 with photosensitivity, whereby an image is formed.

Among the reflection surfaces 27 and 28, at least one is a free-form surface, and an excellent image can be obtained by this eccentric optical system. As the free-form surface, a curved-axis Y toric surface shown in FIG. 2 (the formulae (1) through (5)) or a curved-axis X toric surface (the formulae (6) through (10)) can be used, for instance.

By providing such a free-form surface as the reflection surface on the internal surface of the shell-shaped optical member, the aberration-correcting capability of an eccentric optical system can be obtained, and hence, a configuration of an optical system with an optical path that conventionally has not been available is obtained. Furthermore, the blocking by the reflection surface itself is avoided, and an optical system with an increased angle of vision can be obtained. In other words, by integrally providing a plurality of shell-shaped optical members so that they are opposed to each other as in the present embodiment, it is possible to provide a reflective optical device that is cost-reduced and miniaturized compatibly, and has an enhance aberration correcting capability and an increased angle of view.

Figure 23:
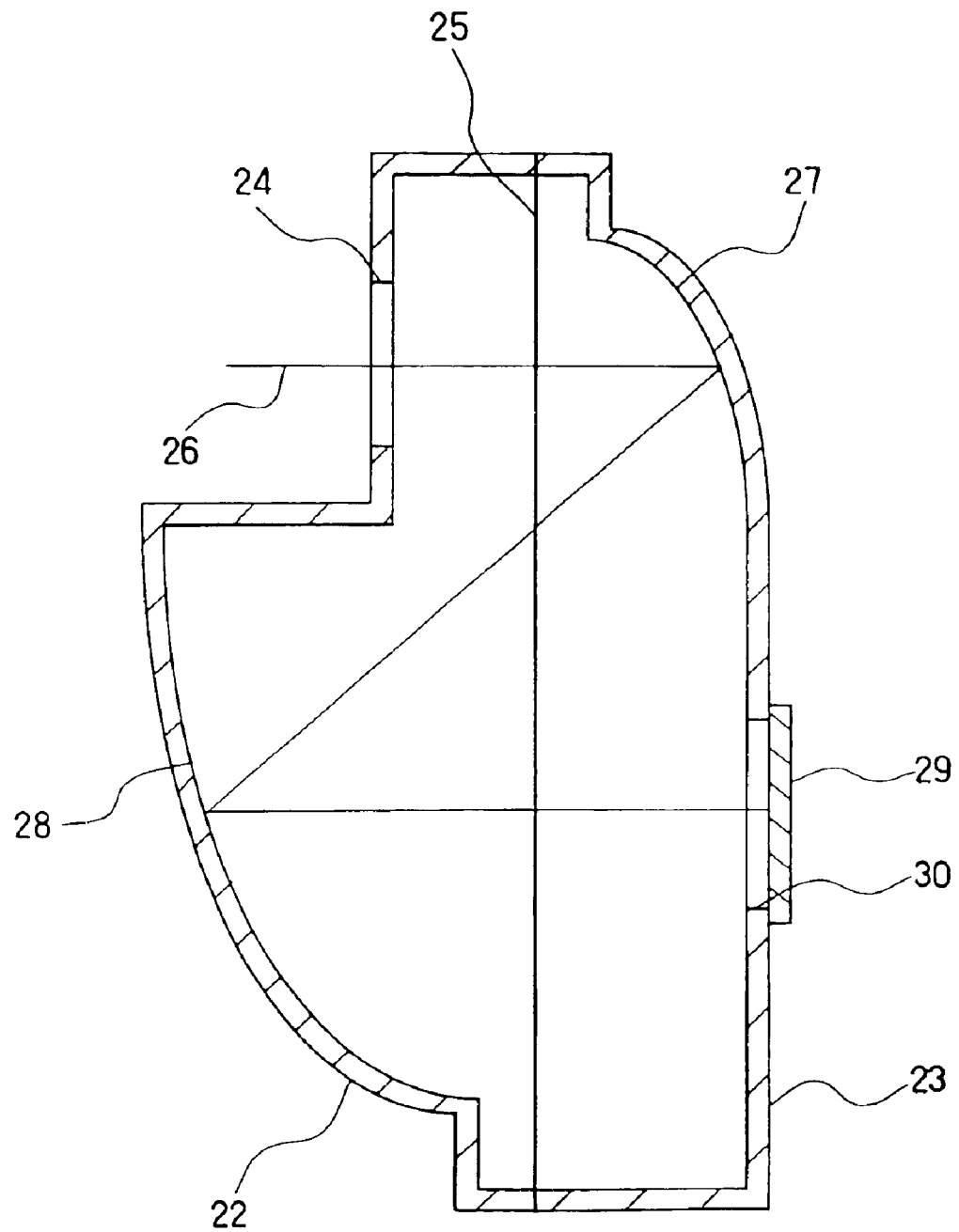
FIG. 23 is a cross-sectional view of another reflective optical device according to the seventh embodiment of the present invention.

FIG. 23 is a cross-sectional view of the reflective optical device shown in FIG. 21 taken in a direction perpendicular to the border plane 25. The reflective optical device shown in this drawing is provided with an aperture 30 for causing image formation to occur outside the reflective optical device 21.

The light fluxes having passed through the aperture 24 for image formation travel along the optical axis 26. Thereafter the light fluxes are reflected by the reflection surface 27 formed on the internal surface of the shell-shaped rear optical member 23, and the reflection surface 28 formed on the internal surface of the shell-shaped front optical member 22. Finally, the light fluxes are projected to a photosensitive member 29 with photosensitivity that is provided outside the aperture 30 for image formation, whereby an image is formed.

Incidentally, in the present embodiment, the form of the reflection surface is that defined by the formulae (1) through (5) or that defined by the formulae (6) through (10), but it may be a surface of a form defined by different formulae as long as it is a similar surface.

Eighth Embodiment

Figure 24:
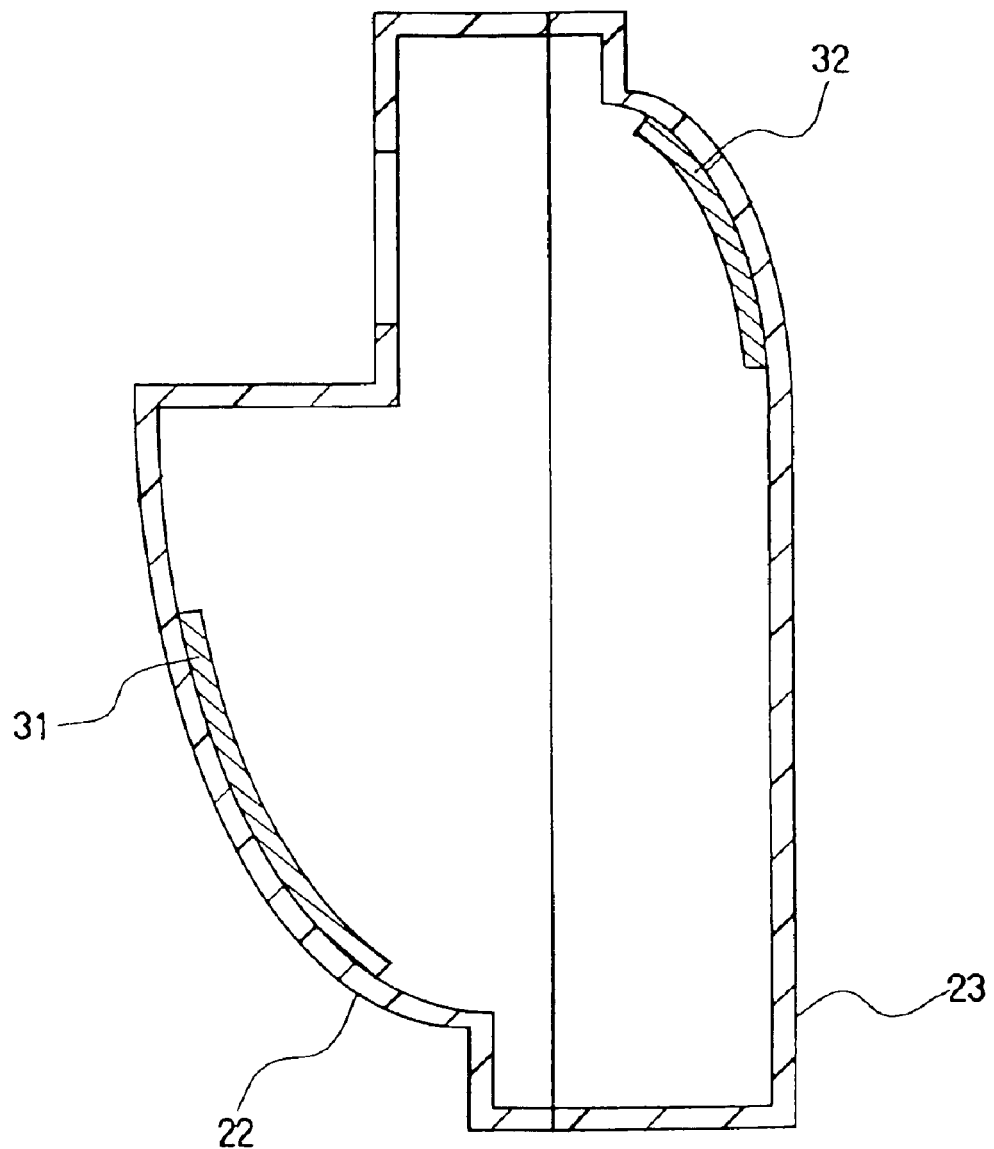
FIG. 24 is a cross-sectional view of a reflective optical device according to an eighth embodiment of the present invention.

FIG. 24 illustrates a reflective optical device in which optical members are formed with resin moldings and metallic thin films are formed on regions of reflection surfaces. A front optical member 22 in a shell-like shape is formed in the following manner: a resin material is formed into a desired shape by hot pressing or injection molding, and thereafter, a metallic thin film 31 is formed in a region of a reflection surface by vacuum deposition or plating.

Likewise, a rear optical member 23 in a shell-like shape is formed in the following manner: a resin material is formed into a desired shape by hot pressing or injection molding, and thereafter, a metallic thin film 32 is formed in a region of a reflection surface by vacuum deposition or plating. This configuration allows the substantially whole structure to be formed with resin moldings, and metallic films to be formed only on the reflection surfaces. Therefore, it is possible to obtain a low-cost reflective optical device.

As a material used for forming a metallic thin film, a material may be selected that is suitable for wavelengths of light fluxes from a subject as a target to be imaged: for instance, aluminum, gold, silver, copper or zinc. Aluminum has an excellent reflectance, while being inexpensive. Gold is superior in environmental resistance, and has an excellent reflectance as to light fluxes in the infrared range. Silver is industrially applicable from the viewpoint of cost, and has an excellent reflectance. Copper has an excellent reflectance as to light fluxes in the infrared range, while being inexpensive. Zinc has a relatively excellent reflectance as to light fluxes in the infrared range, while being inexpensive.

Incidentally, a reflection surface on which a metallic thin film is formed by using aluminum, silver, copper, zinc, etc. tends to have a reflectance decreased due to oxidation. Therefore, it is desirable that $SiO_2$ or the like is laminated on the metallic thin film.

Ninth Embodiment

Figure 25:
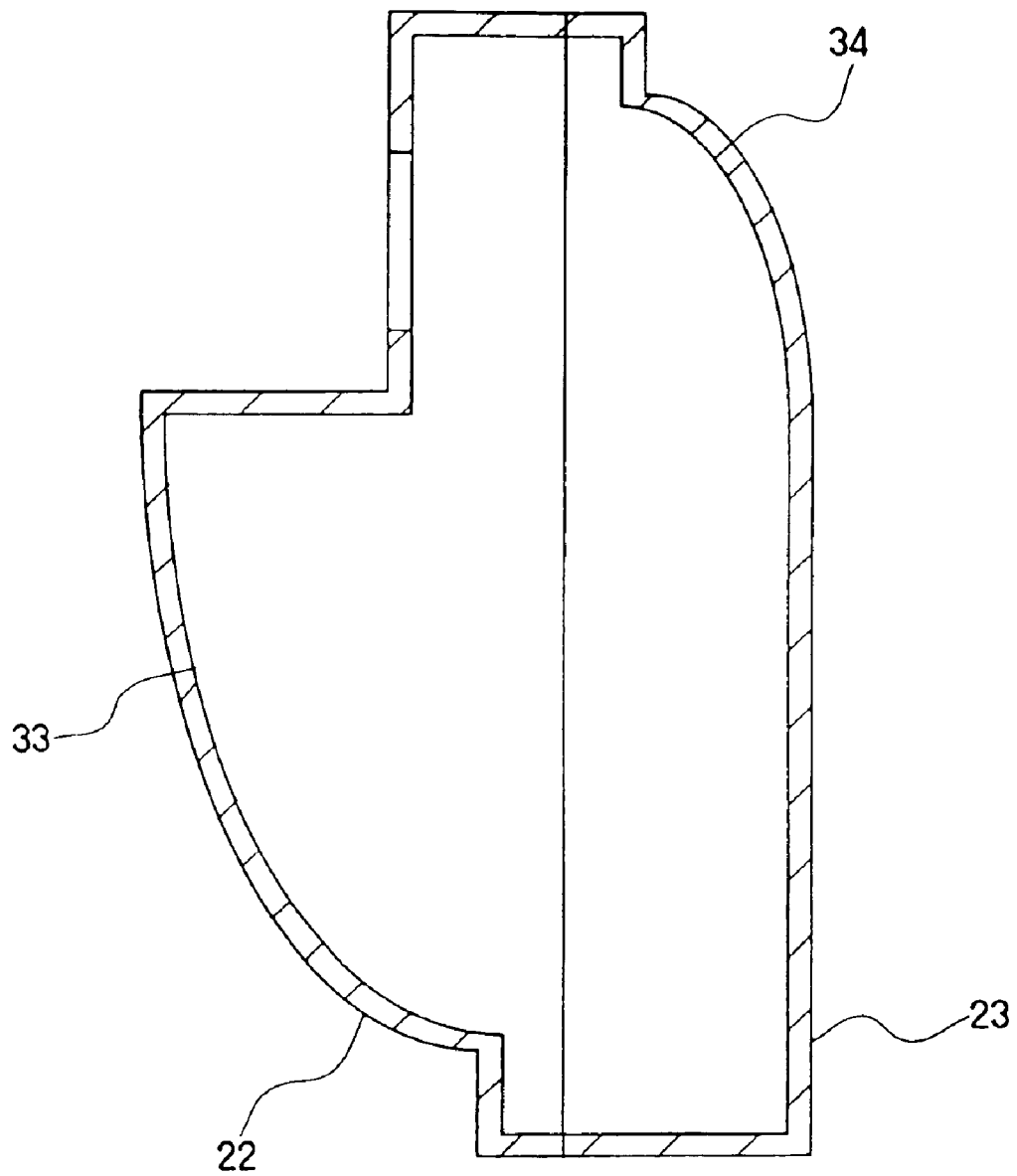
FIG. 25 is a cross-sectional view of a reflective optical device according to a ninth embodiment of the present invention.

FIG. 25 illustrates a reflective optical device in which an optical member is made of a metal. On an internal surface of a front optical member 22 in a shell-like shape formed with a metal, a region 33 equivalent to a reflection region is formed. Likewise, on an internal surface of a rear optical member 23 in a shell-like shape formed with a metal, a region 34 equivalent to a reflection region is formed. It is possible to form the reflection surfaces 33 and 34 simultaneously when the optical members 22 and 23 are formed by press molding or die casting, respectively. Furthermore, the reflection surfaces can be formed using cutting tools after the molding or casting.

As a material used for forming the optical member, a material may be selected that is suitable for wavelengths of light fluxes from a subject as a target to be imaged: for instance, aluminum, gold, silver, copper or zinc. Aluminum has excellent processability and reflectance, while being inexpensive. Gold is superior in environmental resistance, and has an excellent reflectance as to light fluxes in the infrared range. Silver is industrially applicable from the viewpoint of cost, and has an excellent reflectance. Copper has excellent processability and reflectance as to light fluxes in the infrared range, while being inexpensive. Zinc has excellent processability, while being inexpensive.

Incidentally, a reflection surface formed on an optical member formed by using aluminum, silver, copper, zinc, etc. tends to have a reflectance decreased due to oxidation. Therefore, it is desirable that $SiO_2$ or the like is laminated on the metallic member.

Figure 26:
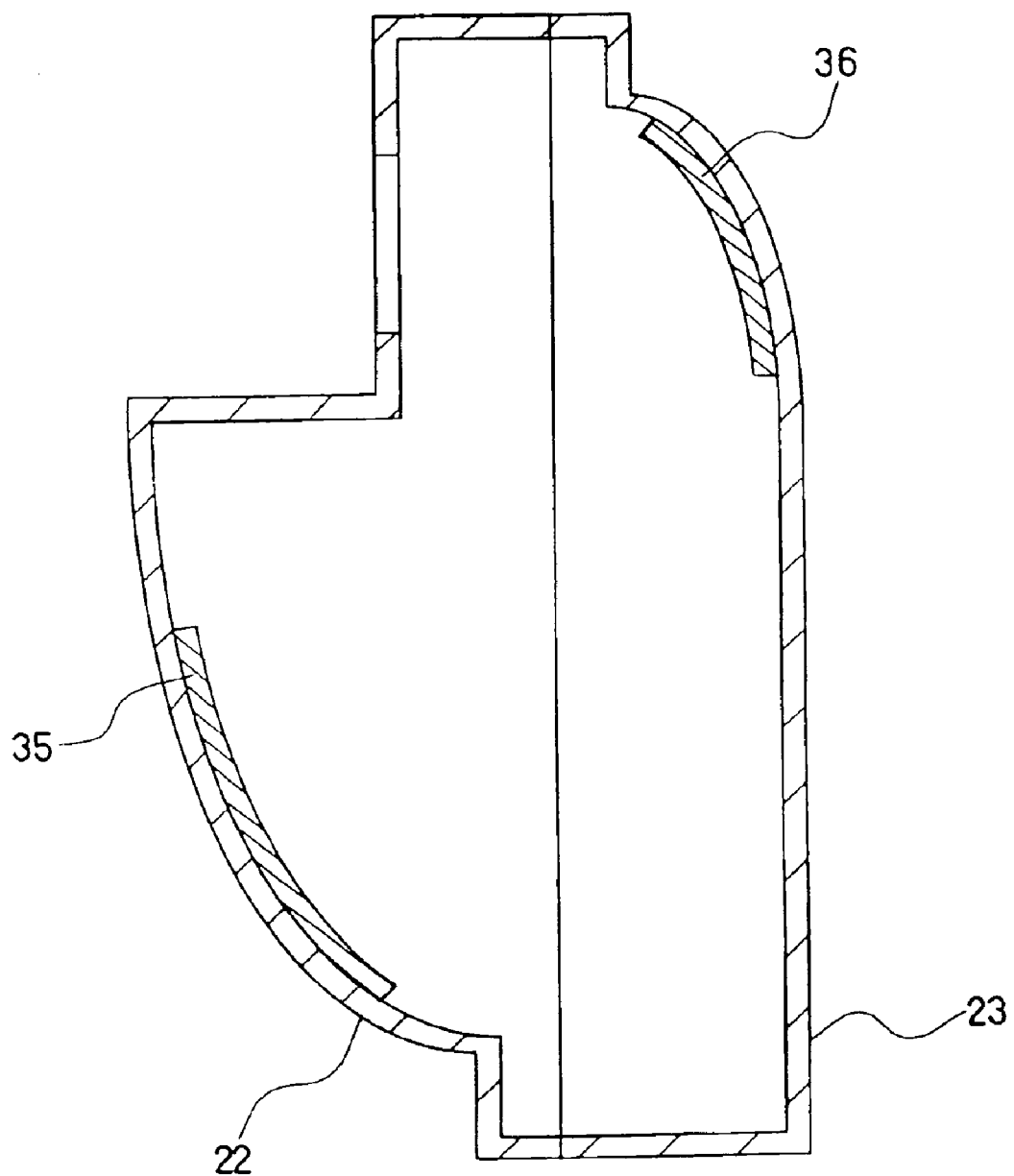
FIG. 26 is a cross-sectional view of another reflective optical device according to the ninth embodiment of the present invention.

Furthermore, in the case where metallic thin films 35 and 36 are formed on reflection-surface-equivalent regions on surfaces of the shell-shaped optical members 22 and 23 made of metals, as illustrated in FIG. 26, the optical characteristics are further improved.

Generally, as compared with a metallic material forming a structure, a metallic material used in vacuum deposition or plating has a higher impurity, and a metallic thin film formed with such a metallic material has a higher reflectance. As a material used for forming a metallic thin film, a material may be selected that is suitable for wavelengths of light fluxes from a subject as a target to be imaged: for instance, aluminum, gold, silver, copper or zinc. Aluminum has an excellent reflectance, while being inexpensive. Gold is superior in environmental resistance, and has an excellent reflectance as to light fluxes in the infrared range. Silver is industrially applicable from the viewpoint of cost, and has an excellent reflectance. Copper has an excellent reflectance as to light fluxes in the infrared range, while being inexpensive. Zinc has a relatively excellent reflectance as to light fluxes in the infrared range, while being inexpensive.

Incidentally, a reflection surface on which a metallic thin film is formed by using aluminum, silver, copper, zinc, etc. tends to have a reflectance decreased due to oxidation. Therefore, it is desirable that $SiO_2$ or the like is laminated on the metallic thin film.

Tenth Embodiment

Figure 27:
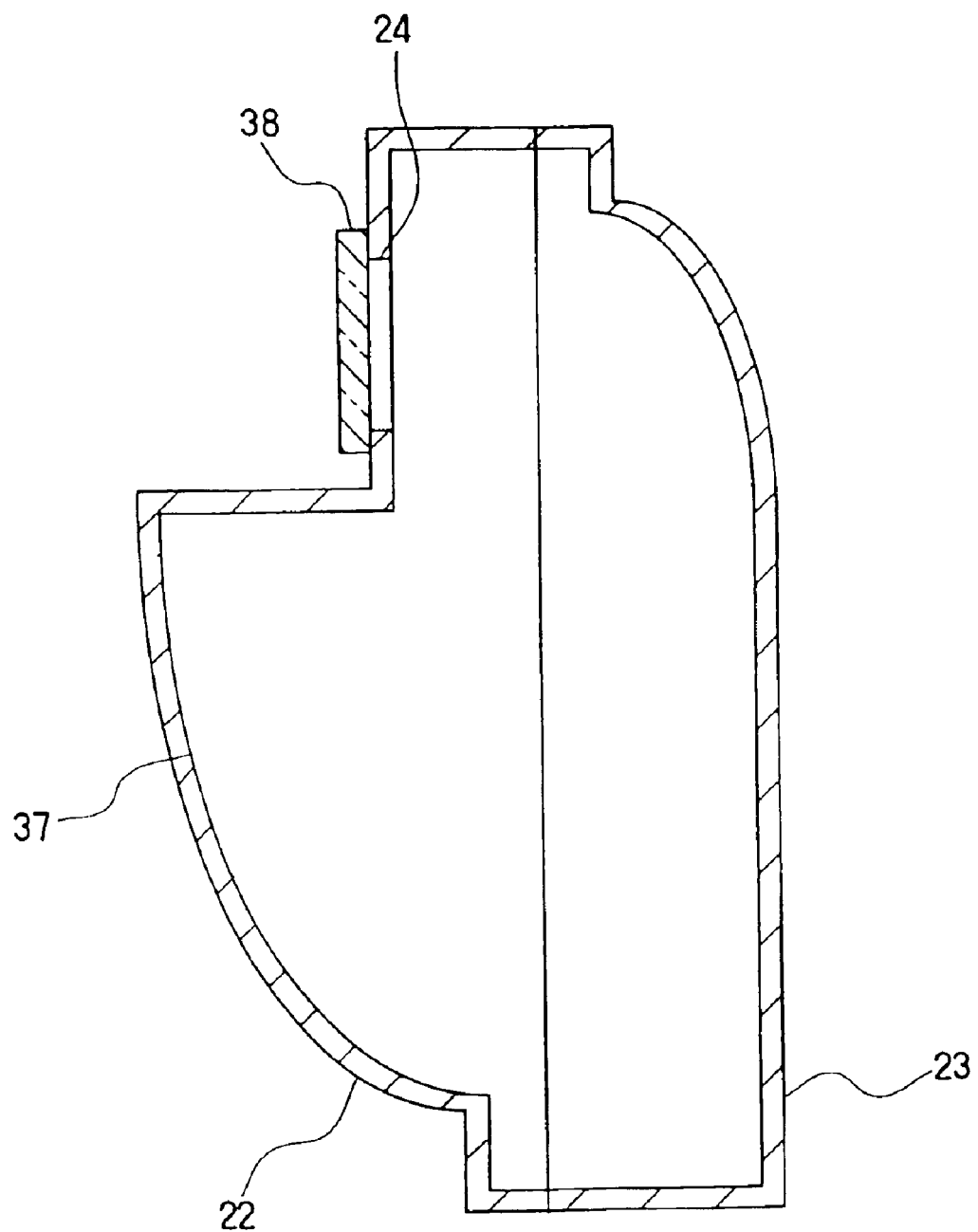
FIG. 27 is a cross-sectional view of a reflective optical device according to a tenth embodiment of the present invention.

FIG. 27 illustrates a reflective optical device in which a front optical member 22 and a rear optical member 23, each in a shell-like shape, are opposed to each other and provided integrally, and a window member 38 to allow light fluxes in a wavelength range necessary for image formation to pass therethrough is added to an aperture 24 provided on the front optical member 22.

The present embodiment allows necessary light fluxes to pass therethrough, and at the same time prevents dust and water droplets from entering from the external into the internal space of the hollow structure formed by integrally providing the front optical member 22 and the rear optical member 23.

The window member 38 preferably is formed with a material that allows light fluxes in a wavelength range necessary for image formation to pass therethrough, while blocking light fluxes in the other wavelength ranges. This causes unnecessary light fluxes in the unnecessary wavelength ranges not to enter the inside of the reflective optical device, whereby an image with an excellent contrast can be obtained.

In the case where germanium is used for forming the window member, it is possible to block light fluxes in the visible range while to transmit light fluxes in the infrared range. This enables the image formation by using light fluxes in the infrared range, which does not affect light fluxes in the visible range. Likewise, in the case where silicon is used for forming the window member, it is possible to block light fluxes in the visible range while to transmit light fluxes in the infrared range. This enables the image formation by using light fluxes in the infrared range, which does not affect light fluxes in the visible range. In the case where polyethylene is used for forming the window member, it is possible to transmit light fluxes in the visible range and in the infrared range both, thereby making the image formation by using light fluxes in the visible range and in the infrared range both. Likewise, in the case where ZnSe is used for forming the window member, it is possible to transmit light fluxes in the visible range and in the infrared range both, thereby making the image formation by using light fluxes in the visible range and in the infrared range both. Furthermore, the window member may be formed with a material other than the above, as required. For instance, $CaF_2$ or $BaF_2$ may be used.

As illustrated in FIG. 27, the window member 38 is formed with flat plates. The structure in the flat-plate shape is easily processed at a low cost, and the adding of the same to the optical member is easy as well. The window member preferably is in a lens form and has a lens function. This makes it possible to also cause the window member to provide a part of the optical power contributing in the image formation, thereby enhancing the aberration correcting capability of the overall system, and further, improving the optical performance.

Eleventh Embodiment

Figure 28:
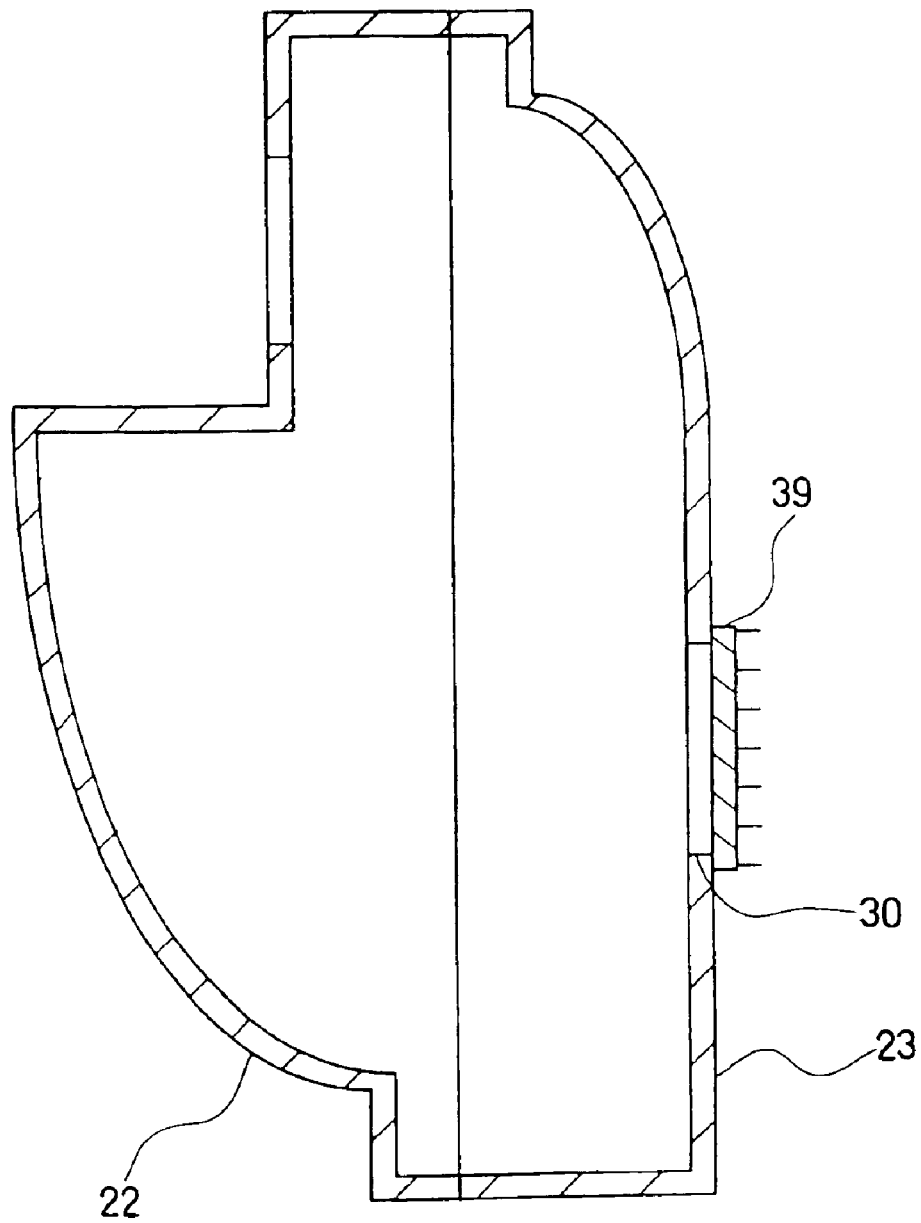
FIG. 28 is a cross-sectional view of a reflective optical device according to an eleventh embodiment of the present invention.

FIG. 28 illustrates an imaging device in which, to a reflective optical device composed of a front optical member 22 and a rear optical member 23, each in a shell-like shape, an imaging element 39 is added, on the outside of an image-forming-use aperture 30 provided in the rear optical member 23. Examples of the imaging element 39 include a CCD element, a bolometer array element utilizing a heat-resistance converting function, and a pyrometer array element utilizing a heat-electromotive force converting function.

By adapting a CCD imaging element as the imaging element with sensitivity to the visible range, the image formation is enabled as to the visible range. By adapting a bolometer array element or a pyrometer array element as the imaging element with sensitivity to the infrared range, the image formation is enabled as to the infrared range. By utilizing an imaging element in which a photo diode array and either a bolometer array or a pyrometer array monolithically are provided, the image formation is enabled as to the visible range and the infrared range both.

Twelfth Embodiment

Figure 29:
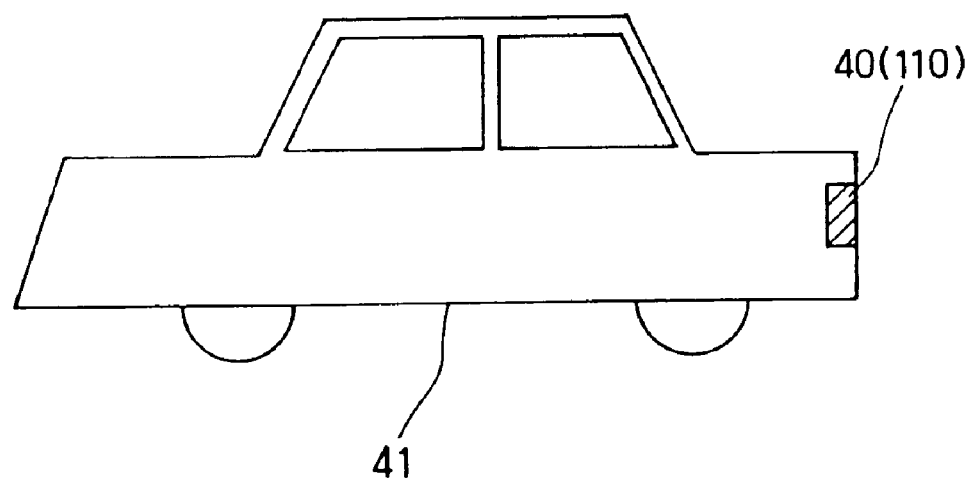
FIG. 29 is a view illustrating an arrangement of a vehicle-mounted monitor utilizing an imaging device according to any one of the embodiments of the present invention.

FIG. 29 illustrates an example in which an imaging device 40 according to the present invention is mounted on a vehicle 41, so as to be used as a vehicle-mounted monitor including a vehicle-mounted visual supporting device. A situation ahead of a vehicle 41 is imaged by an imaging device 40. By processing the image, it is possible to detect whether or not the vehicle is deviating from a traffic lane. Besides, by displaying the image on a display device (not shown) provided at a driving seat, it is possible to support human vision.

Furthermore, in the case where the imaging device utilizes an imaging element with sensitivity to the infrared range, it is possible to image a situation at night that is not visible to human eyes. Furthermore, the imaging device may be mounted on a side or at a rear of the vehicle, thereby providing images as required according to various situations.

Thirteenth Embodiment

Figure 30:
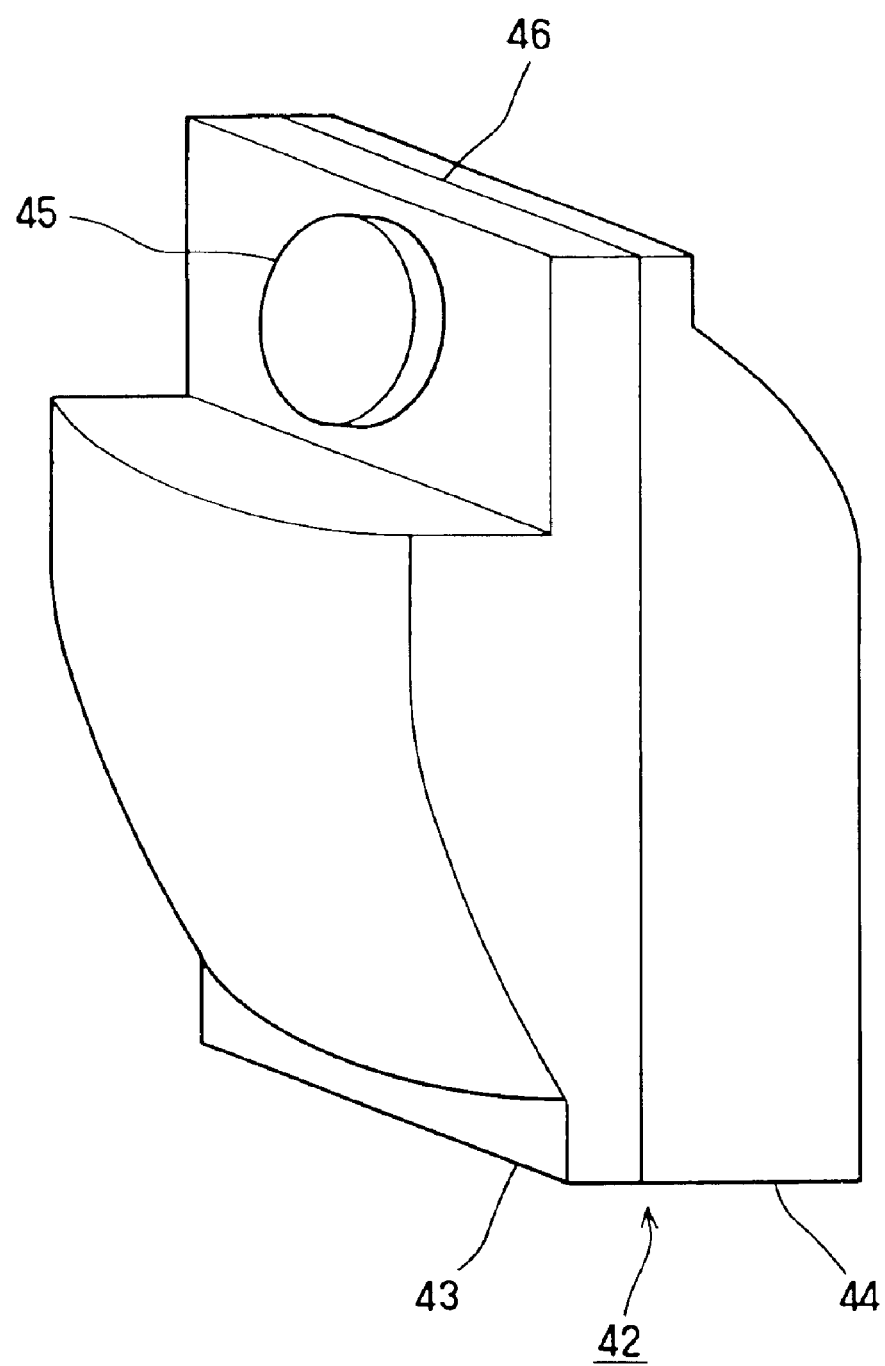
FIG. 30 is a perspective view illustrating a configuration of a reflective optical device according to a twelfth embodiment of the present invention.

FIG. 30 is a perspective view illustrating a configuration of a reflective optical device according to a thirteenth embodiment of the present invention. A front optical member 43 and a rear optical member 44, each in a shell-like shape, are bonded to each other at a border plane 46, thereby being provided integrally, in a state in which their respective concave surfaces are opposed to each other. An aperture is provided in the front optical member 43, and a window member 45 is provided on the aperture on the object side (on the outside). Light fluxes used in image formation enter through the window member 45 and the aperture. The window member 45 has an optical property of preventing at least infrared rays in a specific wavelength range from transmitting therethrough, among the incident infrared rays. Since such a window member 45 is provided, it is possible not to admit light fluxes with unnecessary wavelengths into the reflective optical device. As a result, it is possible to obtain an image with an excellent contrast.

Figure 31:
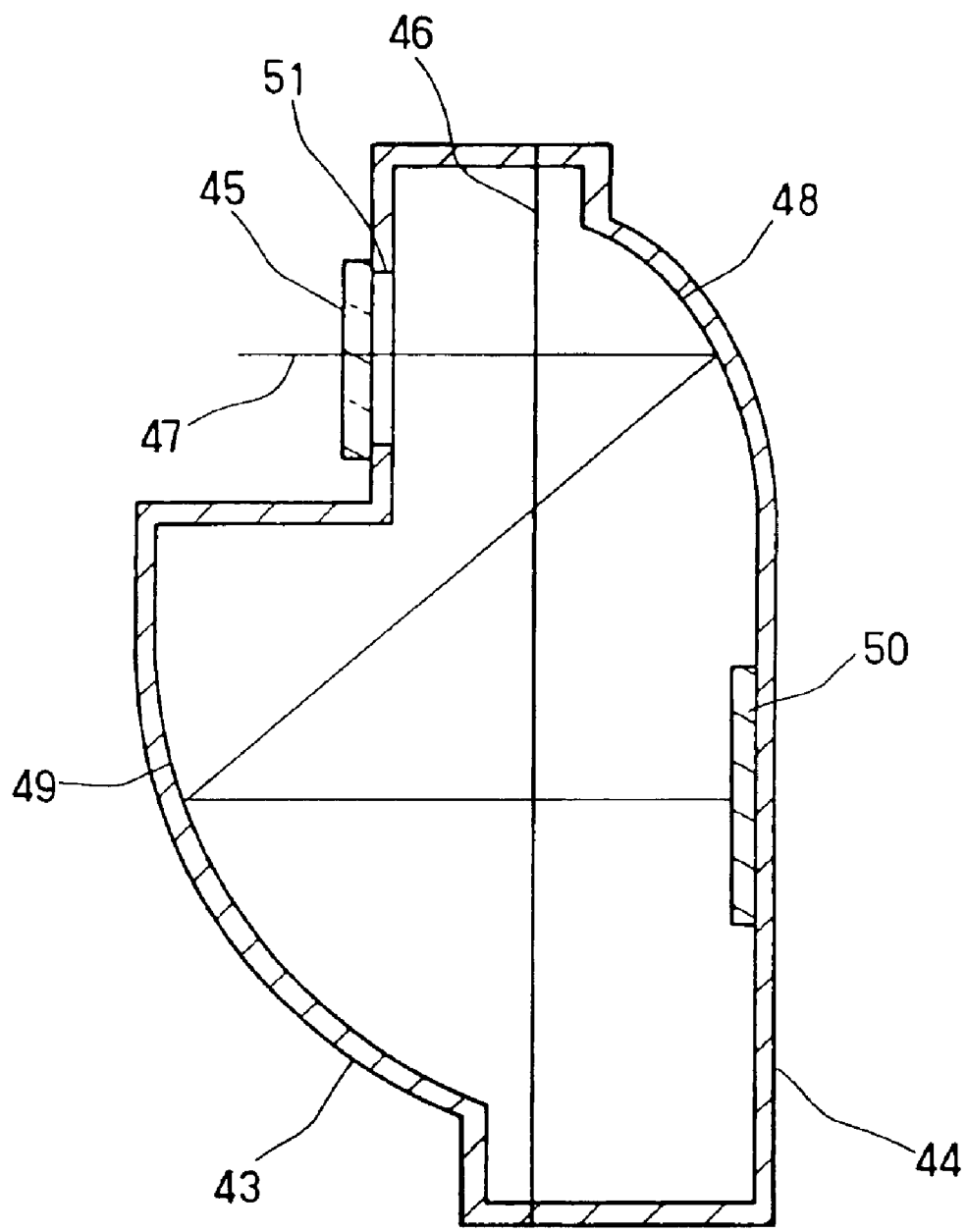
FIG. 31 is a cross-sectional view of a reflective optical device according to the twelfth embodiment of the present invention.

FIG. 31 is a cross-sectional view of the reflective optical device 42 show in FIG. 30 taken along a plane that includes the optical axes and is perpendicular to the border plane 46. The light fluxes having passed through the window member 45 for image formation, then, through the aperture 51, travel along an optical axis 47. Thereafter the light fluxes are reflected by a reflection surface 48 formed on an internal surface of the shell-shaped rear optical member 44, and a reflection surface 49 formed on an internal surface of the shell-shaped front optical member 43. Finally, the light fluxes are projected to a photosensitive member 50 with photosensitivity, whereby an image is formed.

Among the reflection surfaces 48 and 49, at least one is a free-form surface, and an excellent image can be obtained by this eccentric optical system. As the free-form surface, a curved-axis Y toric surface shown in FIG. 2 (the formulae (1) through (5)) or a curved-axis X toric surface (the formulae (6) through (10)) can be used, for instance.

By providing such a free-form surface as the reflection surface on the internal surface of the shell-shaped optical member, aberration correcting capability of an eccentric optical system can be obtained, and hence, a configuration of an optical system with an optical path that conventionally has not been available is obtained. Furthermore, the blocking by the reflection surface itself is avoided, and an optical system with an increased angle of vision can be obtained. In other words, by integrally providing a plurality of shell-shaped optical members so that they are opposed to each other as in the present embodiment, it is possible to provide a reflective optical device that is cost-reduced and miniaturized at the same time compatibly and has an enhanced aberration correcting capability and an increased angle of view.

Figure 32:
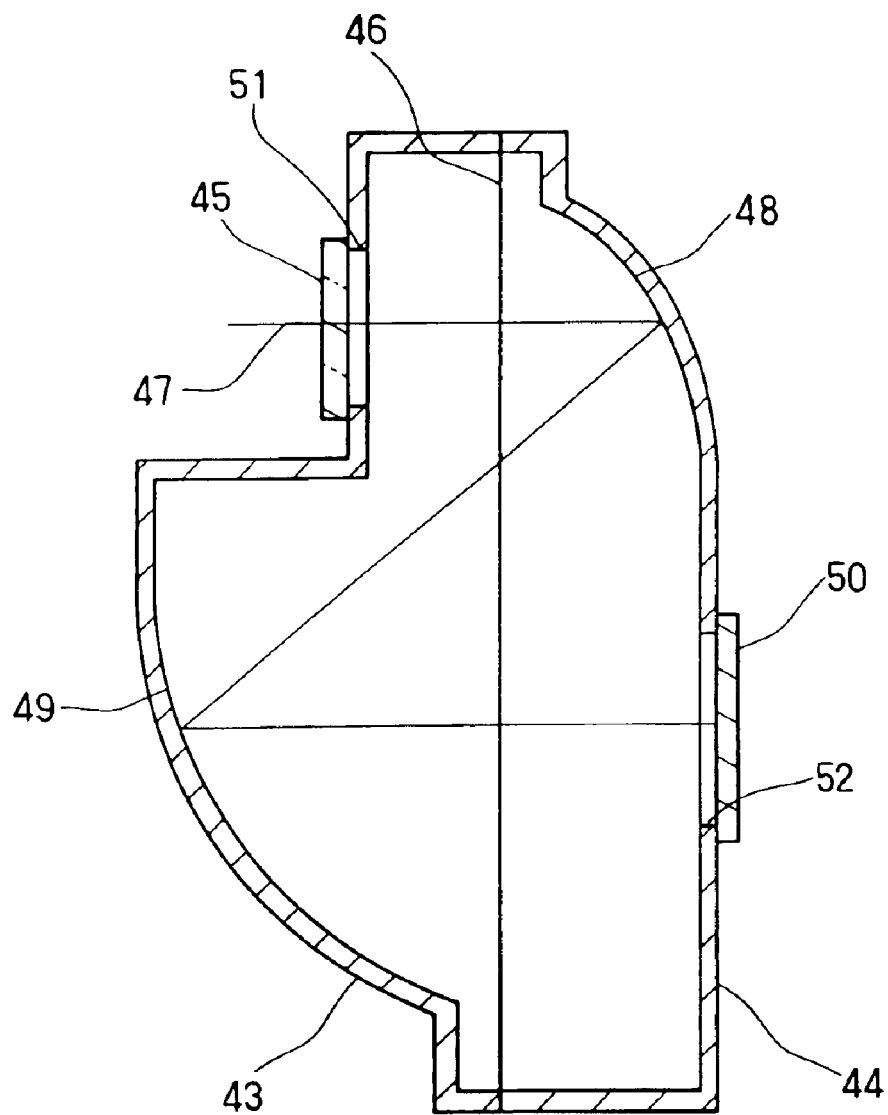
FIG. 32 is a cross-sectional view of a reflective optical device according to the twelfth embodiment of the present invention, which includes an aperture for image formation.

A reflective optical device shown in FIG. 32 is the reflective optical device 42 shown in FIG. 30, further provided with an aperture 52 for causing image formation to occur outside the reflective optical device 42. The light fluxes having passed through the window member 45 for image formation, and then, through the aperture 51, travel along an optical axis 47. Thereafter the light fluxes are reflected by a reflection surface 48 formed on an internal surface of the shell-shaped rear optical member 44, and a reflection surface 49 formed on an internal surface of the shell-shaped front optical member 43. Finally, the light fluxes are projected to a photosensitive member 50 with photosensitivity that is provided outside an aperture 52, whereby an image is formed.

Here, the window member 45 is composed of a multi-layer film formed with thin films made of a dielectric material with a low reflectance and thin films made of a dielectric material with a high reflectance that are alternately laminated on a transparent substrate. As a material to form a transparent substrate, a glass material, a resin material, $CaF_2$, $BaF_2$, or ZnSe is used. Furthermore, the window member 45 may be made of a glass material absorbing infrared rays, or may be made of a resin material absorbing infrared rays.

The window member 45 preferably is formed with flat plates. The structure in the flat-plate shape is easily processed at a low cost, and the adding of the same to the optical member is easy as well. The window member 45 more preferably is in a lens form and has a lens function. This makes it possible to also cause the window member 45 to provide a part of the optical power contributing in the image formation, thereby enhancing the aberration correcting capability of the overall system, and further, improving the optical performance.

In the case where the photosensitive member 50 is sensitive to light fluxes in the visible and far infrared ranges both, the range of wavelengths of infrared rays prevented from transmitting by the window member preferably is limited to a range of near infrared rays. By so doing, it is possible to suppress the incidence of unnecessary components of light to members having sensitivity to the respective wavelength ranges. As to the wavelength range of the near-infrared rays, a range of 700 nm to 1100 nm is preferable. A transmittance of light fluxes in the near infrared range, which are unnecessary light, preferably is not more than 10%. This allows the image formation to be conducted excellently. In other words, it is possible to form images with desirable color tones, without affecting spectral wavelength components in the visible range. At the same time, this does not affect spectral wavelength components in the far infrared range, thereby making it possible to form a thermal image.

Figure 33:
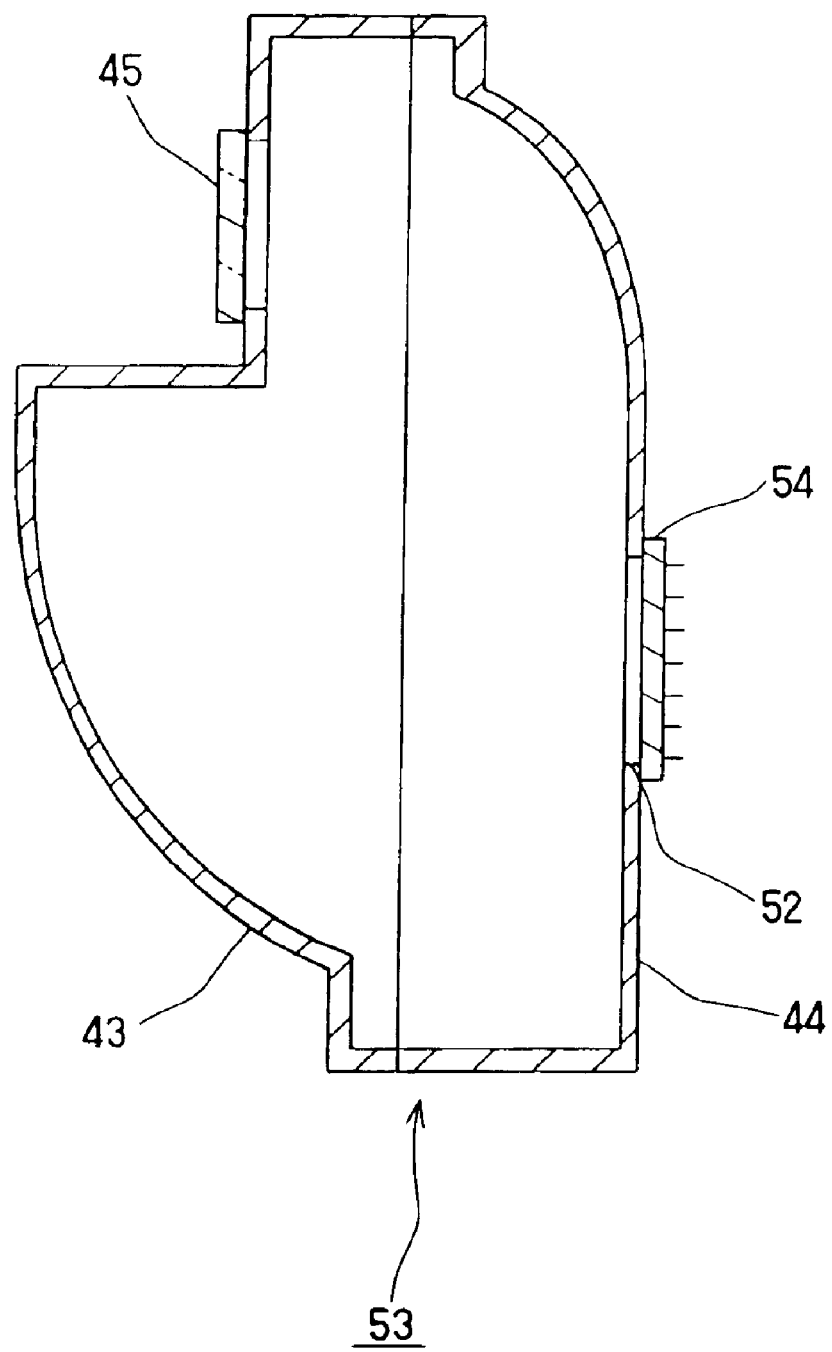
FIG. 33 is a cross-sectional view of another reflective optical device according to the twelfth embodiment of the present invention, which includes an aperture for image formation.

FIG. 33 is a cross-sectional view of an imaging device 53 provided with an imaging element 54 outside the aperture 52. Examples of the imaging element 54 include a CCD element, a bolometer array element utilizing a heat-resistance converting function, and a pyrometer array element utilizing a heat-electromotive force converting function.

By adapting a CCD imaging element as the imaging element 54, the image formation is enabled as to the visible range. The window 45 in this case preferably has a property of not transmitting infrared rays. By adapting a bolometer array element or a pyrometer array element as the imaging element 54, the image formation is enabled as to the infrared range. By using an imaging element 54 in which a photo diode array and either a bolometer array or a pyrometer array are provided monolithically, the image formation is enabled as to the visible range and the infrared range both. The window member 45 in this case preferably has a property of not transmitting near infrared rays.

Incidentally, in the present embodiment, the form of the reflection surface is that defined by the formulae (1) through (5) or that defined by the formulae (6) through (10), but it may be a surface of a form defined by different formulae as long as it is a similar surface.

Besides, the imaging element 54 may be provided inside the reflective imaging device 53. Moreover, a plurality of reflection surfaces may be provided on each of the optical members 43 and 44, and in this case it is possible to further enhance the aberration correcting capability.

Fourteenth Embodiment

Figure 34:
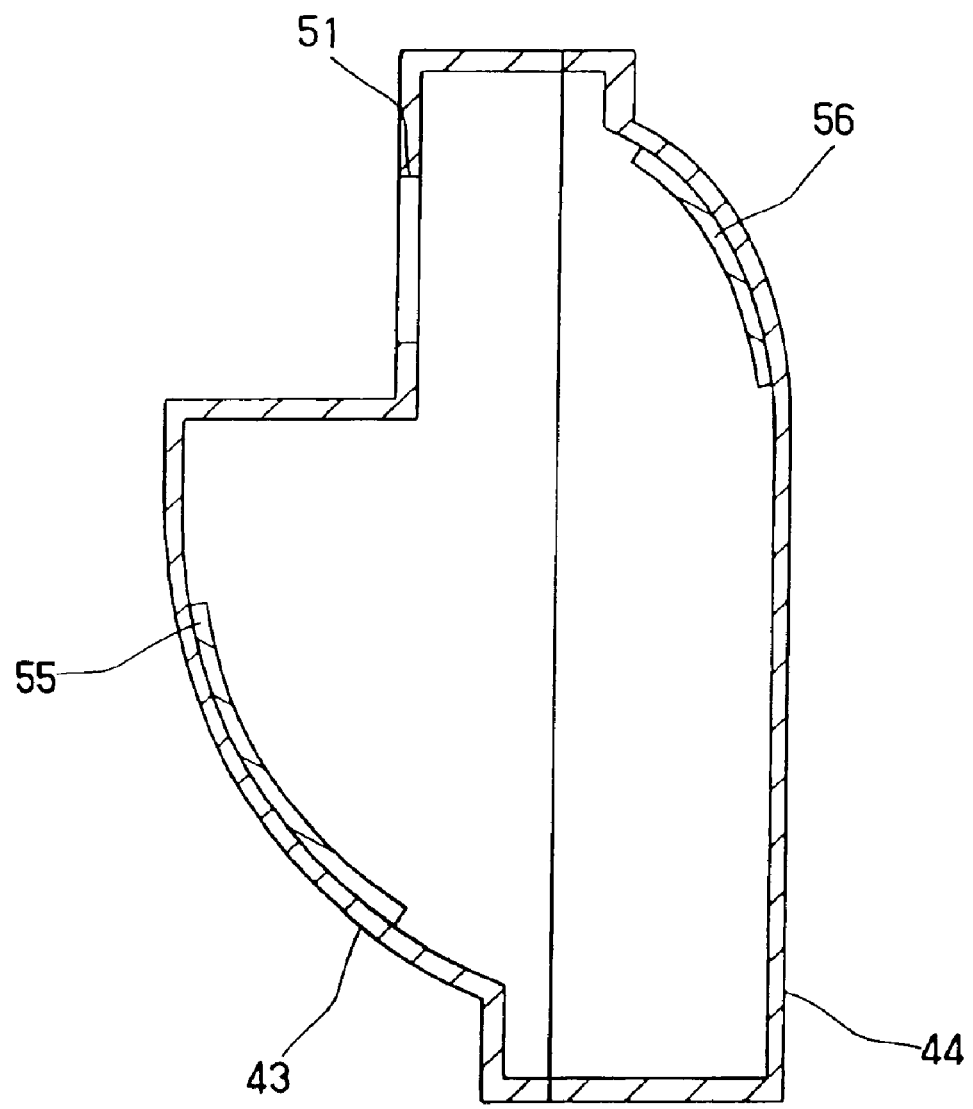
FIG. 34 is a cross-sectional view of a reflective optical device according to a thirteenth embodiment of the present invention.

FIG. 34 is a cross-sectional view of a reflective optical device according to a fourteenth embodiment. In a region of an internal surface of the front optical member 43, which region is to constitute a reflection surface, a film 55 is provided that has an optical property of not reflecting at least infrared rays in a specific waveform range among the infrared rays incident thereto. Likewise, in a region of an internal surface of the rear optical member 44, which region is to constitute a reflection surface, a film 56 is provided that has an optical property of not reflecting at least infrared rays in a specific waveform range among the infrared rays incident thereto. The films 55 and 56 are formed by vacuum deposition or coating.

This configuration allows only spectrum components necessary for image formation, among the light fluxes having entered through the aperture 51, to contribute to the image formation, thereby avoiding the light fluxes in an unnecessary wavelength range. As a result, an image with an excellent contrast can be obtained. Furthermore, it is possible to reduce the costs, since the device is composed of a decreased number of component parts.

Among the reflection surfaces on which the films 55 and 56 are formed, at least one is a free-form surface, and an excellent image can be obtained by this eccentric optical system. As the free-form surface, a curved-axis Y toric surface shown in FIG. 2 (the formulae (1) through (5)) or a curved-axis X toric surface (the formulae (6) through (10)) can be used, for instance.

By providing such a free-form surface as defined by the foregoing formulae on the internal surface of each of the optical members 43 and 44 as the reflection surface, aberration-correcting capability of an eccentric optical system can be obtained, and hence, a configuration of an optical system with an optical path that conventionally has not been available is obtained. Furthermore, the blocking by the reflection surface itself is avoided, and an optical system with an increased angle of vision can be obtained. In other words, by integrally providing a plurality of shell-shaped optical members so that they are opposed to each other as in the present embodiment, it is possible to provide a reflective optical device that is cost-reduced and miniaturized at the same time compatibly and has an enhanced aberration correcting capability and an increased angle of view.

Figure 35:
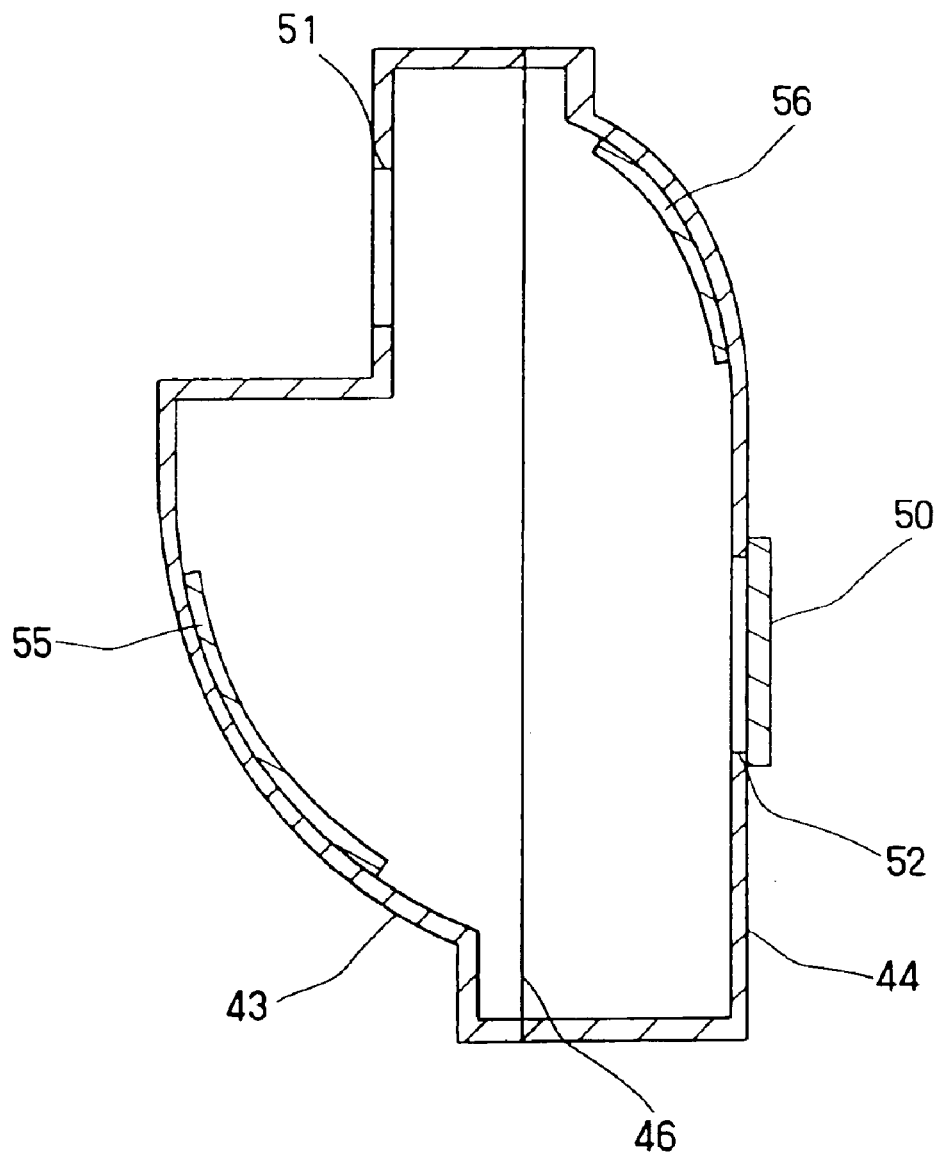
FIG. 35 is a cross-sectional view of a reflective optical device according to the thirteenth embodiment of the present invention, which includes an aperture for image formation.

FIG. 35 is a cross-sectional view of a reflective optical device provided with an aperture 52. The configuration other than the aperture 52 and a photosensitive member 50 is the same as that of the reflective optical device shown in FIG. 34. The aperture 52 is intended to cause images to be formed outside the reflective optical device. Light fluxes having entered through an aperture 51 for image formation are reflected by a reflection surface formed on an internal surface of the shell-shaped rear optical member 44, and a reflection surface formed on an internal surface of the shell-shaped front optical member 43. Finally, the light fluxes are projected to the photosensitive member 50 with photosensitivity that is provided outside the aperture 52, whereby an image is formed.

To form the films 55 and 56 by vacuum deposition, a multi-layer film is formed on each of the internal surfaces of the optical members 43 and 44 by alternately laminating thin films made of a dielectric material with a low reflectance and thin films made of a dielectric material with a high reflectance by vapor deposition. To form the same by coating, a material that transmits light fluxes in the visible range and absorbs light fluxes in the infrared range, such as an acrylic resin, is coated on a reflection surface formed beforehand on each of the internal surfaces of the optical members 43 and 44.

The films 55 and 56 are configured so as to have an optical property of not reflecting light fluxes in a range of wavelengths longer than those in the visible range, and preferably, an optical property of not reflecting light fluxes in a range of wavelengths longer than 700 nm. This allows the light fluxes used in image formation to be composed of only spectrum components in the visible range. Therefore, images with desirable color tones can be formed.

In the case where the photosensitive member 50 having photosensitivity is sensitive to light fluxes in the visible and far infrared ranges both, the range of wavelengths of infrared rays prevented from being reflected by the films preferably is limited to a range of near infrared rays. By so doing, it is possible to suppress the incidence of unnecessary components of light to members having sensitivity to the respective wavelength ranges. As to the wavelength range of the near-infrared rays, a range of 700 nm to 1100 nm is preferable. A reflectance of light fluxes in the near infrared range, which are unnecessary light, more preferably is not more than 10%. This allows the image formation to be conducted excellently. In other words, it is possible to form images with desirable color tones, without affecting spectral wavelength components in the visible range. At the same time, this does not affect spectral wavelength components in the far infrared range, thereby making it possible to form a thermal image.

Figure 36:
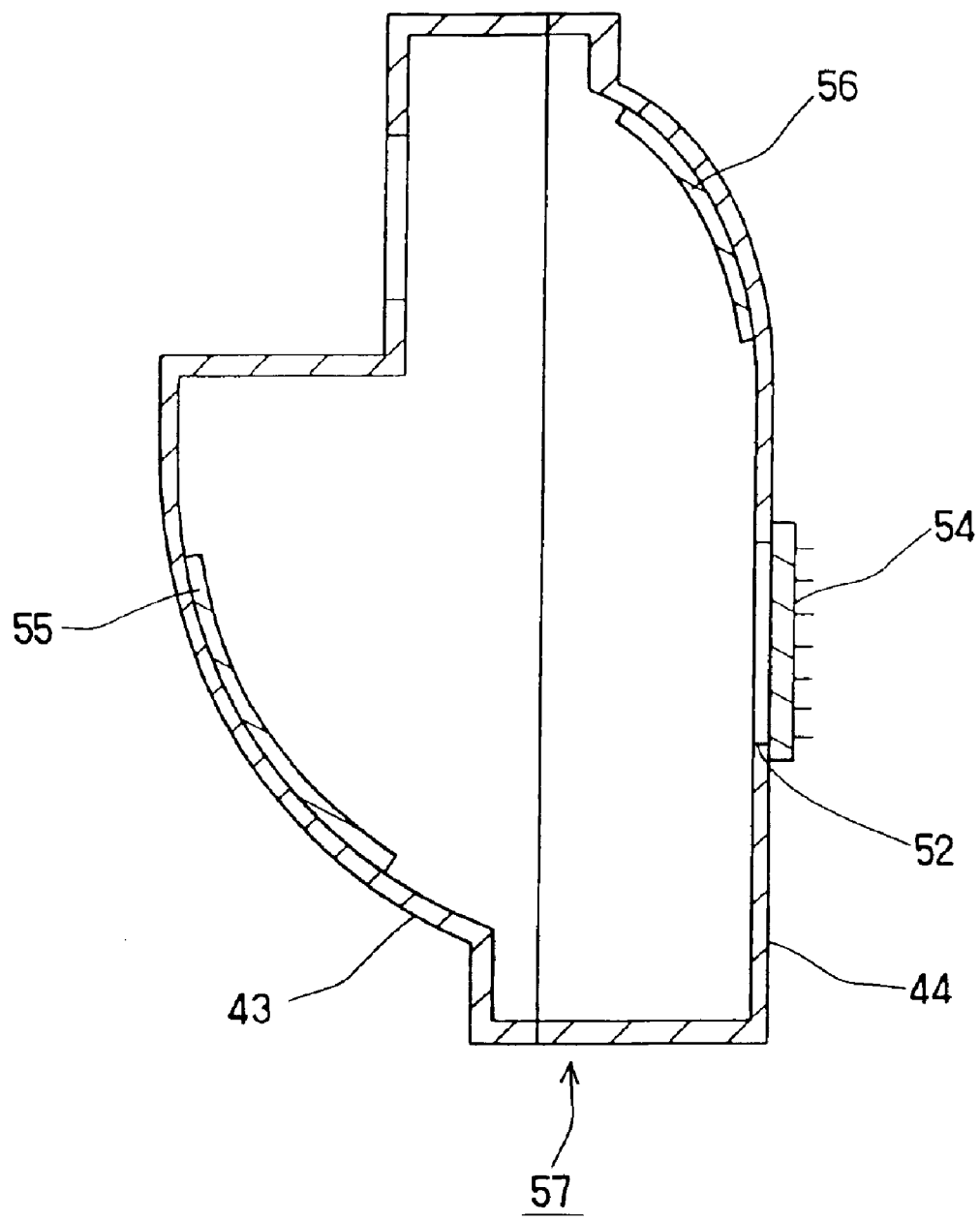
FIG. 36 is a cross-sectional view of another reflective optical device according to the thirteenth embodiment of the present invention, which includes an aperture for image formation.

A reflective optical device 57 shown in FIG. 36 differs from the reflective optical device shown in FIG. 35 in the aspect that an imaging element 54 is attached to the outside of the aperture 52. Adaptable as the imaging element 54 is a CCD element, a bolometer array element utilizing a heat-resistance converting function, a pyrometer array element utilizing a heat-electromotive force converting function, or the like.

By adapting a CCD imaging element as the imaging element 54, the image formation is enabled as to the visible range. In this case, the reflection surface preferably has a property of not reflecting infrared rays. By adapting a bolometer array element or a pyrometer array element as the imaging element 54, the image formation is enabled as to the infrared range. By using an imaging element 54 in which a photo diode array and either a bolometer array or a pyrometer array are provided monolithically, the image formation is enabled as to the visible range and the infrared range both. The reflection surface in this case preferably has a property of not reflecting near infrared rays.

Incidentally, in the present embodiment, the form of the reflection surface is that defined by the formulae (1) through (5) or that defined by the formulae (6) through (10), but it may be a surface in a form defined by different formulae as long as it is a similar surface.

Besides, the imaging element 54 may be provided inside the shell-shaped reflective imaging device 57. Moreover, a plurality of reflection surfaces may be provided on each of the optical members 43 and 44, and in this case it is possible to further enhance the aberration correcting capability.

Sixteenth Embodiment

Figure 37:
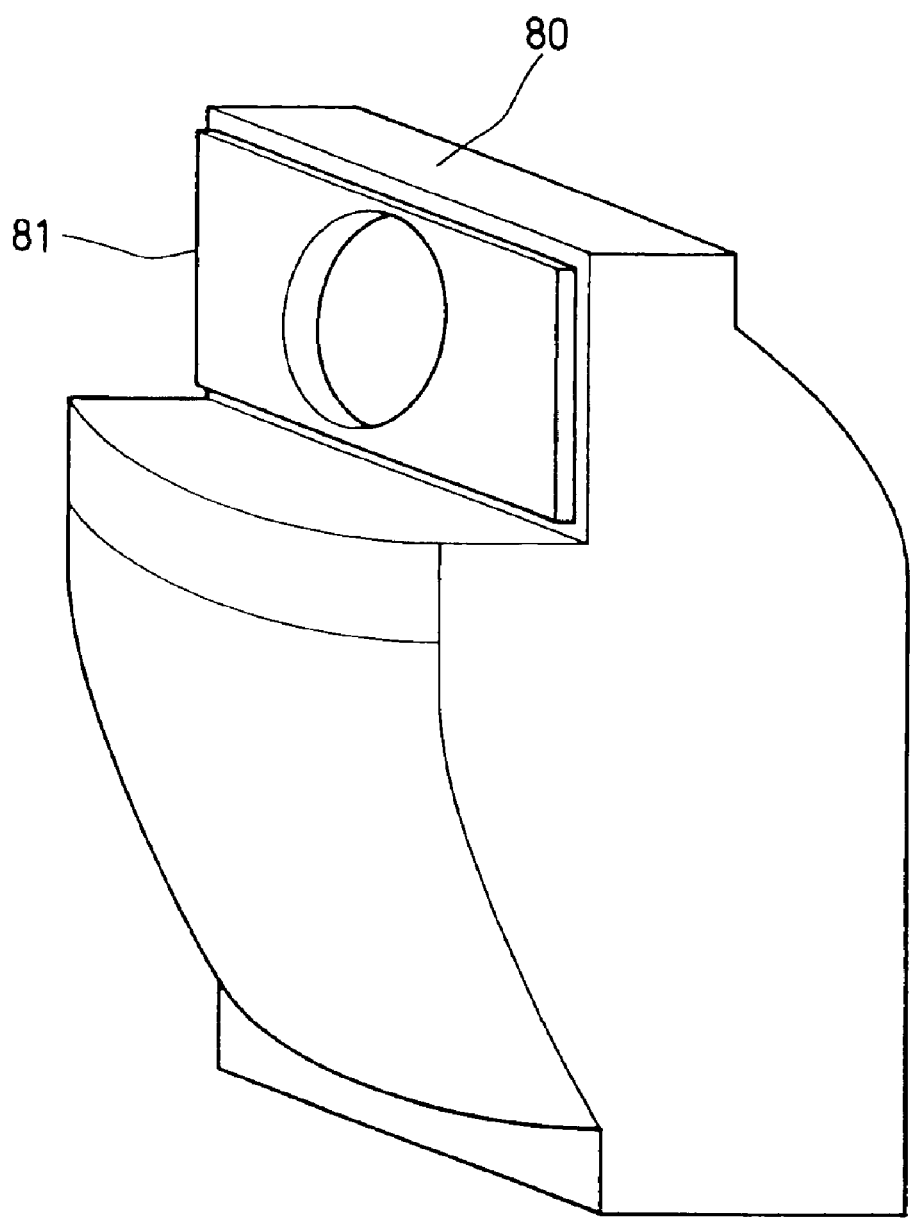
FIG. 37 is a perspective view illustrating a configuration of a reflective optical device according to a fourteenth embodiment of the present invention.
Figure 38:
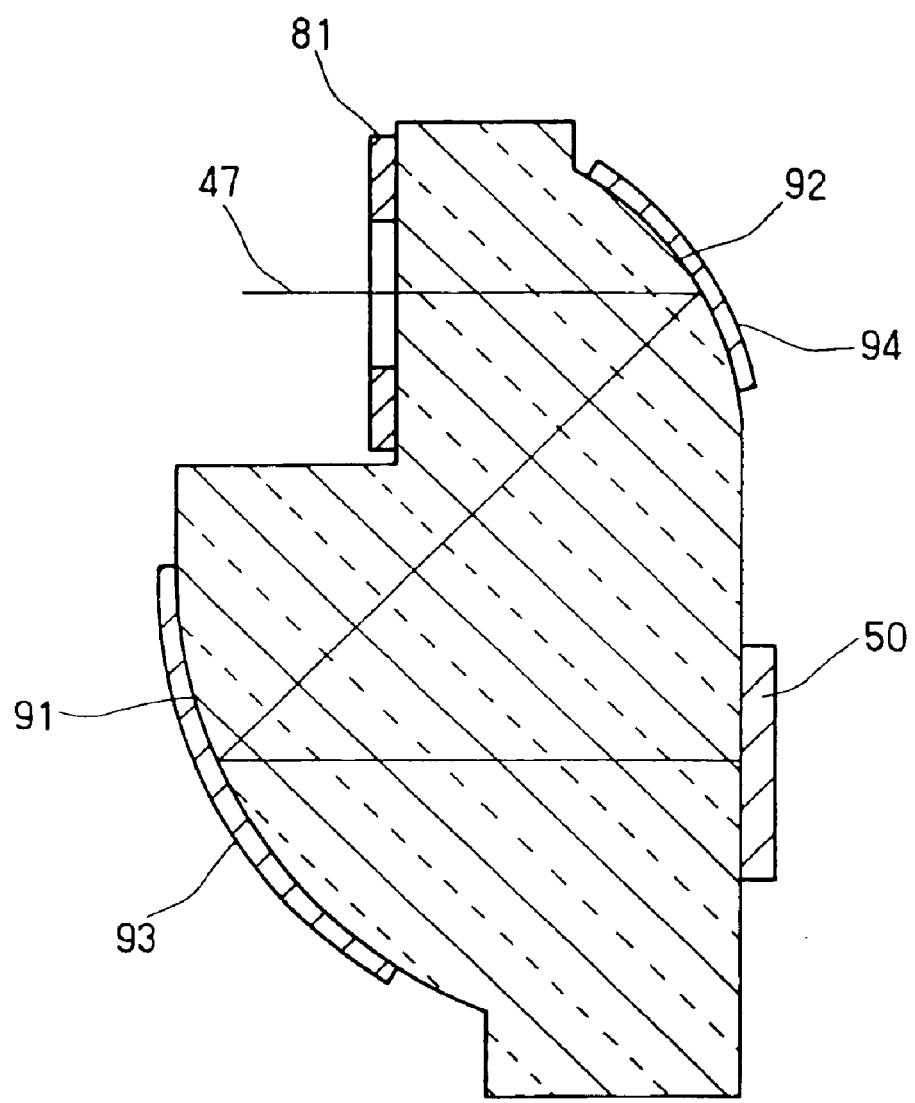
FIG. 38 is a cross-sectional view of a reflective solid-state optical device according to a fourteenth embodiment of the present invention.

FIG. 37 is a perspective view illustrating a configuration of a reflective solid-state optical device of the present invention. A diaphragm 81 is provided on a light-incident side of the reflective solid-state optical device 80. FIG. 38 is a cross-sectional view of the same taken along a plane containing an optical axis 47. The reflective solid-state optical device 80 is configured so as to be in a solid state, with a solid optical medium that has an optical property of not transmitting at least infrared rays in a specific wavelength range. On a surface of the optical medium, surfaces 91 and 92 are formed, at least one of which is a free-form surface. On the surfaces 91 and 92, reflection films 93 and 94 are formed. Thus, an optical system is configured in one piece.

Light fluxes having entered through the diaphragm 81 travel along the optical axis 47 through the solid optical medium. Then, the light fluxes are reflected by the reflection surface composed of the reflection film 94 and the free-form surface 92, as well as by the reflection surface composed of the reflection film 93 and the free-form surface 91, and are projected to the photosensitive member 50 with photosensitivity, where an image is formed.

By so doing, light fluxes in an unnecessary wavelength range by no means are directed to the photosensitive member 50, and an image with an excellent contrast can be obtained. Furthermore, it is possible to reduce the costs, since the device is composed of a decreased number of component parts.

At least one of the surfaces 91 and 92 is a free-form surface, and an excellent image can be obtained by this eccentric optical system. As the free-form surface, a curved-axis Y toric surface shown in FIG. 2 (the formulae (1) through (5)) or a curved-axis X toric surface (the formulae (6) through (10)) can be used, for instance.

By providing such a free-form surface as defined by the foregoing formulae on the solid optical medium surfaces as the reflection surface, aberration-correcting capability of an eccentric optical system can be obtained, and hence, a configuration of an optical system with an optical path that conventionally has not been available is obtained. Furthermore, the blocking by the reflection surface itself is avoided, and an optical system with an increased angle of vision can be obtained. In other words, by integrally providing a plurality of reflection surfaces on solid optical medium surfaces as in the present embodiment, it is possible to provide a reflective solid-state optical device that is cost-reduced and miniaturized at the same time compatibly and has an enhanced aberration correcting capability and an increased angle of view.

The optical medium is prepared so as to have an optical property of not transmitting light fluxes in a range of wavelengths longer than those in the visible range, and preferably, an optical property of not transmitting light fluxes in a range of wavelengths longer than 700 nm. This allows the light fluxes used in image formation are composed of only spectrum components in the visible range. Therefore, images with desirable color tones can be formed.

In the case where the photosensitive member 50 having photosensitivity is sensitive to light fluxes in the visible and far infrared ranges both, the range of wavelengths of infrared rays not transmitted by the optical medium preferably is limited to a range of near infrared rays. By so doing, it is possible to suppress the incidence of unnecessary components of light to members having sensitivity to the respective wavelength ranges. As to the wavelength range of the near-infrared rays, a range of 700 nm to 1100 nm is preferable. A transmittance of light fluxes in the near infrared range, which are unnecessary light, more preferably is not more than 10%. This allows the image formation to be conducted excellently. In other words, it is possible to form images with desirable color tones, without affecting spectral wavelength components in the visible range. At the same time, this does not affect spectral wavelength components in the far infrared range, thereby making it possible to form a thermal image.

Figure 39:
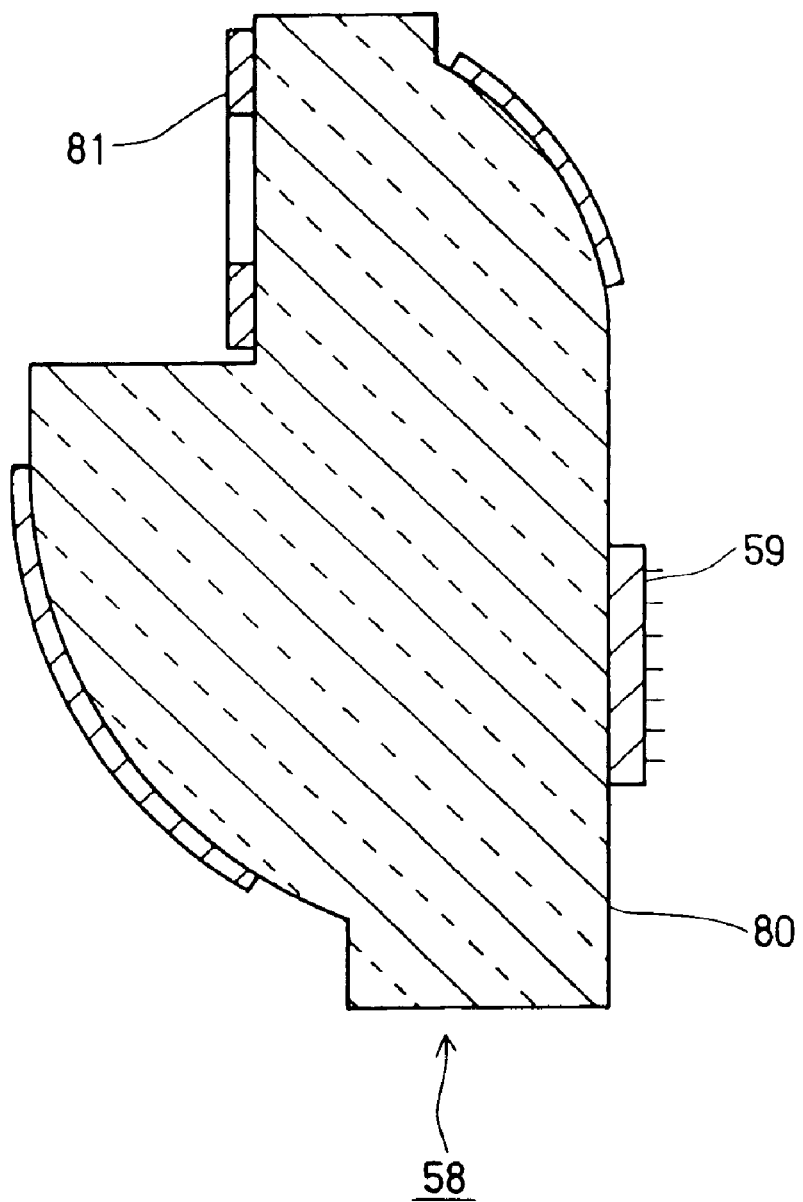
FIG. 39 is a cross-sectional view of another reflective solid-state optical device according to the fourteenth embodiment of the present invention.

A reflective solid-state optical device shown in FIG. 39 differs from the reflective optical device shown in FIG. 38 in the aspect that an imaging element 59 is provided in place of the photosensitive member 50 of the reflective solid-state optical device shown in FIG. 38. Adaptable as the imaging element 59 is a CCD element, a bolometer array element utilizing a heat-resistance converting function, a pyrometer array element utilizing a heat-electromotive force converting function, or the like. By adapting a CCD imaging element as the imaging element 59, the image formation is enabled as to the visible range. In this case, the optical medium preferably has a property of not transmitting infrared rays.

By adapting a bolometer array element or a pyrometer array element as the imaging element 59, the image formation is enabled as to the infrared range. By using an imaging element in which a photo diode array and either a bolometer array or a pyrometer array are provided monolithically, the image formation is enabled as to the visible range and the infrared range both. The optical medium in this case preferably has a property of not transmitting near infrared rays.

Incidentally, in the present embodiment, the form of the reflection surface is that defined by the formulae (1) through (5) or that defined by the formulae (6) through (10), but it may be a surface of a form defined by different formulae as long as it is a similar surface.

Seventeenth Embodiment

Figure 40:
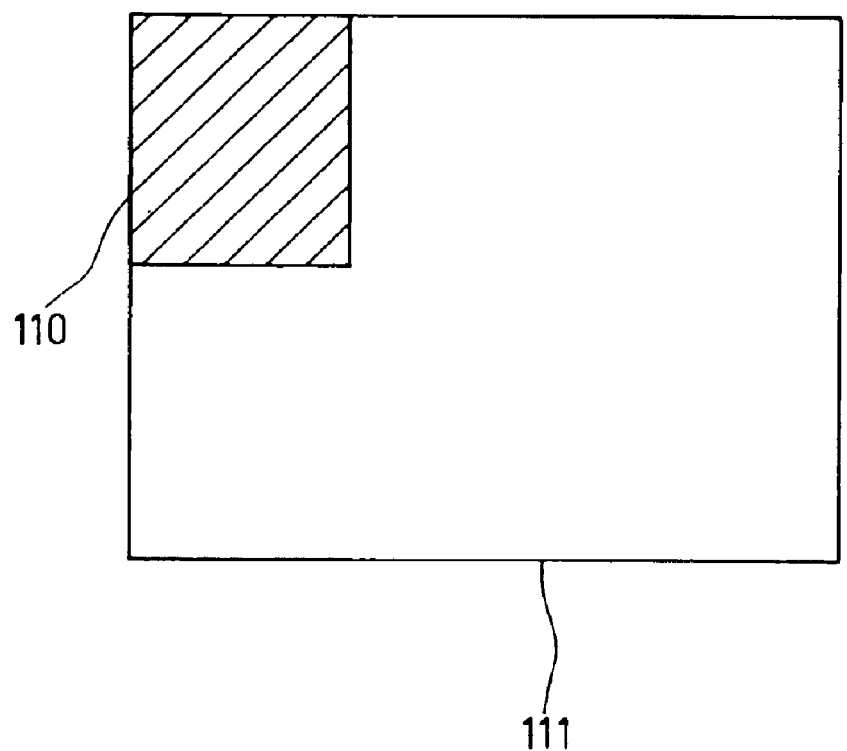
FIG. 40 is a view schematically illustrating a configuration of a video camera device according to a fifteenth embodiment of the present invention.

FIG. 40 illustrates a state in which an imaging device 110 according to the present invention is installed in a video camera device 111. The imaging device 110 is configured so that a reflective optical device or reflective solid-state optical device projects an image of a subject to an imaging element, which therefore outputs an image signal. The image signal, though not shown in the drawing, is recorded in a recording medium by electric circuits and mechanisms. Since the imaging device is small and low-cost while provides high contrast, this is effective for miniaturization, cost reduction, and enhancement of the performance, of the video camera device.

Eighteenth Embodiment

FIG. 29 illustrates a state in which the imaging device 110 according to the present invention is installed in a vehicle 41 so as to compose a vehicle-mounted visual supporting device. A situation ahead of the vehicle 41 is imaged by the imaging device 110. The image obtained is processed by an image processing device (not shown) provided in a vehicle visual supporting device. This allows deviation of the vehicle from a traffic lane, a vehicle driving ahead, an obstacle ahead, etc. to be detected.

Besides, by displaying the image on a display device (not shown) provided at a driving seat, it is possible to support human vision. Furthermore, in the case where the imaging device utilizes an imaging element with sensitivity to light fluxes in the infrared range, it is possible to image a situation that is not visible to human eyes. Furthermore, the imaging device may be mounted on a side or at a rear of the vehicle, thereby providing images as required according to various situations. Furthermore, since the imaging device is small and cost-reduced while providing a high contrast, it allows a degree of freedom to be obtained in installing the imaging device, thereby allowing a high-performance vehicle-mounted visual supporting device to be provided.

Industrial Applicability

As described above, a device provided by the present invention can be used as a reflective optical device or a reflective solid-state optical device that provides an increased angle of vision and enhanced optical performance, and is miniaturized and cost-reduced at the same time compatibly, and also as a vehicle-mounted monitor such as an imaging device, a video camera device, or a vehicle-mounted visual supporting device, utilizing the above.

What is claimed is:

1. A multi-wavelength imaging device, comprising:
a reflective optical device that converges light fluxes with only reflection surfaces, wherein the reflective optical device comprises two reflection surfaces whose faint itself is non-axisymmetric for bringing light fluxes from an object into focus on an image surface, the two non-axisymmetric reflection surfaces being a first reflection surface and a second reflection surface, wherein:
the first and second reflection surfaces are disposed in this order in a direction in which the light fluxes travel, and are arranged eccentrically; and
each of the first and second reflection surfaces is concave in a cross-sectional shape taken along a plane containing a center of the image surface and vertices of the reflection surfaces; and
a detecting means that has sensitivity to light rays in a plurality of different wavelength ranges.

2. A vehicle-mounted monitor, comprising:
a multi-wavelength imaging device according to claim 1; and
a display means that conveys an obtained image to a driver.

3. A multi-wavelength imaging device, comprising:
a reflective optical device that converges light fluxes with only reflection surfaces, wherein the reflective optical device comprises two reflection surfaces whose form itself is non-axisymmetric for bringing light fluxes from an object into focus on an image surface, the two non-axisymmetric reflection surfaces being a first reflection surface and a second reflection surface, wherein:
the first and second reflection surfaces are disposed in this order in a direction in which the light fluxes travel, and are arranged eccentrically; and
each of the first and second reflection surfaces is concave in a cross-sectional shape taken along a plane containing a center of the image surface and vertices of the reflection surfaces; and
a detecting means that has sensitivity to light rays in a plurality of different wavelength ranges, wherein the detecting means includes, in a same detecting surface, a plurality of regions that have sensitivity to light rays in different wavelength ranges, respectively.

4. A vehicle-mounted monitor, comprising:
a multi-wavelength imaging device according to claim 3; and
a display means that conveys an obtained image to a driver.

5. A multi-wavelength imagine device, comprising:
a reflective optical device that converges light fluxes with only reflection surfaces, wherein the reflective optical device comprises at least three reflection surfaces for bringing light fluxes from an object into focus on an image surface, wherein:
the reflection surfaces are arranged eccentrically;
an F value in a plane containing vertices of the respective reflection surfaces is less than 3.5; and
among the reflection surfaces, the two reflection surfaces on the object side are given as a first reflection surface and a second reflection surface, respectively, in an order from the object side in a direction in which the light fluxes travel, and each of the first and second reflection surfaces is concave in a cross-sectional shape taken along the plane; and
a detecting means that has sensitivity to light rays in a plurality of different wavelength ranges.

6. A multi-wavelength image device, comprising:
a reflective optical device that converges light fluxes with only reflection surfaces, wherein the reflective optical device comprises at least three reflection surfaces for bringing light fluxes from an object into focus on an image surface, wherein:
the reflection surfaces are arranged eccentrically; and
an F value in a plane containing vertices of the respective reflection surfaces is less than 1.9; and
a detecting means that has sensitivity to light rays in a plurality of different wavelength ranges.

7. A multi-wavelength imaging device, comprising:
a reflective optical device that converges light fluxes with only reflection surfaces, wherein the reflective optical device comprises at least three reflection surfaces for bringing light fluxes from an object into focus on an image surface, wherein:
the reflection surfaces are arranged eccentrically;
among the reflection surfaces, the reflection surface placed second from the object side in a direction in which the light fluxes travel is given as a second reflection surface, and the second reflection surface is concave in a cross-sectional shape taken in the vicinity of its vertex along a plane containing vertices of the reflection surfaces, and is convex in a cross-sectional shape taken in a direction perpendicular to the plane; and
a detecting means that has sensitivity to light rays in a plurality of different wavelength ranges.

8. A multi-wavelength imaging device, comprising:
a reflective optical device that converges light fluxes with only reflection surfaces, wherein the reflective optical device comprises at least three reflection surfaces for bringing light fluxes from an object into focus on an image surface, wherein:
the reflection surfaces are arranged eccentrically;
an F value in a plane containing vertices of the respective reflection surfaces is less than 3.5; and
among the reflection surfaces, the two reflection surfaces on the object side are given as a first reflection surface and a second reflection surface, respectively, in an order from the object side in a direction in which the light fluxes travel, and each of the first and second reflection surfaces is concave in a cross-sectional shape taken along the plane; and
a detecting means that has sensitivity to light rays in a plurality of different wavelength ranges, wherein the detecting means includes, in a same detecting surface, a plurality of regions that have sensitivity to light rays in different wavelength ranges, respectively.

9. A multi-wavelength imaging device, comprising:
a reflective optical device that converges light fluxes with only reflection surfaces, wherein the reflective optical device comprises at least three reflection surfaces for bringing light fluxes from an object into focus on an image surface, wherein:

the reflection surfaces are arranged eccentrically; and an F value in a plane containing vertices of the respective reflection surfaces is less than 1.9; and a detecting means that has sensitivity to light rays in a plurality of different wavelength ranges, wherein the detecting means includes, in a same detecting surface, a plurality of regions that have sensitivity to light rays in different wavelength ranges, respectively.

10. A multi-wavelength imaging device, comprising:

a reflective optical device that converges light fluxes with only reflection surfaces, wherein the reflective optical device comprises at least three reflection surfaces for bringing light fluxes from an object into focus on an image surface, wherein:

the reflection surfaces are arranged eccentrically;

among the reflection surfaces, the reflection surface placed second from the object side in a direction in winch the light fluxes travel is given as a second reflection surface, and the second reflection surface is concave in a cross-sectional shape taken in the vicinity of its vertex along a plane containing vertices of the reflection surfaces, and is convex in a cross-sectional shape taken in a direction perpendicular to the plane; and a detecting means that has sensitivity to light rays in a plurality of different wavelength ranges, wherein the detecting means includes, in a same detecting surface, a plurality of regions that have sensitivity to light rays in different wavelength ranges, respectively.

* * * * *